United States Patent
Hara et al.

(10) Patent No.: US 10,089,241 B2
(45) Date of Patent: Oct. 2, 2018

(54) MEMORY SYSTEM

(71) Applicant: TOSHIBA MEMORY CORPORATION, Minato-ku (JP)

(72) Inventors: Tokumasa Hara, Kawasaki (JP); Osamu Torii, Setagaya (JP); Kiichi Tachi, Kamakura (JP); Susumu Tamon, Yokohama (JP); Shigefumi Irieda, Yokohama (JP); Juan Shi, Yokohama (JP); Hironori Uchikawa, Fujisawa (JP); Kejen Lin, Yokohama (JP); Akira Yamaga, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 59 days.

(21) Appl. No.: 15/262,324

(22) Filed: Sep. 12, 2016

(65) Prior Publication Data
US 2017/0262379 A1 Sep. 14, 2017

Related U.S. Application Data

(60) Provisional application No. 62/306,152, filed on Mar. 10, 2016.

(51) Int. Cl.
*G06F 12/1009* (2016.01)

(52) U.S. Cl.
CPC .. *G06F 12/1009* (2013.01); *G06F 2212/2022* (2013.01)

(58) Field of Classification Search
None
See application file for complete search history.

(56) References Cited

U.S. PATENT DOCUMENTS

| | | | |
|---|---|---|---|
| 6,728,825 B1 | 4/2004 | Norman | |
| 7,729,166 B2 * | 6/2010 | Kim | G11C 7/1006 365/185.03 |
| 7,952,923 B2 * | 5/2011 | Kim | G11C 7/1006 365/185.03 |
| 8,321,760 B2 | 11/2012 | Son et al. | |
| 8,341,501 B2 | 12/2012 | Franceschini et al. | |
| 8,756,365 B2 * | 6/2014 | Sharon | G11C 11/5628 341/50 |
| 8,799,559 B2 | 8/2014 | Sharon et al. | |
| 2007/0140010 A1 * | 6/2007 | Yeh | G11C 16/0475 365/185.17 |
| 2008/0244338 A1 * | 10/2008 | Mokhlesi | G06F 11/1068 714/702 |
| 2009/0303789 A1 * | 12/2009 | Fernandes | G11C 11/5628 365/185.03 |
| 2014/0009996 A1 | 1/2014 | Ishii et al. | |
| 2014/0047160 A1 * | 2/2014 | Lin | G11C 11/5628 711/103 |

* cited by examiner

*Primary Examiner* — Midys Rojas
*Assistant Examiner* — Khoa D Doan
(74) *Attorney, Agent, or Firm* — Oblon, McClelland, Maier & Neustadt, L.L.P.

(57) ABSTRACT

According to one embodiment, a controller writes either processed data or preprocessing data and flags into each page included in m pages. The processed data is data after first data translation of write data to be written into a relevant page. The preprocessing data is data before the first data translation of the write data to be written into the relevant page. Each of the flag at least represents whether or not the first data translation is performed for write data to be written into the relevant page.

20 Claims, 37 Drawing Sheets

| Page | DATA | | | |
|------|---|---|---|---|
| Upper | 1 | 0 | 0 | 1 |
| Lower | 1 | 1 | 0 | 0 |

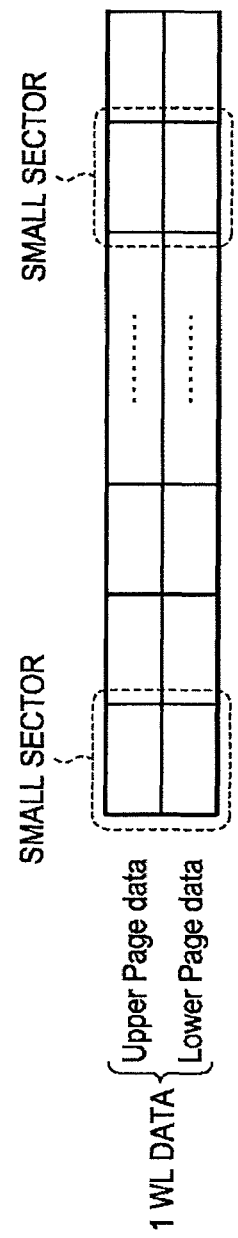

FIG.9A

NO FLIPPING

| Page \ DISTRIBUTION | Er | A | B | C | FLAG |
|---|---|---|---|---|---|
| Upper | 1 | 0 | 0 | 1 | 0 |
| Lower | 1 | 1 | 0 | 0 | 0 |

FIG.9B

LOWER PAGE DATA IS FLIPPED

| Upper | 1 | 0 | 0 | 1 | 0 |
|---|---|---|---|---|---|
| Lower | 0 | 0 | 1 | 1 | 1 |

FIG.9C

UPPER PAGE DATA IS FLIPPED

| Upper | 0 | 1 | 1 | 0 | 1 |
|---|---|---|---|---|---|
| Lower | 1 | 1 | 0 | 0 | 0 |

FIG.9D

LOWER PAGE DATA AND
UPPER PAGE DATA ARE FLIPPED

| Upper | 0 | 1 | 1 | 0 | 1 |
|---|---|---|---|---|---|
| Lower | 0 | 0 | 1 | 1 | 1 |

FIG.16A

NO DATA FLIPPING

| DISTRIBU-TION / Page | Er | A | B | C | D | E | F | G | FLAG |
|---|---|---|---|---|---|---|---|---|---|
| Upper | 1 | 1 | 1 | 0 | 0 | 0 | 0 | 1 | 0 |
| Middle | 1 | 1 | 0 | 0 | 1 | 1 | 0 | 0 | 0 |
| Lower | 1 | 0 | 0 | 0 | 0 | 1 | 1 | 1 | 0 |

FIG.16B

LOWER PAGE DATA IS FLIPPED

| Upper | 1 | 1 | 1 | 0 | 0 | 0 | 0 | 1 | 0 |
|---|---|---|---|---|---|---|---|---|---|
| Middle | 1 | 1 | 0 | 0 | 1 | 1 | 0 | 0 | 0 |
| Lower | 0 | 1 | 1 | 1 | 1 | 0 | 0 | 0 | 1 |

FIG.16C

MIDDLE PAGE DATA IS FLIPPED

| Upper | 1 | 1 | 1 | 0 | 0 | 0 | 0 | 1 | 0 |
|---|---|---|---|---|---|---|---|---|---|
| Middle | 0 | 0 | 1 | 1 | 0 | 0 | 1 | 1 | 1 |
| Lower | 1 | 0 | 0 | 0 | 0 | 1 | 1 | 1 | 0 |

FIG.16D

LOWER PAGE DATA AND MIDDLE PAGE DATA ARE FLIPPED

| Upper | 1 | 1 | 1 | 0 | 0 | 0 | 0 | 1 | 0 |
|---|---|---|---|---|---|---|---|---|---|
| Middle | 0 | 0 | 1 | 1 | 0 | 0 | 1 | 1 | 1 |
| Lower | 0 | 1 | 1 | 1 | 1 | 0 | 0 | 0 | 1 |

FIG.16E

UPPER PAGE DATA IS FLIPPED

| DISTRIBU-TION / Page | Er | A | B | C | D | E | F | G | FLAG |
|---|---|---|---|---|---|---|---|---|---|
| Upper | 0 | 0 | 0 | 1 | 1 | 1 | 1 | 0 | 1 |
| Middle | 1 | 1 | 0 | 0 | 1 | 1 | 0 | 0 | 0 |
| Lower | 1 | 0 | 0 | 0 | 0 | 1 | 1 | 1 | 0 |

FIG.16F

UPPER PAGE DATA AND LOWER PAGE DATA ARE FLIPPED

| Upper | 0 | 0 | 0 | 1 | 1 | 1 | 1 | 0 | 1 |
|---|---|---|---|---|---|---|---|---|---|
| Middle | 1 | 1 | 0 | 0 | 1 | 1 | 0 | 0 | 0 |
| Lower | 0 | 1 | 1 | 1 | 1 | 0 | 0 | 0 | 1 |

FIG.16G

UPPER PAGE DATA AND MIDDLE PAGE DATA ARE FLIPPED

| Upper | 0 | 0 | 0 | 1 | 1 | 1 | 1 | 0 | 1 |
|---|---|---|---|---|---|---|---|---|---|
| Middle | 0 | 0 | 1 | 1 | 0 | 0 | 1 | 1 | 1 |
| Lower | 1 | 0 | 0 | 0 | 0 | 1 | 1 | 1 | 0 |

FIG.16H

LOWER PAGE DATA, MIDDLE PAGE DATA, AND UPPER PAGE DATA ARE FLIPPED

| Upper | 0 | 0 | 0 | 1 | 1 | 1 | 1 | 0 | 1 |
|---|---|---|---|---|---|---|---|---|---|
| Middle | 0 | 0 | 1 | 1 | 0 | 0 | 1 | 1 | 1 |
| Lower | 0 | 1 | 1 | 1 | 1 | 0 | 0 | 0 | 1 |

FIG.19A

NO DATA FLIPPING

| DISTRIBUTION / Page | Er | 1 | 2 | 3 | 4 | 5 | 6 | 7 | 8 | 9 | A | B | C | D | E | F | FLAG |
|---|---|---|---|---|---|---|---|---|---|---|---|---|---|---|---|---|---|
| Top    | 1 | 1 | 1 | 1 | 1 | 0 | 0 | 0 | 0 | 0 | 0 | 1 | 1 | 1 | 0 | 0 | 0 |
| Higher | 1 | 1 | 0 | 0 | 0 | 0 | 0 | 0 | 1 | 1 | 0 | 0 | 1 | 1 | 1 | 1 | 0 |
| Upper  | 1 | 1 | 1 | 1 | 0 | 0 | 1 | 1 | 1 | 0 | 0 | 0 | 0 | 0 | 0 | 1 | 0 |
| Lower  | 1 | 0 | 0 | 1 | 1 | 1 | 1 | 0 | 0 | 0 | 0 | 0 | 0 | 1 | 1 | 1 | 0 |

FIG.19B

LOWER PAGE DATA IS FLIPPED

| | | | | | | | | | | | | | | | | | |
|---|---|---|---|---|---|---|---|---|---|---|---|---|---|---|---|---|---|
| Top    | 1 | 1 | 1 | 1 | 1 | 0 | 0 | 0 | 0 | 0 | 0 | 1 | 1 | 1 | 0 | 0 | 0 |
| Higher | 1 | 1 | 0 | 0 | 0 | 0 | 0 | 0 | 1 | 1 | 0 | 0 | 1 | 1 | 1 | 1 | 0 |
| Upper  | 1 | 1 | 1 | 1 | 0 | 0 | 1 | 1 | 1 | 0 | 0 | 0 | 0 | 0 | 0 | 1 | 0 |
| Lower  | 0 | 1 | 1 | 0 | 0 | 0 | 0 | 1 | 1 | 1 | 1 | 1 | 1 | 0 | 0 | 0 | 1 |

FIG.19C

UPPER PAGE DATA IS FLIPPED

| | | | | | | | | | | | | | | | | | |
|---|---|---|---|---|---|---|---|---|---|---|---|---|---|---|---|---|---|
| Top    | 1 | 1 | 1 | 1 | 1 | 0 | 0 | 0 | 0 | 0 | 0 | 1 | 1 | 1 | 0 | 0 | 0 |
| Higher | 1 | 1 | 0 | 0 | 0 | 0 | 0 | 0 | 1 | 1 | 0 | 0 | 1 | 1 | 1 | 1 | 0 |
| Upper  | 0 | 0 | 0 | 0 | 1 | 1 | 0 | 0 | 0 | 1 | 1 | 1 | 1 | 1 | 1 | 0 | 1 |
| Lower  | 1 | 0 | 0 | 1 | 1 | 1 | 1 | 0 | 0 | 0 | 0 | 0 | 0 | 1 | 1 | 1 | 0 |

FIG.19D

LOWER PAGE DATA AND UPPER PAGE DATA ARE FLIPPED

| | | | | | | | | | | | | | | | | | |
|---|---|---|---|---|---|---|---|---|---|---|---|---|---|---|---|---|---|
| Top    | 1 | 1 | 1 | 1 | 1 | 0 | 0 | 0 | 0 | 0 | 0 | 1 | 1 | 1 | 0 | 0 | 0 |
| Higher | 1 | 1 | 0 | 0 | 0 | 0 | 0 | 0 | 1 | 1 | 0 | 0 | 1 | 1 | 1 | 1 | 0 |
| Upper  | 0 | 0 | 0 | 0 | 1 | 1 | 0 | 0 | 0 | 1 | 1 | 1 | 1 | 1 | 1 | 0 | 1 |
| Lower  | 0 | 1 | 1 | 0 | 0 | 0 | 0 | 1 | 1 | 1 | 1 | 1 | 1 | 0 | 0 | 0 | 1 |

FIG.19E

HIGHER PAGE DATA IS FLIPPED

| DISTRIBUTION / Page | Er | 1 | 2 | 3 | 4 | 5 | 6 | 7 | 8 | 9 | A | B | C | D | E | F | FLAG |
|---|---|---|---|---|---|---|---|---|---|---|---|---|---|---|---|---|---|
| Top    | 1 | 1 | 1 | 1 | 1 | 0 | 0 | 0 | 0 | 0 | 0 | 1 | 1 | 1 | 0 | 0 | 0 |
| Higher | 0 | 0 | 1 | 1 | 1 | 1 | 1 | 1 | 0 | 0 | 1 | 1 | 0 | 0 | 0 | 0 | 1 |
| Upper  | 1 | 1 | 1 | 1 | 0 | 0 | 1 | 1 | 1 | 0 | 0 | 0 | 0 | 0 | 0 | 1 | 0 |
| Lower  | 1 | 0 | 0 | 1 | 1 | 1 | 1 | 0 | 0 | 0 | 0 | 0 | 0 | 1 | 1 | 1 | 0 |

FIG.19F

LOWER PAGE DATA AND HIGHER PAGE DATA ARE FLIPPED

| | Er | 1 | 2 | 3 | 4 | 5 | 6 | 7 | 8 | 9 | A | B | C | D | E | F | FLAG |
|---|---|---|---|---|---|---|---|---|---|---|---|---|---|---|---|---|---|
| Top    | 1 | 1 | 1 | 1 | 1 | 0 | 0 | 0 | 0 | 0 | 0 | 1 | 1 | 1 | 0 | 0 | 0 |
| Higher | 0 | 0 | 1 | 1 | 1 | 1 | 1 | 1 | 0 | 0 | 1 | 1 | 0 | 0 | 0 | 0 | 1 |
| Upper  | 1 | 1 | 1 | 1 | 0 | 0 | 1 | 1 | 1 | 0 | 0 | 0 | 0 | 0 | 0 | 1 | 0 |
| Lower  | 0 | 1 | 1 | 0 | 0 | 0 | 0 | 1 | 1 | 1 | 1 | 1 | 1 | 0 | 0 | 0 | 1 |

FIG.19G

UPPER PAGE DATA AND HIGHER PAGE DATA ARE FLIPPED

| | Er | 1 | 2 | 3 | 4 | 5 | 6 | 7 | 8 | 9 | A | B | C | D | E | F | FLAG |
|---|---|---|---|---|---|---|---|---|---|---|---|---|---|---|---|---|---|
| Top    | 1 | 1 | 1 | 1 | 1 | 0 | 0 | 0 | 0 | 0 | 0 | 1 | 1 | 1 | 0 | 0 | 0 |
| Higher | 0 | 0 | 1 | 1 | 1 | 1 | 1 | 1 | 0 | 0 | 1 | 1 | 0 | 0 | 0 | 0 | 1 |
| Upper  | 0 | 0 | 0 | 0 | 1 | 1 | 0 | 0 | 0 | 1 | 1 | 1 | 1 | 1 | 1 | 0 | 1 |
| Lower  | 1 | 0 | 0 | 1 | 1 | 1 | 1 | 0 | 0 | 0 | 0 | 0 | 0 | 1 | 1 | 1 | 0 |

FIG.19H

LOWER PAGE DATA, UPPER PAGE DATA, AND HIGHER PAGE DATA ARE FLIPPED

| | Er | 1 | 2 | 3 | 4 | 5 | 6 | 7 | 8 | 9 | A | B | C | D | E | F | FLAG |
|---|---|---|---|---|---|---|---|---|---|---|---|---|---|---|---|---|---|
| Top    | 1 | 1 | 1 | 1 | 1 | 0 | 0 | 0 | 0 | 0 | 0 | 1 | 1 | 1 | 0 | 0 | 0 |
| Higher | 0 | 0 | 1 | 1 | 1 | 1 | 1 | 1 | 0 | 0 | 1 | 1 | 0 | 0 | 0 | 0 | 1 |
| Upper  | 0 | 0 | 0 | 0 | 1 | 1 | 0 | 0 | 0 | 1 | 1 | 1 | 1 | 1 | 1 | 0 | 1 |
| Lower  | 0 | 1 | 1 | 0 | 0 | 0 | 0 | 1 | 1 | 1 | 1 | 1 | 1 | 0 | 0 | 0 | 1 |

FIG.19I

TOP PAGE DATA IS FLIPPED

| DISTRIBU-TION / Page | Er | 1 | 2 | 3 | 4 | 5 | 6 | 7 | 8 | 9 | A | B | C | D | E | F | FLAG |
|---|---|---|---|---|---|---|---|---|---|---|---|---|---|---|---|---|---|
| Top | 0 | 0 | 0 | 0 | 0 | 1 | 1 | 1 | 1 | 1 | 1 | 0 | 0 | 0 | 1 | 1 | 1 |
| Higher | 1 | 1 | 0 | 0 | 0 | 0 | 0 | 0 | 1 | 1 | 0 | 0 | 1 | 1 | 1 | 1 | 0 |
| Upper | 1 | 1 | 1 | 1 | 0 | 0 | 1 | 1 | 1 | 0 | 0 | 0 | 0 | 0 | 0 | 1 | 0 |
| Lower | 1 | 0 | 0 | 1 | 1 | 1 | 1 | 0 | 0 | 0 | 0 | 0 | 0 | 1 | 1 | 1 | 0 |

FIG.19J

LOWER PAGE DATA AND TOP PAGE DATA ARE FLIPPED

| Top | 0 | 0 | 0 | 0 | 0 | 1 | 1 | 1 | 1 | 1 | 1 | 0 | 0 | 0 | 1 | 1 | 1 |
|---|---|---|---|---|---|---|---|---|---|---|---|---|---|---|---|---|---|
| Higher | 1 | 1 | 0 | 0 | 0 | 0 | 0 | 0 | 1 | 1 | 0 | 0 | 1 | 1 | 1 | 1 | 0 |
| Upper | 1 | 1 | 1 | 1 | 0 | 0 | 1 | 1 | 1 | 0 | 0 | 0 | 0 | 0 | 0 | 1 | 0 |
| Lower | 0 | 1 | 1 | 0 | 0 | 0 | 0 | 1 | 1 | 1 | 1 | 1 | 1 | 0 | 0 | 0 | 1 |

FIG.19K

UPPER PAGE DATA AND TOP PAGE DATA ARE FLIPPED

| Top | 0 | 0 | 0 | 0 | 0 | 1 | 1 | 1 | 1 | 1 | 1 | 0 | 0 | 0 | 1 | 1 | 1 |
|---|---|---|---|---|---|---|---|---|---|---|---|---|---|---|---|---|---|
| Higher | 1 | 1 | 0 | 0 | 0 | 0 | 0 | 0 | 1 | 1 | 0 | 0 | 1 | 1 | 1 | 1 | 0 |
| Upper | 0 | 0 | 0 | 0 | 1 | 1 | 0 | 0 | 0 | 1 | 1 | 1 | 1 | 1 | 1 | 0 | 1 |
| Lower | 1 | 0 | 0 | 1 | 1 | 1 | 1 | 0 | 0 | 0 | 0 | 0 | 0 | 1 | 1 | 1 | 0 |

FIG.19L

LOWER PAGE DATA, UPPER PAGE DATA, AND TOP PAGE DATA ARE FLIPPED

| Top | 0 | 0 | 0 | 0 | 0 | 1 | 1 | 1 | 1 | 1 | 1 | 0 | 0 | 0 | 1 | 1 | 1 |
|---|---|---|---|---|---|---|---|---|---|---|---|---|---|---|---|---|---|
| Higher | 1 | 1 | 0 | 0 | 0 | 0 | 0 | 0 | 1 | 1 | 0 | 0 | 1 | 1 | 1 | 1 | 0 |
| Upper | 0 | 0 | 0 | 0 | 1 | 1 | 0 | 0 | 0 | 1 | 1 | 1 | 1 | 1 | 1 | 0 | 1 |
| Lower | 0 | 1 | 1 | 0 | 0 | 0 | 0 | 1 | 1 | 1 | 1 | 1 | 1 | 0 | 0 | 0 | 1 |

FIG.19M

HIGHER PAGE DATA AND TOP PAGE DATE ARE FLIPPED

| DISTRIBUTION / Page | Er | 1 | 2 | 3 | 4 | 5 | 6 | 7 | 8 | 9 | A | B | C | D | E | F | FLAG |
|---|---|---|---|---|---|---|---|---|---|---|---|---|---|---|---|---|---|
| Top   | 0 | 0 | 0 | 0 | 0 | 1 | 1 | 1 | 1 | 1 | 1 | 0 | 0 | 0 | 1 | 1 | 1 |
| Higher| 0 | 0 | 1 | 1 | 1 | 1 | 1 | 1 | 0 | 0 | 1 | 1 | 0 | 0 | 0 | 0 | 1 |
| Upper | 1 | 1 | 1 | 1 | 0 | 0 | 1 | 1 | 0 | 0 | 0 | 0 | 0 | 0 | 1 | 0 |
| Lower | 1 | 0 | 0 | 1 | 1 | 1 | 1 | 0 | 0 | 0 | 0 | 0 | 0 | 1 | 1 | 1 | 0 |

FIG.19N

LOWER PAGE DATA, HIGHER PAGE DATA, AND TOP PAGE DATA ARE FLIPPED

| | | | | | | | | | | | | | | | | | |
|---|---|---|---|---|---|---|---|---|---|---|---|---|---|---|---|---|---|
| Top   | 0 | 0 | 0 | 0 | 0 | 1 | 1 | 1 | 1 | 1 | 1 | 0 | 0 | 0 | 1 | 1 | 1 |
| Higher| 0 | 0 | 1 | 1 | 1 | 1 | 1 | 1 | 0 | 0 | 1 | 1 | 0 | 0 | 0 | 0 | 1 |
| Upper | 1 | 1 | 1 | 1 | 0 | 0 | 1 | 1 | 1 | 0 | 0 | 0 | 0 | 0 | 1 | 0 |
| Lower | 0 | 1 | 1 | 0 | 0 | 0 | 0 | 1 | 1 | 1 | 1 | 1 | 1 | 0 | 0 | 0 | 1 |

FIG.19O

UPPER PAGE DATA, HIGHER PAGE DATA, AND TOP PAGE DATA ARE FLIPPED

| | | | | | | | | | | | | | | | | | |
|---|---|---|---|---|---|---|---|---|---|---|---|---|---|---|---|---|---|
| Top   | 0 | 0 | 0 | 0 | 0 | 1 | 1 | 1 | 1 | 1 | 1 | 0 | 0 | 0 | 1 | 1 | 1 |
| Higher| 0 | 0 | 1 | 1 | 1 | 1 | 1 | 1 | 0 | 0 | 1 | 1 | 0 | 0 | 0 | 0 | 1 |
| Upper | 0 | 0 | 0 | 0 | 1 | 1 | 0 | 0 | 0 | 1 | 1 | 1 | 1 | 1 | 0 | 1 |
| Lower | 1 | 0 | 0 | 1 | 1 | 1 | 1 | 0 | 0 | 0 | 0 | 0 | 0 | 1 | 1 | 1 | 0 |

FIG.19P

LOWER PAGE DATA, UPPER PAGE DATA, HIGHER PAGE DATA, AND TOP PAGE DATA ARE FLIPPED

| | | | | | | | | | | | | | | | | | |
|---|---|---|---|---|---|---|---|---|---|---|---|---|---|---|---|---|---|
| Top   | 0 | 0 | 0 | 0 | 0 | 1 | 1 | 1 | 1 | 1 | 1 | 0 | 0 | 0 | 1 | 1 | 1 |
| Higher| 0 | 0 | 1 | 1 | 1 | 1 | 1 | 1 | 0 | 0 | 1 | 1 | 0 | 0 | 0 | 0 | 1 |
| Upper | 0 | 0 | 0 | 0 | 1 | 1 | 0 | 0 | 0 | 1 | 1 | 1 | 1 | 1 | 0 | 1 |
| Lower | 0 | 1 | 1 | 0 | 0 | 0 | 0 | 1 | 1 | 1 | 1 | 1 | 1 | 0 | 0 | 0 | 1 |

FIG.20

DATA TRANSLATION (XOR OPERATION)

| FIXED BIT PATTERN | BEFORE TRANSLATION | AFTER TRANSLATION |
|---|---|---|
| 0 | 0 | 0 |
| 1 | 0 | 1 |
| 0 | 1 | 1 |
| 1 | 1 | 0 |

FIG.21A

NO DATA TRANSLATION

| Page | DATA PATTERN | | | | | | | | FLAG |
|---|---|---|---|---|---|---|---|---|---|
| Upper | 1 | 1 | 0 | 1 | 0 | 1 | 1 | 0 | 0 |
| Lower | 1 | 0 | 1 | 0 | 0 | 1 | 0 | 1 | 0 |

FIG.21B

LOWER PAGE DATA IS TRANSLATED

| Upper | 1 | 1 | 0 | 1 | 0 | 1 | 1 | 0 | 0 |
|---|---|---|---|---|---|---|---|---|---|
| Lower | 0 | 0 | 1 | 1 | 1 | 0 | 0 | 1 | 1 |

FIG.21C

UPPER PAGE DATA IS TRANSLATED

| Upper | 0 | 1 | 0 | 0 | 1 | 0 | 1 | 0 | 1 |
|---|---|---|---|---|---|---|---|---|---|
| Lower | 1 | 0 | 1 | 0 | 0 | 1 | 0 | 1 | 0 |

FIG.21D

LOWER PAGE DATA AND UPPER PAGE DATA ARE TRANSLATED

| Upper | 0 | 1 | 0 | 0 | 1 | 0 | 1 | 0 | 1 |
|---|---|---|---|---|---|---|---|---|---|
| Lower | 0 | 0 | 1 | 1 | 1 | 0 | 0 | 1 | 1 |

FIG.21E

FIXED BIT PATTERN

| 1 | 0 | 0 | 1 | 1 | 1 | 0 | 0 |
|---|---|---|---|---|---|---|---|

FIG.22A NO DATA TRANSLATION

| Page | DATA PATTERN | FLAG |
|---|---|---|
| Upper | U | 00 |
| Lower | L | 00 |

FIG.22B TRANSLATE LOWER PAGE DATA USING X

| Upper | U | 00 |
|---|---|---|
| Lower | L⊕X | 01 |

FIG.22C TRANSLATE LOWER PAGE DATA USING Y

| Upper | U | 00 |
|---|---|---|
| Lower | L⊕Y | 10 |

FIG.22D TRANSLATE LOWER PAGE DATA USING Z

| Upper | U | 00 |
|---|---|---|
| Lower | L⊕Z | 11 |

⋮

FIG.22E TRANSLATE UPPER PAGE DATA AND LOWER PAGE DATA USING Z

| Upper | U⊕Z | 11 |
|---|---|---|
| Lower | L⊕Z | 11 |

} 16 KINDS

FIG.22F BIT PATTERN

| X |
|---|
| Y |
| Z |

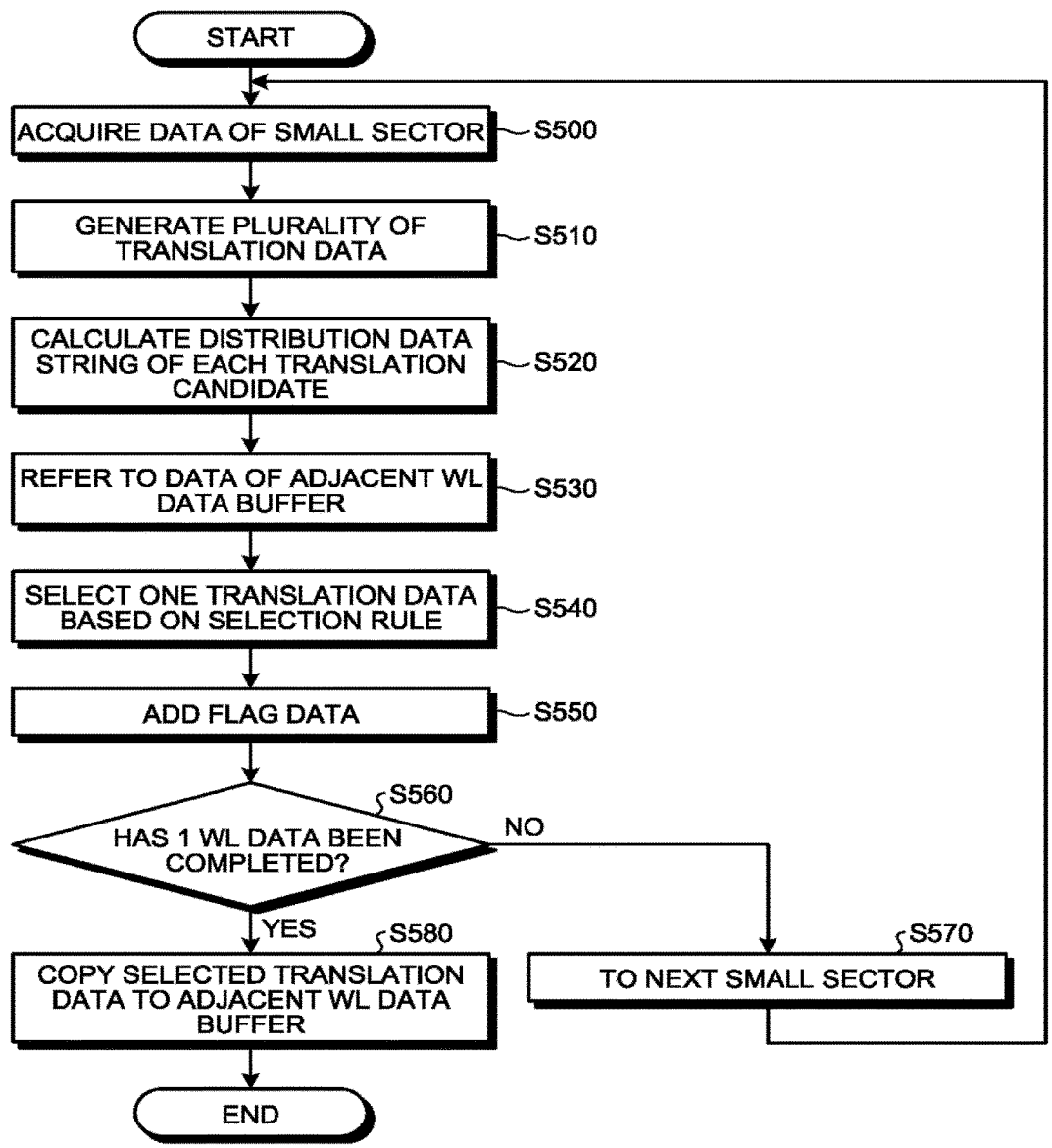

MEMORY SYSTEM

CROSS-REFERENCE TO RELATED APPLICATIONS

This application is based upon and claims the benefit of priority from U.S. Provisional Application No. 62/306,152, filed on Mar. 10, 2016; the entire contents of which are incorporated herein by reference.

FIELD

Embodiments described herein relate generally to a memory system including a nonvolatile memory.

BACKGROUND

In flash memories, in order to raise the frequency of appearance of a memory cell of which a threshold voltage distribution after writing is an erased state, the frequency of appearance of "1" between "1" and "0" included in a write data string is increased.

BRIEF DESCRIPTION OF THE DRAWINGS

FIG. 8 is a diagram that illustrates a relation between one-word line data and a small sector;

FIGS. 9A to 9D are diagrams that illustrate data coding corresponding to four data translations;

FIGS. 16A to 16H are diagrams that illustrate data coding corresponding to eight data translations;

FIGS. 19A to 19P are diagrams that illustrate data coding corresponding to 16 data translations;

FIG. 20 is a diagram that illustrates a data translation based on an exclusive operation;

FIGS. 21A to 21D are diagrams that illustrate an example of four data translations performed in a fourth embodiment, and FIG. 21E is a diagram that illustrates an example of a bit pattern;

FIGS. 22A to 22E are diagrams that illustrate a part of a plurality of data translations performed in a fifth embodiment, and FIG. 22F is a diagram that illustrates a plurality of bit patterns;

FIG. 23 is a flowchart that illustrates an example of a data translation (coding) process according to a sixth embodiment;

DETAILED DESCRIPTION

According to this embodiment, a memory system includes a nonvolatile memory and a controller. The nonvolatile memory includes a plurality of physical sectors. Each of the physical sectors includes a plurality of memory cells. Each of the memory cells can store data of m bits by using threshold voltage distributions of the m-th power of two. In each of the physical sectors, data of m pages is stored. Here, m is a natural number of one or more. The controller writes either processed data or preprocessing data and flags into each page included in the m pages. The processed data is data after performing a first data translation for write data to be written into a relevant page. The preprocessing data is data before performing the first data translation for the write data to be written into a relevant page. The flag represents at least whether or not the first data translation is performed for the write data to be written into the relevant page. The flags written into the each page are stored in a same memory cell.

Exemplary embodiments of memory systems will be explained below in detail with reference to the accompanying drawings. The present invention is not limited to the following embodiments.

(First Embodiment)

Figure 1:
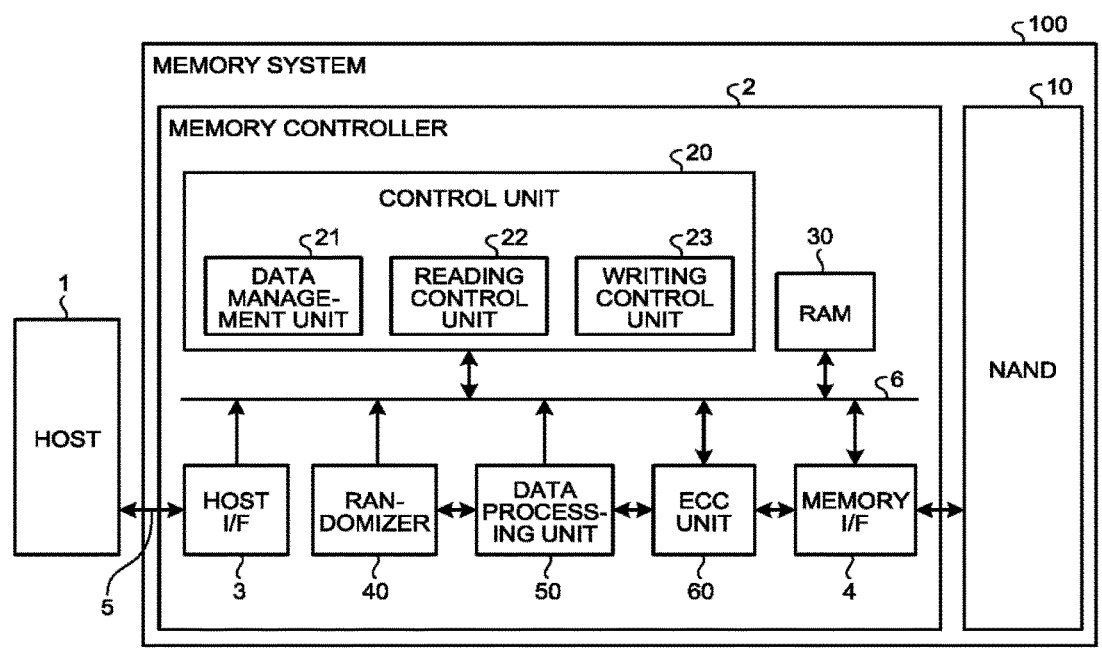
FIG. 1 is a functional block diagram that illustrates the internal configuration of a memory system according to an embodiment.

FIG. 1 is a block diagram that illustrates an example of the configuration of a memory system 100 according to a first embodiment. The memory system 100 is connected to a host apparatus (hereinafter, abbreviated as a host) through a communication line 5 and functions as an external storage device of the host 1. The host 1, for example, may be an information processing apparatus such as a personal computer, a mobile phone, or an imaging apparatus, may be a mobile terminal such as a tablet computer or a smart phone, a gaming device, or an in-vehicle terminal such as a car navigation system.

The memory system 100 includes: a NAND flash memory (hereinafter, abbreviated as a NAND) 10 as a nonvolatile memory; and a memory controller 2. The nonvolatile memory is not limited to the NAND flash memory but may be a flash memory having a three-dimensional structure, a resistance random access memory (ReRAM), a ferroelectric random access memory (FeRAM), a hard disk drive (HDD), or the like.

The NAND 10 includes one or more memory chips each including a memory cell array. The memory cell array includes a plurality of memory cells arranged in a matrix pattern. The memory cell array includes a plurality of blocks that are units for data erasing. Each block is configured by a plurality of physical sectors MS (see FIG. 2). The memory cell array that is a premise of this embodiment is not particularly limited to a specific configuration but may be a memory cell array having a two-dimensional structure as illustrated in FIG. 2, a memory cell array having a three-dimensional structure, or a memory cell array having any other structure.

Figure 2:
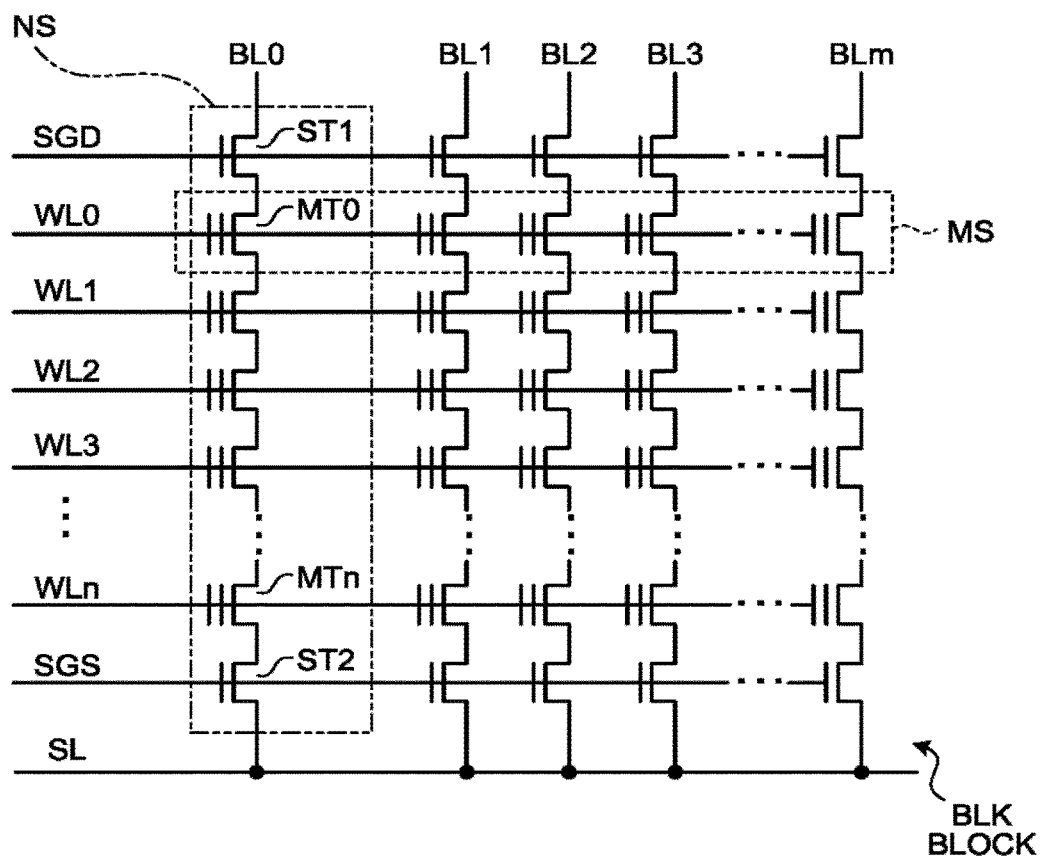
FIG. 2 is a diagram that illustrates an example of the configuration of a block of a memory cell array having a two-dimensional structure.

FIG. 2 is a diagram that illustrates an example of the configuration of a block of the memory cell array having a two-dimensional structure. FIG. 2 illustrates one of a plurality of blocks that configure the memory cell array having the two-dimensional structure. The other blocks of the memory cell array have the same configuration as that illustrated in FIG. 2. As illustrated in FIG. 2, the block BLK of the memory cell array includes (m+1) (here, m is an integer of "0" or more) NAND strings NS. Each NAND string NS shares a diffusion region (a source region or a drain region) between memory cell transistors MT adjacent to each other. Each NAND string NS includes: (n+1) (here, n is an integer of zero or more) memory cell transistors MT0 to MTn connected in series to share a diffusion area (a source region or a drain region) between memory cell transistors MT adjacent to each other; and selection transistors ST1 and ST2 arranged at both ends of the column of the (n+1) memory cell transistors MT0 to MTn.

Word lines WL0 to WLn are respectively connected to control gate electrodes of the memory cell transistors MT0 to MTn that configure the NAND string NS, and, memory cell transistors MTi (here, i=0 to n) included in each NAND string NS are connected to be common using the same word line WLi (here, i=0 to n). In other words, the control gate electrodes of the memory cell transistors MTi disposed in the same row within the block BLK are connected to the same word line WLi.

Each of the memory cell transistors MT0 to MTn is configured by a field effect transistor having a stacked gate structure on a semiconductor substrate. Here, the stacked gate structure includes: a charge storage layer (floating gate electrode) formed on the semiconductor substrate with a gate insulating film being interposed therebetween; and a control gate electrode formed on the charge storage layer with an inter-gate insulating film being interposed therebetween. A threshold voltage of each of the memory cell transistors MT0 to MTn changes according to the number of electrons storable in the floating gate electrode and thus, can store data according to a difference in the threshold voltage.

Bit lines BL0 to BLm are respectively connected to the drains of (m+1) selection transistors ST1 within one block BLK, and a selection gate line SGD is connected to be common to the gates of the selection transistors. In addition, the source of the selection transistor ST1 is connected to the drain of the memory cell transistor MT0. Similarly, a source line SL is connected to be common to the sources of the (m+1) selection transistors ST2 within one block BLK, and a selection gate line SGS is connected to be common to the gates of the selection transistors. In addition, the drain of the selection transistor ST2 is connected to the source of the memory cell transistor MTn.

Each memory cell is connected not only to the word line but also to the bit line. Each memory cell can be identified by using an address used for identifying a word line and an address used for identifying a bit line. As described above, the data of memory cells (the memory cell transistors MT) disposed within the same block BLK is erased altogether. On the other hand, data is written and read in units of physical sectors MS. One physical sector MS includes a plurality of memory cells connected to one word line.

Each memory cell can perform multi-value storage. In a case where the memory cells are operated in a single level cell (SLC) mode, one physical sector MS corresponds to one page. On the other hand, in a case where the memory cells are operated in a multi level cell (MLC) mode, one physical sector MS corresponds to N pages (here, N is a natural number of two or more). In descriptions presented here, the term MLC mode is assumed to include a triple level cell (TLC) mode of N=3 and a quadruple level cell (QLC) mode of N=4.

In a read operation and a program operation, one-word line is selected according to the physical address, and one physical sector MS is selected. A switching into a page within this physical sector MS is performed using the physical address.

Figure 3:
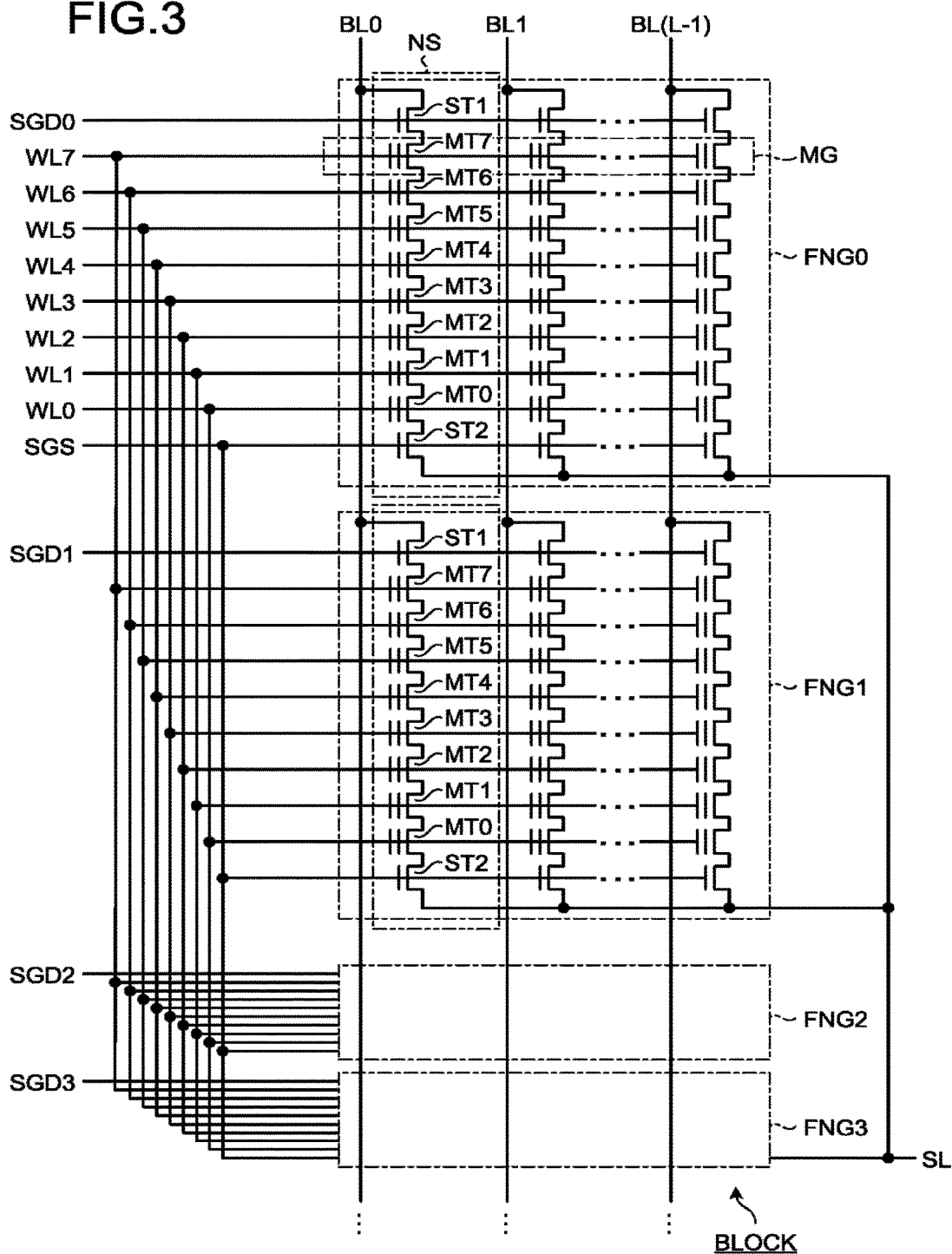
FIG. 3 is a diagram that illustrates an example of the configuration of a block of a memory cell array having a three-dimensional structure.

FIG. 3 is a diagram that illustrates an example of the configuration of a block of a memory cell array having a three-dimensional structure. FIG. 3 illustrates one block BLK0 among a plurality of blocks configuring the memory cell array having the three-dimensional structure. Another block of the memory cell array has a configuration similar to that illustrated in FIG. 3.

As illustrated in the figure, the block BLK0, for example, includes four fingers FNG (FNG0 to FNG3). In addition, each finger FNG includes a plurality of NAND strings NS. Each NAND string NS, for example, includes eight memory cell transistors MT (MT0 to MT7) and selection transistors ST1 and ST2. Here, the number of memory cell transistors MT is not limited to eight. The memory cell transistor MT is arranged between the selection transistors ST1 and ST2 such that the current paths thereof are connected in series. The current path of the memory cell transistor MT7 disposed on one end side of the series connection is connected to one end of the current path of the selection transistor ST1, and the current path of the memory cell transistor MT0 disposed on the other end side is connected to one end of the current path of the selection transistor ST2.

The gates of the selection transistors ST1 of the fingers FNG0 to FNG3 are commonly connected respectively to selection gate lines SGDO to SGD3. On the other hand, the gates of the selection transistors ST2 are commonly connected to the same selection gate line SGS among a plurality of fingers FNG. In addition, the control gates of the memory cell transistors MT0 to MT7 disposed inside a same block BLK0 are commonly connected to word lines WL0 to WL7. In other words, while the word lines WL0 to WL7 and the selection gate lines SGS are commonly connected among the plurality of fingers FNG0 to FNG3 disposed inside a same block BLK, the selection gate line SGD is independent for each of the fingers FNG0 to FNG3 also inside the same block BLK.

The word lines WL0 to WL7 are connected to the control gate electrodes of the memory cell transistors MT0 to MT7 configuring the NAND string NS, and the memory cell transistors MTi (i=0 to n) of each NAND string NS are commonly connected by a same word line WLi (i=0 to n). In other words, the control gate electrodes of the memory cell transistors MTi disposed in the same row disposed inside the block BLK are connected to a same word line WLi.

Each memory cell is connected to a word line and a bit line. Each memory cell can be identified by using an address used for identifying a word line and selection gate lines SGDO SGD3 and an address used for identifying a bit line. As described above, data of memory cells (memory cell transistors MT) disposed inside a same block BLK is erased together. On the other hand, data reading and data writing are performed in units of physical sectors MS. One physical sector MS is connected to one word line WL and includes a plurality of memory cells belonging to one finger FNG.

When a read operation or a program operation is performed, one-word line WL and one selection gate line SGD are selected according to a physical address, whereby a physical sector MS is selected.

Figure 4:
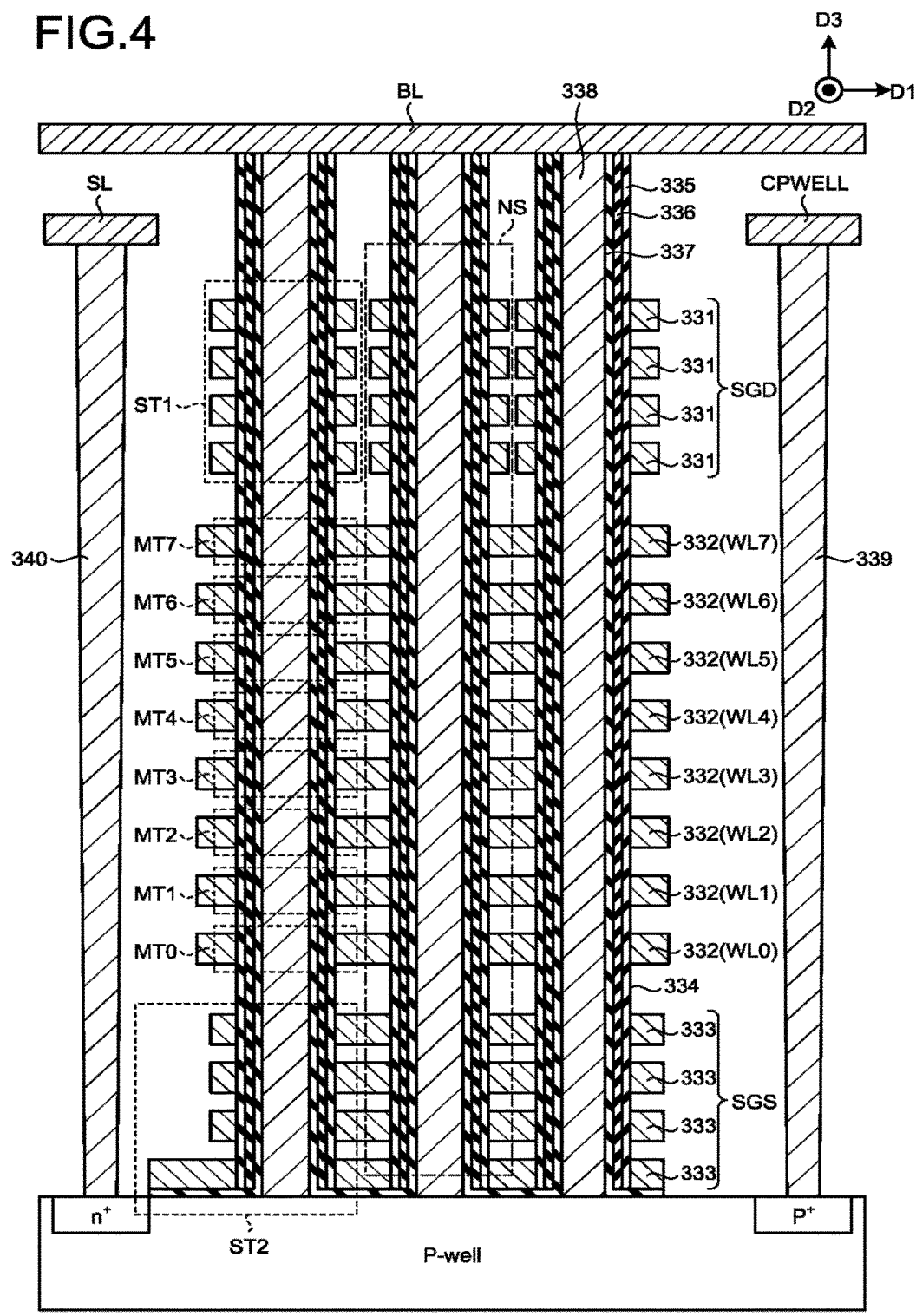
FIG. 4 is a cross-sectional view of a partial area of a memory cell array of a NAND memory having a three-dimensional structure.

FIG. 4 is a cross-sectional view of a partial area of a memory cell array of a NAND memory having a three-dimensional structure. As illustrated in FIG. 4, a plurality of NAND strings NS are formed on a P-well region. In other words, on the P-well region, a plurality of wiring layers 333 serving as selection gate lines SGS, a plurality of wiring layers 332 serving as word lines WL, and a plurality of wiring layers 331 serving as selection gate lines SGD are formed.

A memory hole 334 that arrives at the P-well region through such wiring layers 333, 332, and 331 is formed. On the side face of the memory hole 334, a block insulating film 335, an electric charge accumulating layer 336, and a gate insulating film 337 are sequentially formed, and a conductive film 338 is embedded inside the memory hole 334. The conductive film 338 functions as a current path of the NAND string NS and is an area in which a channel is formed when the memory cell transistors MT and the selection transistors ST1 and ST2 operate.

In each NAND string NS, on the P-well region, the selection transistor ST2, a plurality of the memory cell transistors MT, and the selection transistor ST1 are sequentially stacked. At the upper end of the conductive film 338, a wiring layer serving as a bit line BL is formed.

In addition, inside the front face of the P-well region, an n+ type impurity diffusion layer and a p+ type impurity diffusion layer are formed. On the n+ type impurity diffusion layer, a contact plug 340 is formed, and a wiring layer serving as a source line SL is formed on the contact plug 340. In addition, on the p+ type impurity diffusion layer, a contact plug 339 is formed, and a wiring layer serving as a well wiring CPWELL is formed on the contact plug 339.

A plurality of the configurations illustrated in FIG. 4 are arranged in a depth direction of the paper face of FIG. 4, and one finger FNG is formed by a set of a plurality of NAND strings aligned in one line in the depth direction.

In the configuration illustrated in FIG. 1, in the NAND 10, user data transmitted from the host 1, management information of the memory system 100, firmware (not illustrated in the drawing), and the like are stored. The firmware operates a CPU (not illustrated in the drawing) that realizes at least a part of the function of the control unit 20 of the memory controller 2. The firmware may be stored in a ROM not illustrated in the drawing. The management information includes a logical/physical translation table and the like.

The memory controller 2 includes: a host interface 3; a memory interface 4; a control unit 20; a RAM 30; a randomizer 40; a data processing unit 50; and an ECC unit 60. In this embodiment, while the RAM 30 is arranged inside the memory controller 2, the RAM 30 may be disposed outside the memory controller 2. The host I/F 3 performs a process according to the specification of an interface with the host 1 and outputs a command, user data (write data), and the like received from the host 1 to an internal bus 6. In addition, the host I/F 3 transmits user data read from the NAND 10, a response from the control unit 20, and the like to the host 1. The memory I/F 4 directly controls the NAND 10 based on an instruction from the control unit 20.

The RAM 30 is a volatile semiconductor memory that can be accessed at a speed higher than that of the NAND 10. The RAM 30 includes a storage area as a data buffer. Data received from the host 1 is temporarily stored in the RAM 30 before being written into the NAND 10. Data read from the NAND 10 is temporarily stored in the RAM 30 before the transmission thereof to the host 1. The management information stored in the NAND 10 is loaded into the RAM 30. The management information loaded into the RAM 30 is backed up in the NAND 10. The RAM 30 functions also as a buffer in which firmware stored in the NAND 10 is loaded. As the RAM 30, a static random access memory (SRAM) or a dynamic random access memory (DRAM) is used.

The control unit 20 integrally controls each constituent element of the memory system 100. The control unit 20 includes: a data management unit 21; a reading control unit 22; and a writing control unit 23. The function of the control unit 20 is realized by one or a plurality of CPUs (processors) executing the firmware loaded in the RAM 30 and peripheral circuits thereof. The function of the data management unit 21 is realized by the CPU and/or hardware executing the firmware. The function of the reading control unit 22 is realized by the CPU and/or hardware executing the firmware. The function of the writing control unit 23 is realized by the CPU and/or hardware executing the firmware.

The data management unit 21 manages the user data by using the logical/physical translation table that is one of the above-described management information loaded in the RAM 30. In the logical/physical translation table, mapping associating a logical address used by the host 1 and a physical address of the RAM 30 or the NAND 10 with each other is registered. For the logical address, for example, logical block addressing (LBA) is used. The physical address represents a storage position on the RAM 30 or the NAND 10 in which data is stored.

The writing control unit 23 performs a process for writing data into the NAND 10 in accordance with a write command that is notified from the host 1 through the host I/F 3. For example, in a case where a write request is received from the host 1, the writing control unit 23 acquires a physical position on the NAND 10 that is used for writing data from the data management unit 21 and outputs the physical position and a code word output from the ECC unit 60 to the memory I/F 4.

The reading control unit 22 performs a control process for reading data from the NAND 10 in accordance with a read command notified from the host 1 through the host I/F 3. For example, the reading control unit 22 acquires a physical position on the NAND 10 that corresponds to a logical address of read data from the data management unit 21 and notifies the physical position to the memory I/F 4.

The randomizer 40 randomizes data written into the NAND 10. In addition, the randomizer 40 de-randomizes data read from the NAND 10. The function of the randomizer 40 is realized by a CPU and/or hardware executing firmware. The randomizer 40 randomizes input data such that the frequency of appearance of "0" and the frequency of appearance of "1" are the same. The randomized data is input to the data processing unit 50. Here, the randomizer 40 may be removed from the memory controller 2.

The data processing unit 50, for example, performs a certain data translation process for data input from the randomizer. Details of the data translation performed by the data processing unit 50 will be described later. The function of the data processing unit 50 is realized by a CPU and/or hardware executing firmware. The data processing unit 50 inputs the translated data to the ECC unit 60.

The ECC unit 60 performs an error correction coding process for data transmitted from the data processing unit 50, thereby generating a parity. The ECC unit 60 outputs a code word including the data and the parity to the memory I/F 4. The memory I/F 4 inputs a code word read from the NAND 10 to the ECC unit 60. The ECC unit 60 performs an error correction decoding process by using the input code word and inputs decoded data to the data processing unit 50. The function of the ECC unit 60 is realized by a CPU and/or hardware executing firmware.

As a coding system used by the ECC unit 60, any system may be used. For example, reed Solomon (RS) coding, Bose Chaudhuri Hocquenghem coding, low density parity check coding, or the like may be used.

In a case where a write request is received from the host 1, the memory system 100 operates as follows. The writing control unit 23 temporarily stores write data into the RAM 30. The writing control unit 23 reads data stored in the RAM 30 and inputs the read data to the randomizer 40. The randomizer 40 randomizes the input data and inputs the randomized data to the data processing unit 50. The data processing unit 50 translates the randomized data and inputs data after the translation and a flag representing the translation content to the ECC unit 60. The ECC unit 60 codes the data and the flag that have been input and inputs a code word to the memory I/F 4. The memory I/F 4 writes the input code word into the NAND 10.

In a case where a read request is received from the host 1, the memory system 100 operates as below. The memory I/F 4 inputs the code word read from the NAND 10 to the ECC unit 60. The ECC unit 60 decodes the input code word and inputs decoded data to the data processing unit 50. The data processing unit 50 performs an inverse translation of the translation made at the time of writing data and inputs data after the translation to the randomizer 40. The randomizer 40 de-randomizes the input data and stores de-randomized data into the RAM 30. The reading control unit 22 transmits the data stored in the RAM 30 to the host 1 through the host I/F 3.

Figure 5:
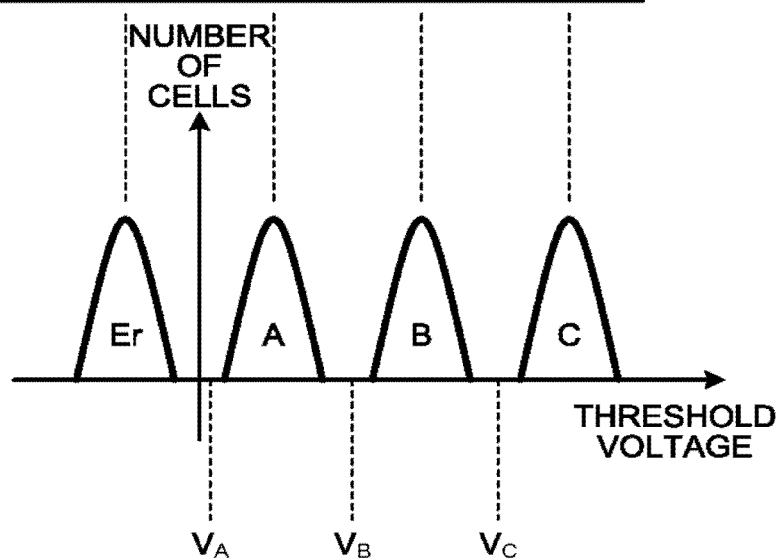
FIG. 5 is a diagram that illustrates an example of a threshold voltage distribution and data coding of memory cells of two bits/cell.

FIG. 5 is a diagram that illustrates an example of a threshold voltage distribution and data coding of memory cells that are two-bits/cell. In a lower diagram of FIG. 5, the horizontal axis represents a threshold voltage, and the vertical axis represents the number of memory cells. In the case of memory cells that are two-bits/cell, four distributions formed by a distribution Er, a distribution A, a distribution B, and a distribution C are included. The distribution Er has a lowest threshold voltage and corresponds to a threshold voltage distribution of an erased state. The threshold voltage is higher in order of distributions A, B, and C. Thus, the distribution C has a highest threshold voltage. In a case where memory cells that are two-bits/cell are used, data values of two bits are associated with the four threshold voltage distributions Er, A, B, and C. Such association is called data coding. The data coding is determined in advance, and, at the time of writing (programming) data, electric charge is injected into memory cells such that a threshold voltage distribution corresponding to a data value stored in accordance with data coding is formed. In a case where two-bits/cell are used, one physical sector corresponds to two pages. Two bits that can be stored in each memory cell correspond to these two pages. In this embodiment, these two pages will be referred to as a lower page and an upper page.

In FIG. 5, an upper diagram is a diagram that illustrates data coding. As illustrated in the upper diagram in FIG. 5, a distribution Er corresponds to a data value of "11", a distribution A corresponds to a data value of "01", a distribution B corresponds to a data value of "00", and a distribution C corresponds to a data value of "10". In this embodiment, when data of the upper page is denoted by Du, and data of the lower page is denoted by Dl, the data value of two bits will be denoted as "DuDl". The data coding illustrated in FIG. 5 is an example, and the data coding is not limited to the example illustrated in FIG. 5. A reading voltage VA is set between the distribution Er and the distribution A, a reading voltage VB is set between the distribution A and the distribution B, and a reading voltage VC is set between the distribution B and the distribution C. Here, VB is a reading voltage used for determining the data value of the lower page, and VA and VC are reading voltages used for determining the data value of the upper page.

In a flash memory, as a transition between a written state (the distributions A, B, and C) and an erased state (the distribution Er) is repeated more, the number of electrons passing through an oxide film of a memory cell increases, whereby the degree of wear becomes higher. In addition, as a writing operation is performed for the distribution C having a higher threshold voltage, interference given to an adjacent memory cell increases, and a probability of causing a read error increases. In order to alleviate such a phenomenon, a process for increasing the frequency of appearance of "1" included in a write data string through a data translation is performed. In such a technique, "1" in the case of a single level cell (SLC) or "11" in the case of a multi level cell (MLC) correspond to a threshold voltage distribution of the erased state, and accordingly, by increasing the frequency of appearance of "1", the frequency of appearance of a memory cell of which the threshold voltage distribution after writing is in the erased state (the distribution Er) is increased.

Figure 6:
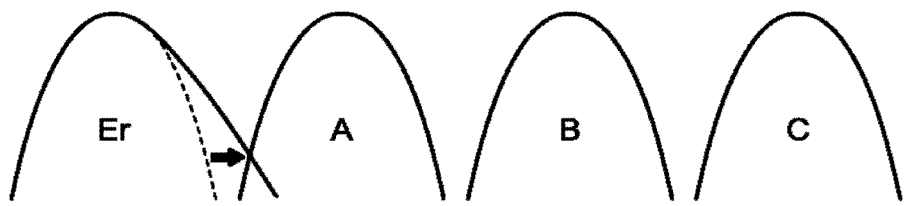
FIG. 6 is a diagram that illustrates an E to A phenomenon.

However, according to a technique for increasing the probability of appearance of the distribution Er to be more than those of the other distributions A, B, and C, in a case where the micronization of a memory further progresses, it is difficult to respond to the following phenomenon. The phenomenon is interference between adjacent cells that occurs due to an increase in a leakage current accompanied with the micronization of cells or a decrease in the increase rate of recording prohibition electric potential in a memory cell channel at the time of writing data. The interference between adjacent cells is a phenomenon in which capacitive coupling occurs between the adjacent cells when there is a big difference between threshold voltages of the adjacent cells, and a threshold voltage of a cell having a lower threshold voltage is increased. In a case where the threshold voltage levels of the adjacent cells are equivalent to maximum-minimum-maximum or minimum-maximum-minimum, the influence thereof is the highest. In case of two bits/cell, in a case where the distribution is equivalent to the distribution C—the distribution E—the distribution C (hereinafter, abbreviated as C-E-C) or the distribution E—the distribution C—the distribution E (hereinafter, abbreviated as E-C-E), the influence thereof is the highest. According to the interference between the adjacent cells, as illustrated in FIG. 6, the threshold voltage of the memory cell of the distribution Er increases up to the distribution A as the threshold voltage distribution becomes closer to the distribution Er, and, as a result, there are cases where an erroneous data value is read at the time of reading data. Hereinafter, this phenomenon will be referred to as an E to A phenomenon.

Figure 7:
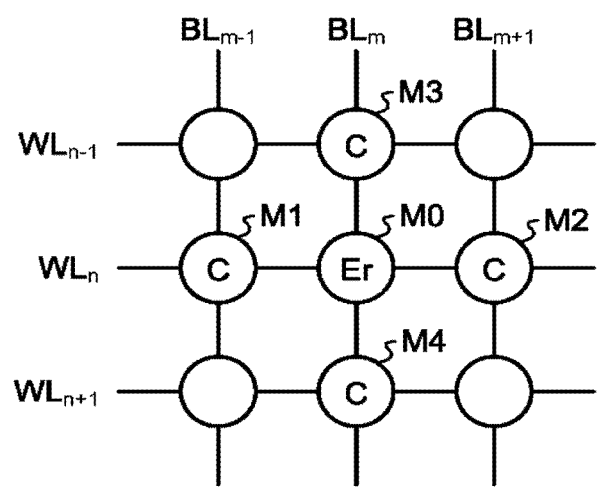
FIG. 7 is a diagram that illustrates the arrangement pattern of threshold voltage distributions of adjacent cells for which the E to A phenomenon is degraded.

FIG. 7 illustrates an example of the arrangement pattern of a threshold voltage distribution of adjacent cells for which the E to A phenomenon is degraded the most. The threshold voltage of the A memory cell M0 illustrated in FIG. 7 belongs to the lowest distribution Er. The memory cell M0 receives influences from adjacent cells M1 and M2 that are adjacent thereto in the direction of the word line and adjacent cells M3 and M4 that are adjacent thereto in the direction of the bit line. The threshold voltages of all the adjacent cells M1, M2, M3, and M4 belong to the distribution C having a highest threshold voltage, and the memory cell M0 is surrounded by the adjacent cells M1, M2, M3, and M4 belonging to the distribution C.

As a countermeasure for such an E to A phenomenon, it is known to perform a lossless translation (coding) of write data based on a certain rule such that a distribution pattern such as C-E-C or the like for which a reading error easily occurs is not generated. In this technique, a data translation accompanying data decompression having write data for all the pages assigned to one physical sector MS as its input is performed, and write data to be stored in each page is generated. In addition, an inverse data translation having read data supplied from all the pages assigned to a physical sector MS as its input is performed, and read data of each page is restored. For example, in case of a memory cell of two bits/cell, data written into a lower page is generated through a data translation having lower page data and upper page data as its input, and data written into an upper page is generated through a data translation having the lower page data and the upper page data as its input. In addition, the lower page data is generated through an inverse data translation having data read from the lower page and the upper page as its input, and the upper page data is generated through an inverse data translation having data read from the lower page and the upper page as its input.

According to this technique, not only at the time of writing data but also at the time of reading data, a data translation is performed using data of all the pages assigned to one physical sector MS. For this reason, it takes time for the inverse data translation process at the time of reading data, causing a reading delay. In addition, the size of data after the data translation increases, and the data length changes, whereby the processing cost increases.

Thus, in this embodiment, while a data translation is performed using data of all the pages assigned to a physical sector MS at the time of writing data, a data inverse translation is performed using data of only a page that is a reading target at the time of reading data. For this reason, in this embodiment, flag data representing the content of the data translation is added to each page data and is stored in the NAND 10. In addition, a data translation for configuring an input data length before the data translation and an output data length after the data translation to be the same except for the flag data is performed.

The data processing unit 50 illustrated in FIG. 1 will be described. In the first embodiment, a case in which two-bit data is recorded into one memory cell will be described. FIG. 8 is a diagram that illustrates a management unit of a data translation performed by the data processing unit 50. Data of N pages stored in one physical sector MS will be referred to as word line data (hereinafter, abbreviated as WL data). In case of two bits/cell, 1 WL data includes lower page data and upper page data. The 1 WL data is divided into a plurality of small sectors having a certain data length. In other words, one physical sector MS includes a plurality of small sectors. One small sector includes a plurality of memory cells. Data stored in a small sector will be referred to as small sector data. One small sector data is configured by data having a predetermined data length included in the lower page data and data having a predetermined data length included in the upper page data. One small sector data is a unit for a data translation performed by the data processing unit 50.

In the first embodiment, the data processing unit 50 performs a flipping process in which input data "0" input from the randomizer 40 is inverted to "1", and input data "1" is inverted to "0". The data processing unit 50 includes a buffer memory (not illustrated in the drawing) that buffers lower page data or upper page data input from the randomizer 40 and performs a data translation process in a stage in which data of at least one small sector among 1 WL data is prepared. The process performed by the data processing unit 50 is largely divided into a first stage and a second stage. In the first stage, four data translations are performed, and four data translation candidates are generated. The four data translations include: a first data translation that does not perform a flipping process for input data input from the randomizer 40; a second data translation that performs a flipping process only for the lower page data of the input data; a third data translation that performs a flipping process only for the upper page data of the input data; and a fourth data translation that performs a flipping process for the lower page data and the upper page data of the input data. The four data translations correspond to a four-value memory cell. In the second stage, based on a predetermined selection rule, one data translation candidate is selected from among the four data translation candidates described above, and the selected data translation candidate is output together with a flag used for identifying the content of the data translation.

FIGS. 9A to 9D are diagrams that illustrate data coding corresponding to four data translations performed by the data processing unit 50. FIG. 9A illustrates threshold voltage distributions Er, A, B, and C of a memory cell of two bits/cell and data coding at the time of not performing a data translation, in other words, not performing a flip. In addition, on the right side of FIG. 9A, flags "00" respectively added to the upper page data and the lower page data at the time of not performing a flip are illustrated. FIG. 9B illustrates data coding when only the lower page data among the data coding illustrated in FIG. 9A is flipped. In addition, on the right side of FIG. 9B, flags "01" respectively added to the upper page data and the lower page data at the time of performing a flip only for the lower page data are illustrated. FIG. 9C illustrates data coding when only the upper page data among the data coding illustrated in FIG. 9A is flipped. In addition, on the right side of FIG. 9C, flags "10" respectively added to the upper page data and the lower page data at the time of performing a flip only for the upper page data are illustrated. FIG. 9D illustrates data coding when the lower page data and the upper page data among the data coding illustrated in FIG. 9A are flipped. In addition, on the right side of FIG. 9D, flags "11" respectively added to the upper page data and the lower page data at the time of performing a flip for the upper page data and the lower page data are illustrated.

As illustrated in FIG. 9A, when flipping is not performed, a flag "0" is added to the lower page data, and a flag "0" is added to the upper page data. In the case illustrated in FIG. 9B, compared to the case illustrated in FIG. 9A, the distribution Er and the distribution C are interchanged, and the distribution A and the distribution B are interchanged. As illustrated in FIG. 9B, when only the lower page data is flipped, a flag "1" is added to the lower page data, and a flag "0" is added to the upper page data. In the case illustrated in FIG. 9C, compared to the case illustrated in FIG. 9A, the distribution Er and the distribution A are interchanged, and the distribution B and the distribution C are interchanged. As illustrated in FIG. 9C, when only the upper page data is flipped, a flag "0" is added to the lower page data, and a flag "1" is added to the upper page data. In the case illustrated in FIG. 9D, compared to the case illustrated in FIG. 9A, the distribution Er and the distribution B are interchanged, and the distribution A and the distribution C are interchanged. As illustrated in FIG. 9D, when the upper page data and the lower page data are flipped, a flag "1" is added to the lower page data, and a flag "1" is added to the upper page data.

Figure 10:
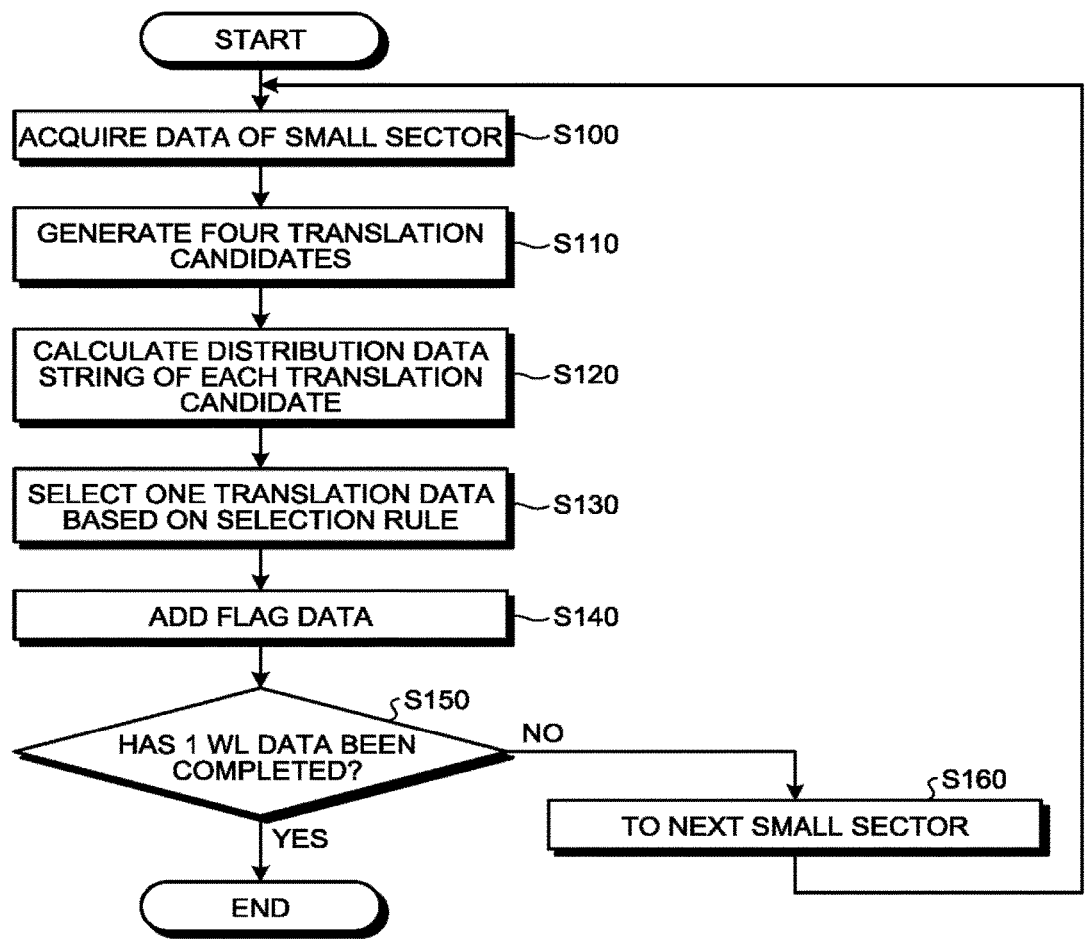
FIG. 10 is a flowchart that illustrates an example of a data translation (coding) process according to a first embodiment.

Hereinafter, the data translation process at the time of performing coding that is performed by the data processing unit 50 will be described with reference to a flowchart illustrated in FIG. 10. The data processing unit 50 acquires data of one small sector illustrated in FIG. 8 from lower page data and upper page data included in 1 WL data (Step S100). The data processing unit 50 generates four data translation candidates by performing the above-described four data translations illustrated in FIGS. 9A to 9D for the data of the small sector (Step S110). The data processing unit 50 generates a distribution data string in which a memory cell number and a threshold voltage distribution are associated for each generated data translation candidate and stores the distribution data string (Step S120). The memory cell number is a number of a memory cell that is attached in correspondence with the bit line position (BL0, BL1, . . . ) described above. For example, in a case where the data string of the small sector is "00", "01", "10", "11", . . . as a result of the data translation, a distribution data string in which the distribution B, the distribution A, the distribution C, the distribution Er, . . . and memory cell numbers are associated with each other is stored.

Next, the data processing unit 50 selects one from among the generated four data translation candidates (Step S130). An example of the selection rule will be described. In the first embodiment, one is selected from among the four data translation candidates based on the following selection rule.

(1) A translation candidate having a smallest number of positions at which the distribution Er and the distribution C are adjacent to each other is selected. In other words, a translation candidate having a smallest number of adjacent data patterns for which the E to A error easily occurs is selected.

(2) In a case where there are a plurality of translation candidates satisfying the condition of "(1)", a translation candidate having a largest number of the distributions Er is selected. In other words, a translation candidate having a lowest degree of fatigue given to the cell is selected.

However, this selection rule is merely an example, and any other arbitrary selection rule may be employed. For example, in order to further decrease the degree of fatigue given to the cell, selecting a translation candidate having less distributions C having a highest threshold voltage may be set as the first condition of the selection rule described above. In other words, it is important to select one from among a plurality of candidates that has the best condition, and the content of the selection rule may be changed into various forms in accordance with the characteristics of a target memory.

Next, the data processing unit 50 adds the flag representing at least whether or not a data translation has been performed to one translation candidate that has been selected (Step S140). In other words, the data processing unit 50 adds a flag of one bit, which is used for identifying the data translation content of lower page data, to the lower page data configured in units of small sectors acquired through one translation that has been selected and adds a flag of one bit, which is used for identifying the data translation content of upper page data, to the upper page data configured in units of small sectors acquired through one translation that has been selected.

Figure 11A:
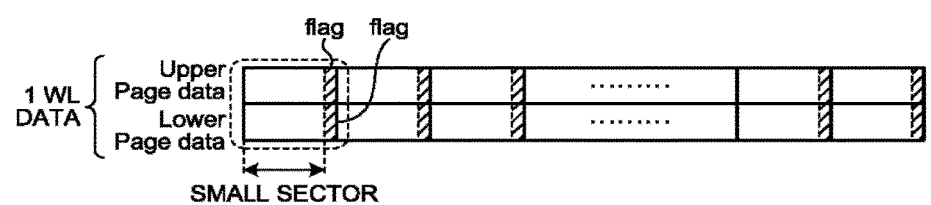
FIGS. 11A and 11B are diagrams that illustrate examples of the arrangement relation between data of small sectors and flags.
Figure 11B:
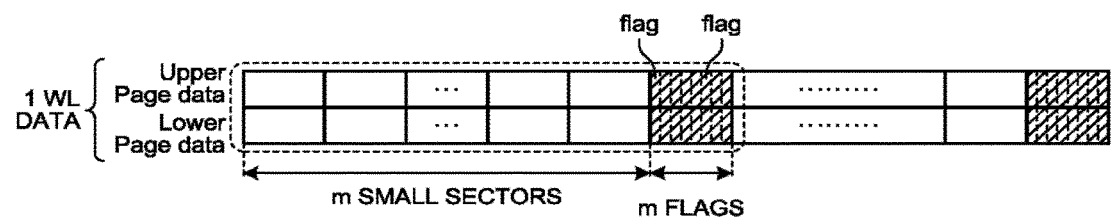

FIGS. 11A and 11B are diagrams that illustrate examples of the arrangement relation between data of small sectors and flags. In the diagrams, flag data is represented as a rectangle to which hatching is applied. As illustrated in FIGS. 11A and 11B, to upper page data included in data of one small sector, a flag of one bit used for identifying the data translation content of the upper page data is added, and, to lower page data included in data of one small sector, a flag of one bit used for identifying the data translation content of the lower page data is added. In the example illustrated in FIG. 11A, a flag is inserted to the end of the data of each small sector so as to be adjacent to the data of each one small sector. In other words, a flag is added following the data of a small sector. Accordingly, in the case of FIG. 11A, small sector data and flag data of one bit are alternately stored in a physical sector MS. In the example illustrated in FIG. 11B, a plurality of flags corresponding to a plurality of (m) small sectors are continuously arranged at one place. In other words, a plurality of flags corresponding to a plurality of small sectors are continuously arranged after the data of the plurality of small sectors. Accordingly, in the case of FIG. 11B, m small sector data and m flag data are alternately stored in a physical sector MS.

As illustrated in FIGS. 9A to 9D, when a flipping process is not performed for upper page data included in the data of a small sector, a flag "0" is added to the upper page data included in the data of the small sector. On the other hand, when a flipping process is performed for upper page data included in the data of a small sector, a flag "1" is added to the upper page data included in the data of the small sector. Accordingly, by determining whether a flag added to upper page data included in the data of a small sector is "0" or "1", it can be determined whether or not a flipping process has been performed for the upper page data included in the data of the small sector. Similarly, when a flipping process is not performed for lower page data included in the data of a small sector, a flag "0" is added to the lower page data included in the data of the small sector. On the other hand, when a flipping process is performed for lower page data included in the data of a small sector, a flag "1" is added to the lower page data included in the data of the small sector. Accordingly, by determining whether a flag added to lower page data included in the data of a small sector is "0" or "1", it can be determined whether or not a flipping process has been performed for the lower page data included in the data of the small sector.

Next, the data processing unit 50 determines whether or not translation processes corresponding to 1 WL data have been ended (Step S150). In a case where the processes have not been ended, the translation target is set to the data of a next small sector (Step S160), and a similar translation process is performed for the data of the next small sector (Steps S100 to S140). In this way, the translation process described above is performed for the data of all the small sectors included in 1 WL data. The data of the small sectors after the translations including flag data is input to the ECC unit 60.

Figure 12:
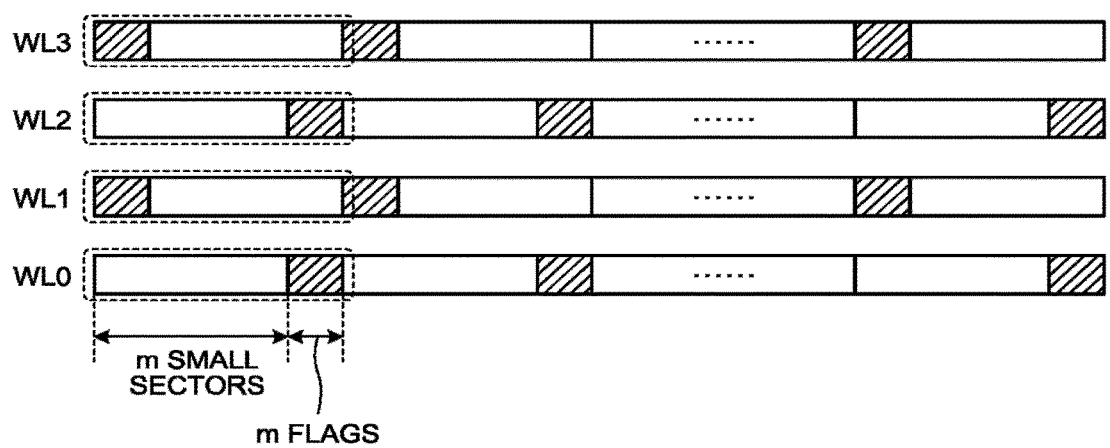
FIG. 12 is a diagram that illustrates an example of an arrangement relation between data of small sectors and flags in a plurality of word line data.

Here, in a case where data before a translation, which is input to the data processing unit 50, has a random pattern, flag data is predicted to be random data. As illustrated in FIG. 11B, in a case where the flag data is arranged together, there is a possibility that a pattern of C-E-C or E-C-E is generated at the place at which the flag data is arranged together. Thus, in order to suppress the generation of the pattern C-E-C or E-C-E among physical sectors adjacent in the word line direction, as illustrated in FIG. 12, a cell position at which the flag data is arranged may be shifted for each word line. In the case illustrated in FIG. 12, in case of WL data having an odd word line number, a plurality of flag data is arranged at the end of a small sector, and, in case of WL data having an even word line number, a plurality of flag data is arranged at the start of a small sector. While the cell position at which the flag data is arranged may be configured to be different for each word line, as illustrated in FIG. 12, the cell positions at which the flag data is arranged may be configured to be different at least between word lines adjacent to each other.

Figure 13:
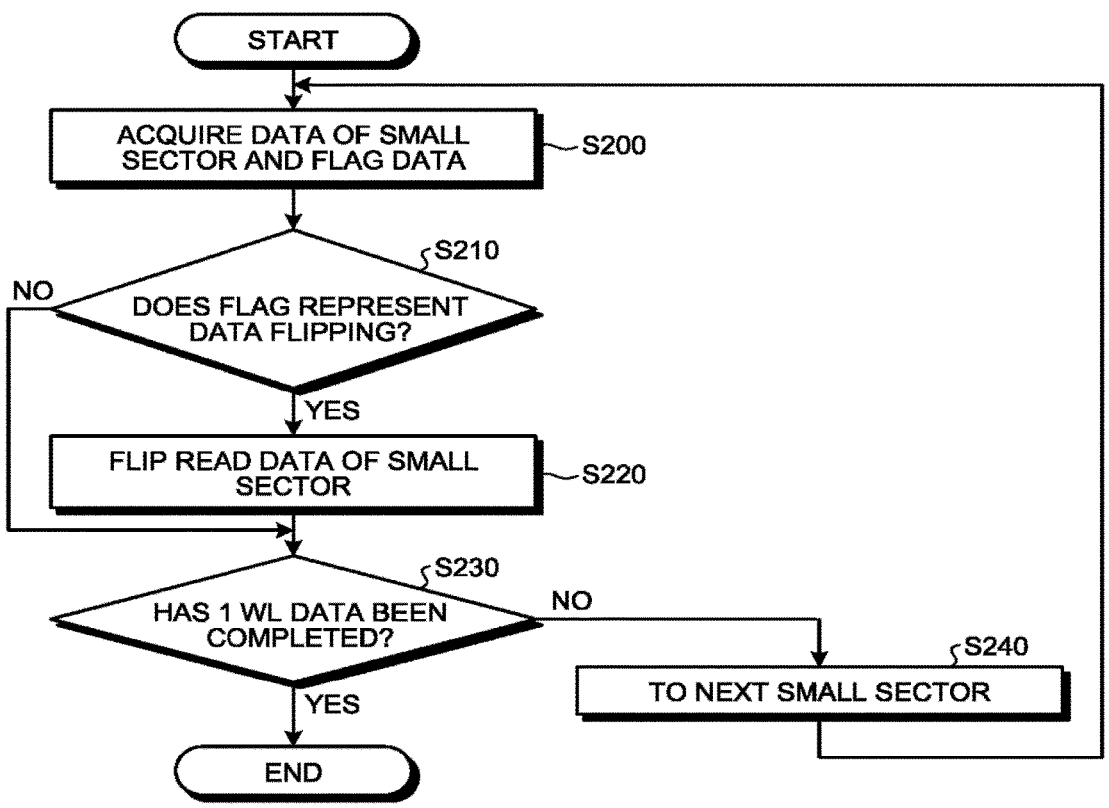
FIG. 13 is a flowchart that illustrates an example of an inverse data translation (decoding) process according to the first embodiment.

Next, a data inverse translation process at the time of decoding that is performed by the data processing unit 50 will be described with reference to a flowchart illustrated in FIG. 13. At the time of decoding, a sequence opposite to that at the time of coding is performed. At the time of coding, a translation process is performed based on 1 WL data. However, at the time of decoding, an inverse translation process is performed by using only data stored in a page in which reading target data is included. In other words, in a case where a reading target page is a lower page, an inverse translation process is performed using only data stored in the lower page, and, in a case where a reading target page is an upper page, an inverse translation process is performed using only data stored in the upper page.

The data processing unit 50 acquires data of one small sector and flag data corresponding to the data of the small sector from reading target page data input from the ECC unit 60 (Step S200). The data processing unit 50 determines whether this flag data is "0" or "1" and determines whether or not the data of the small sector is flipping-processed (Step S210). In a case where the flag represents that the flipping process is performed, the data processing unit 50 flips the data of the small sector (Step S220). The flipped data of the small sector is input to the randomizer 40. Then, the flag data is removed. On the other hand, in a case where the flag represents that the flipping process is not performed, the data processing unit 50 inputs the data of the small sector that has not been flipped to the randomizer 40 without flipping the data of the small sector. Next, the data processing unit 50 determined whether or not the inverse translation process corresponding to one-page data has been ended (Step S230). In a case where the translation process has not been ended, data of a next small sector is set as an inverse translation target (Step S240), and a similar inverse translation process is performed for the data of the next small sector (Steps S200 to S220). In this way, the inverse translation process described above is performed for the data of all the small sectors included in the one-page data. The page data after the inverse translation is input to the randomizer 40.

In the embodiment described above, while the data translation performed by the data processing unit 50 is performed in units of small sectors, the data translation may be configured to be performed in units of page data included in 1 WL data. In such a case, a flag of one bit is added to lower page data corresponding to one page, and a flag of one bit is added to upper page data corresponding to one page. In addition, the process according to the first embodiment may be applied to SLC recording in which recording of data of one bit is performed for one memory cell.

In this way, according to the first embodiment, flag data representing whether or not a data translation is performed is added to each page data. For this reason, at the time of reading data, a data inverse translation can be performed using only its own page data, and accordingly, a short delay time at the time of reading data can be realized. In addition, since there is no change in the data length before and after the data translation except for the flag part, an increase in the control cost can be suppressed. Furthermore, data translation candidates of the square of two are generated based on write data of two pages included in 1 WL, and one is selected from among the data translation candidates of the square of two based on a certain selection rule. Accordingly, a translation process that is more effective for the E to A error and the like can be reliably selected.

(Second Embodiment)

Figure 14:
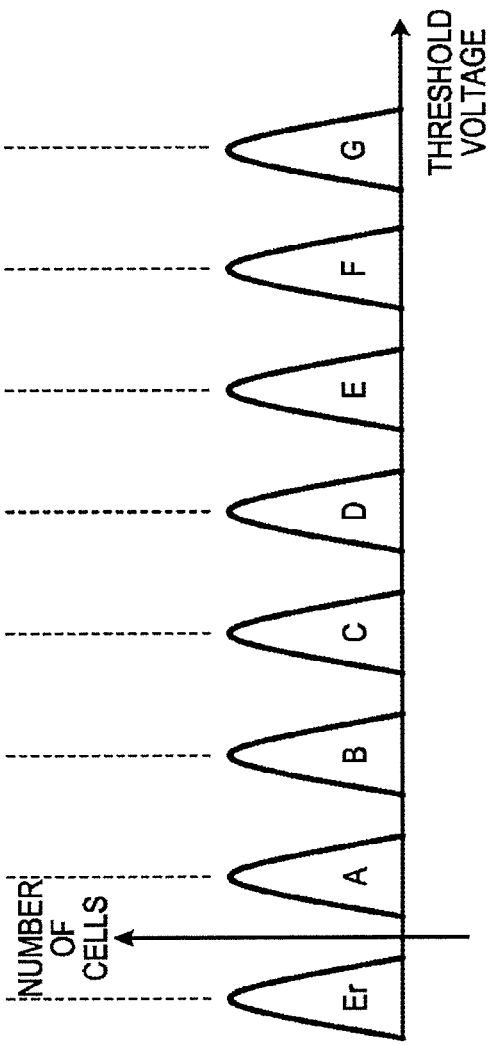
FIG. 14 is a diagram that illustrates an example of threshold voltage distributions and data coding of memory cells of three bits/cell.

In a second embodiment, a data translation for memory cells that are three-bits/cell will be described. FIG. 14 is a diagram that illustrates an example of threshold voltage distributions and data coding of memory cells of three bits/cell. As illustrated in a lower diagram of FIG. 14, in the case of memory cells that are three-bits/cell, there are eight distributions formed by a distribution Er, a distribution A, a distribution B, a distribution C, a distribution D, a distribution E, a distribution F, and a distribution G. The distribution Er has a lowest threshold voltage and corresponds to a threshold voltage distribution of the erased state. The threshold voltage is higher in order of the distributions A, B, C, D, E, F, and G. The distribution G has a highest threshold voltage.

Accordingly, in the case of memory cells that are three-bits/cell, a state in which the memory cell M0 illustrated in FIG. 7 is surrounded by adjacent cells M1, M2, M3, and M4 belonging to the distribution G becomes one of arrangement patterns of the threshold voltage distribution for which the E to A phenomenon is degraded the most. In a case where the memory cells that are three-bits/cell are used, data values of three bits are respectively associated with the eight threshold distributions Er, A, B, C, D, E, F, and G. In the case where three-bits/cell are used, one physical sector corresponds to three pages. Three bits that can be stored in each memory cell correspond to the three pages. In this embodiment, these three pages will be referred to as a lower page, a middle page, and an upper page.

An upper diagram of FIG. 14 is a diagram that illustrates an example of data coding. As illustrated in the upper diagram of FIG. 14, the distribution Er corresponds to a data value of "111", the distribution A corresponds to a data value of "110", the distribution B corresponds to a data value of "100", the distribution C corresponds to a data value of "000", the distribution D corresponds to a data value of "010", the distribution E corresponds to a data value of "011", the distribution F corresponds to a data value of "001", and the distribution G corresponds to a data value of "101". In this embodiment, when data of an upper page is denoted by Du, data of a middle page is denoted by Dm, and data of a lower page is denoted by Dl, the data value of three bits will be denoted as "DuDmDl". The data coding illustrated in FIG. 14 is an example, and thus, the data coding is not limited to the example illustrated in FIG. 14.

Figure 15:
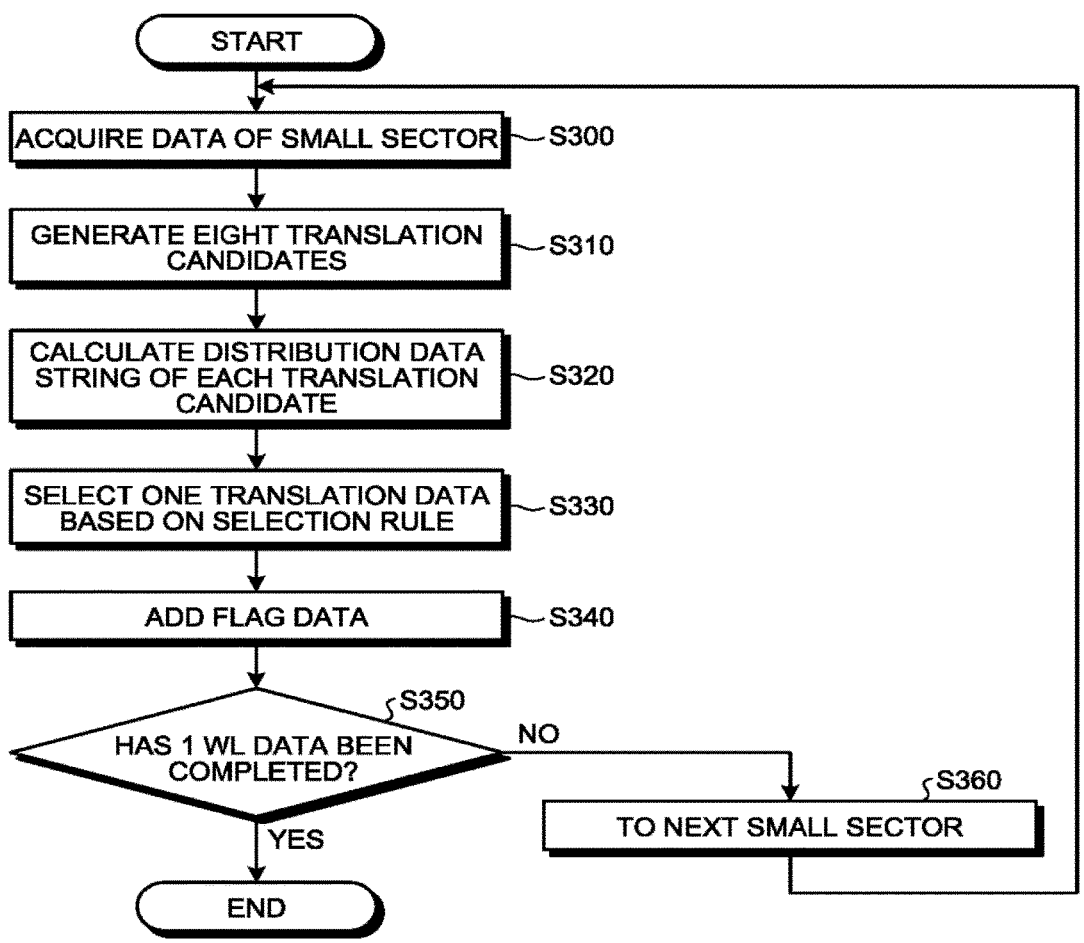
FIG. 15 is a flowchart that illustrates an example of a data translation (coding) process according to a second embodiment.

Next, a data translation process at the time of coding data that is performed by the data processing unit 50 will be described with reference to a flowchart illustrated in FIG. 15. The data processing unit 50 acquires lower page data, middle page data, and upper page data corresponding to data of one small sector from lower page data, middle page data, and upper page data corresponding to 1 WL data input from the randomizer 40 (Step S300). The data processing unit 50 generates eight data translation candidates by performing eight data translations for the data of the small sector described above (Step S310). The data processing unit 50 generates a distribution data string in which a memory cell number and a threshold voltage distribution are associated for each generated data translation candidate and stores the distribution data string (Step S320).

FIGS. 16A to 16H are diagrams that illustrate data coding corresponding to eight data translations performed by the data processing unit 50. FIG. 16A illustrates threshold voltage distributions Er, A, B, and C of a memory cell of three bits/cell and data coding performed when a data translation is not performed, in other words, flipping is not performed. In addition, on the right side of FIG. 16A, flags "000" respectively added to upper page data, middle page data, and lower page data when flipping is not performed are illustrated. FIG. 16B illustrates data coding when only the lower page data among the data coding illustrated in FIG. 16A is flipped. In addition, on the right side of FIG. 16B, flags "001" respectively added to page data when only the lower page data is flipped are illustrated. FIG. 16C illustrates data coding when only the middle page data among the data coding illustrated in FIG. 16A is flipped. In addition, on the right side of FIG. 16C, flags "010" respectively added to page data when only the middle page data is flipped are illustrated. FIG. 16D illustrates data coding when the lower page data and the middle page data among the data coding illustrated in FIG. 16A are flipped. In addition, on the right side of FIG. 16D, flags "011" respectively added to page data when the lower page data and the middle page data are flipped are illustrated.

FIG. 16E illustrates data coding when only the upper page data among the data coding illustrated in FIG. 16A is flipped. In addition, on the right side of FIG. 16E, flags "100" respectively added to page data when only the upper page data is flipped are illustrated. FIG. 16F illustrates data coding when the lower page data and the upper page data among the data coding illustrated in FIG. 16A are flipped. In addition, on the right side of FIG. 16F, flags "101" respectively added to page data when the lower page data and the upper page data are flipped are illustrated. FIG. 16G illustrates data coding when the middle page data and the upper page data among the data coding illustrated in FIG. 16A are flipped. In addition, on the right side of FIG. 16G, flags "110" respectively added to page data when the middle page data and the upper page data are flipped are illustrated. FIG. 16H illustrates data coding when the lower page data, the middle page data and the upper page data among the data coding illustrated in FIG. 16A are flipped. In addition, on the right side of FIG. 16H, flags "111" respectively added to page data when the lower page data, the middle page data, and the upper page data are flipped are illustrated.

As illustrated in FIG. 16A, when flipping is not performed, a flag "0" is added to the lower page data, a flag "0" is added to the middle page data, and a flag "0" is added to the upper page data. As illustrated in FIG. 16B, when only the lower page data is flipped, a flag "1" is added to the lower page data, a flag "0" is added to the middle page data, and a flag "0" is added to the upper page data. As illustrated in FIG. 16C, when only the middle page data is flipped, a flag "0" is added to the lower page data, a flag "1" is added to the middle page data, and a flag "0" is added to the upper page data. As illustrated in FIG. 16D, when the lower page data and the middle page data are flipped, a flag "1" is added to the lower page data, a flag "1" is added to the middle page data, and a flag "0" is added to the upper page data. As illustrated in FIG. 16E, when only the upper page data is flipped, a flag "0" is added to the lower page data, a flag "0" is added to the middle page data, and a flag "1" is added to the upper page data. As illustrated in FIG. 16F, when the lower page data and the upper page data are flipped, a flag "1" is added to the lower page data, a flag "0" is added to the middle page data, and a flag "1" is added to the upper page data. As illustrated in FIG. 16G, when the middle page data and the upper page data are flipped, a flag "0" is added to the lower page data, a flag "1" is added to the middle page data, and a flag "1" is added to the upper page data. As illustrated in FIG. 16H, when the lower page data, the middle page data, and the upper page data are flipped, a flag "1" is added to the lower page data, a flag "1" is added to the middle page data, and a flag "1" is added to the upper page data.

Accordingly, by determining whether a flag added to lower page data included in the data of a small sector to be "0" or "1", it can be determined whether or not a flipping process is performed for the lower page data included in the data of the small sector. In addition, by determining whether a flag added to middle page data included in the data of a small sector to be "0" or "1", it can be determined whether or not a flipping process is performed for the middle page data included in the data of the small sector. Furthermore, by determining whether a flag added to upper page data included in the data of a small sector to be "0" or "1", it can be determined whether or not a flipping process is performed for the upper page data included in the data of the small sector.

Next, the data processing unit 50 selects one from among the eight data translation candidates based on the selection rule (Step S330). Next, the data processing unit 50 adds the above-described flags representing the content of the translation pattern to the one translation candidate that has been selected (Step S340). In other words, the data processing unit 50 adds a flag of one bit used for identifying the content of a data translation of lower page data to the lower page data configured in units of small sectors acquired through the one translation that has been selected, adds a flag of one bit used for identifying the content of a data translation of middle page data to the middle page data configured in units of small sectors acquired through the one translation that has been selected, and adds a flag of one bit used for identifying the content of a data translation of upper page data to the upper page data configured in units of small sectors acquired through the one translation that has been selected.

Next, the data processing unit 50 determines whether or not translation processes corresponding to 1 WL data have been ended (Step S350). In a case where the processes have not been ended, the translation target is set to the data of a next small sector (Step S360), and a similar translation process is performed for the data of the next small sector (Steps S300 to S340). In this way, the translation process described above is performed for the data of all the small sectors included in 1 WL data.

In the second embodiment, a data inverse translation process at the time of decoding data that is performed by the data processing unit 50 is similar to that according to the first embodiment. In other words, at the time of decoding data, an inverse translation process is performed using only data stored in a page in which reading target data is included. In a case where the reading target page is a lower page, an inverse translation process is performed using only data stored in the lower page, in a case where the reading target page is a middle page, an inverse translation process is performed using only data stored in the middle page, and, in a case where the reading target page is an upper page, an inverse translation process is performed using only data stored in the upper page. The data processing unit 50 acquires data of one small sector and flag data corresponding to the data of the small sector from reading target page data input from the ECC unit 60 and determines whether or not a flipping process is performed based on the acquired flag. A similar inverse translation process is performed for the data of all the small sectors included in one page data.

In the embodiment described above, while the data translation performed by the data processing unit 50 is performed in units of small sectors, the data translation may be performed in units of page data included in 1 WL data. In such a case, a flag of one bit is added to the lower page data corresponding to one page, a flag of one bit is added to the middle page data corresponding to one page, and a flag of one bit is added to the upper page data corresponding to one page.

In this way, according to the second embodiment, the flag data representing whether or not a data translation is performed is added to each page data. For this reason, at the time of reading data, a data inverse translation can be performed using only its own page data, and accordingly, a short relay time at the time of reading data can be realized. In addition, since there is no change in the data length before and after the data translation except for the flag part, an increase in the control cost can be suppressed. Furthermore, data translation candidates of the cube of two are generated based on write data of three pages included in 1 WL, and one is selected from among the data translation candidates of the cube of two based on a certain selection rule. Accordingly, a translation process that is more effective for the E to A error and the like can be reliably selected.

(Third Embodiment)

Figure 17:
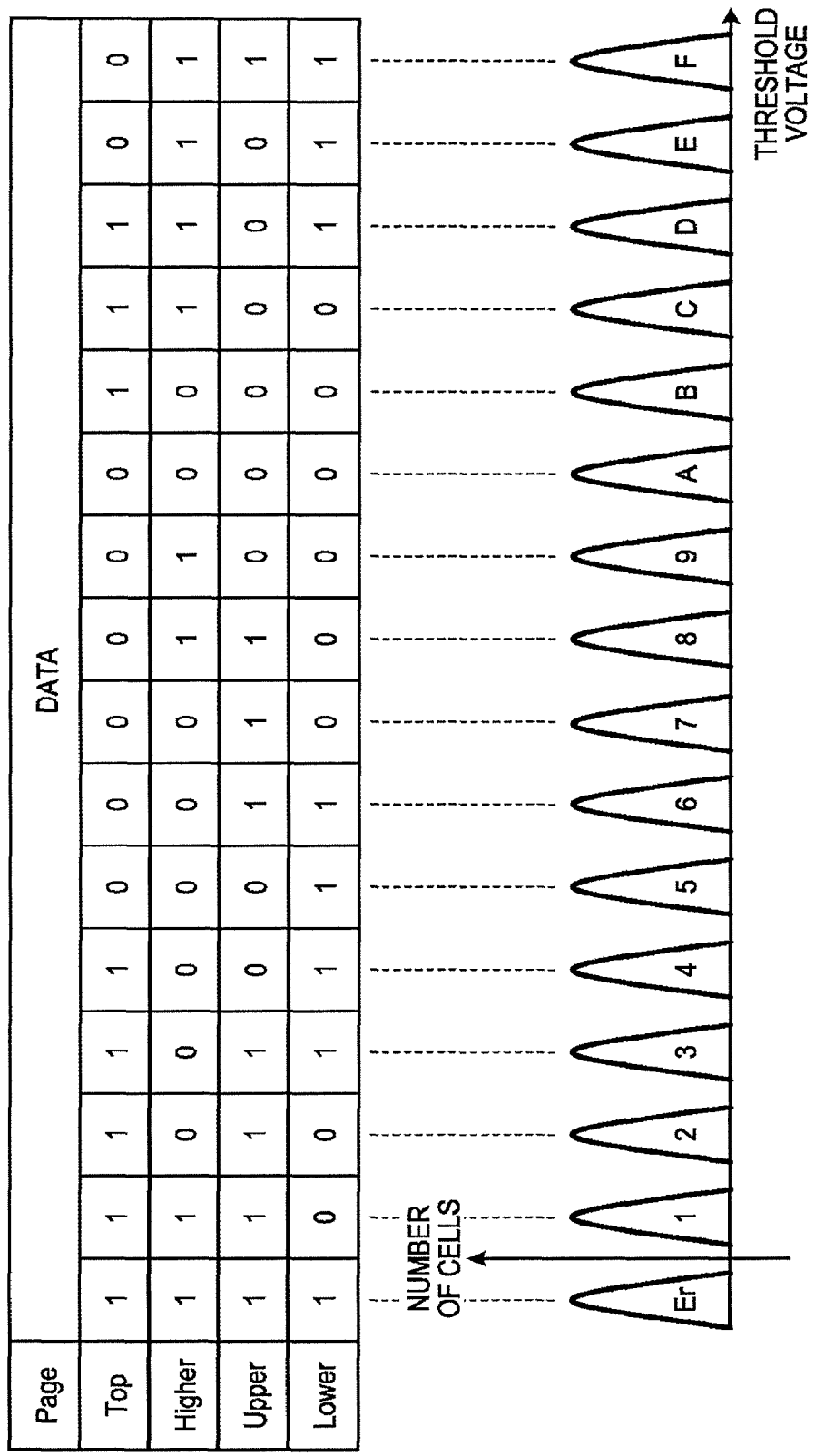
FIG. 17 is a diagram that illustrates an example of threshold voltage distributions and data coding of memory cells of four bits/cell.

In a third embodiment, a data translation for memory cells of four bits/cell will be described. FIG. 17 is a diagram that illustrates an example of threshold voltage distributions and data coding of memory cells of four bits/cell. As illustrated in a lower diagram of FIG. 17, in the case of memory cells that are four-bits/cell, there are sixteen distributions formed by a distribution Er, a distribution 1, a distribution 2, a distribution 3, a distribution 4, a distribution 5, a distribution 6, a distribution 7, a distribution 8, a distribution 9, a distribution A, a distribution B, a distribution C, a distribution D, a distribution E, and a distribution F. The distribution Er has a lowest threshold voltage and corresponds to a threshold voltage distribution of the erased state. The threshold voltage is higher in order of the distributions 1, 2, 3, 4, 5, 6, 7, 8, 9, A, B, C, D, E, and F. The distribution F has a highest threshold voltage. Accordingly, in the case of memory cells that are four-bits/cell, a state in which the memory cell M0 illustrated in FIG. 7 is surrounded by adjacent cells M1, M2, M3, and M4 belonging to the distribution F becomes an arrangement pattern of the threshold voltage distribution for which the E to A phenomenon is degraded the most. In a case where the memory cells that are four-bits/cell are used, data values of four bits are respectively associated with the 16 threshold distributions Er, 1, 2, 3, 4, 5, 6, 7, 8, 9, A, B, C, D, E, and F. In the case where four-bits/cell are used, one physical sector corresponds to four pages. Four bits that can be stored in each memory cell correspond to the four pages. In this embodiment, these four pages will be referred to as a lower page, an upper page, a higher page, and a top page.

An upper diagram of FIG. 17 is a diagram that illustrates an example of data coding. As illustrated in the upper diagram of FIG. 17, the distribution Er corresponds to a data value of "1111", the distribution 1 corresponds to a data value of "1110", the distribution 2 corresponds to a data value of "1010", the distribution 3 corresponds to a data value of "1011", the distribution 4 corresponds to a data value of "1001", the distribution 5 corresponds to a data value of "0001", the distribution 6 corresponds to a data value of "0011", the distribution 7 corresponds to a data value of "0010", the distribution 8 corresponds to a data value of "0110", the distribution 9 corresponds to a data value of "0100", the distribution A corresponds to a data value of "0000", the distribution B corresponds to a data value of "1000", the distribution C corresponds to a data value of "1100", the distribution D corresponds to a data value of "1101", the distribution E corresponds to a data value of "0101", and the distribution F corresponds to a data value of "0111". In this embodiment, when data of a top page is denoted by Dt, data of a higher page is denoted by Dh, data of an upper page is denoted by Du, and data of a lower page is denoted by Dl, a data value of four bits are denoted as "DtDhDuDl". The data coding illustrated in FIG. 17 is an example, and thus, the data coding is not limited to the example illustrated in FIG. 17.

Figure 18:
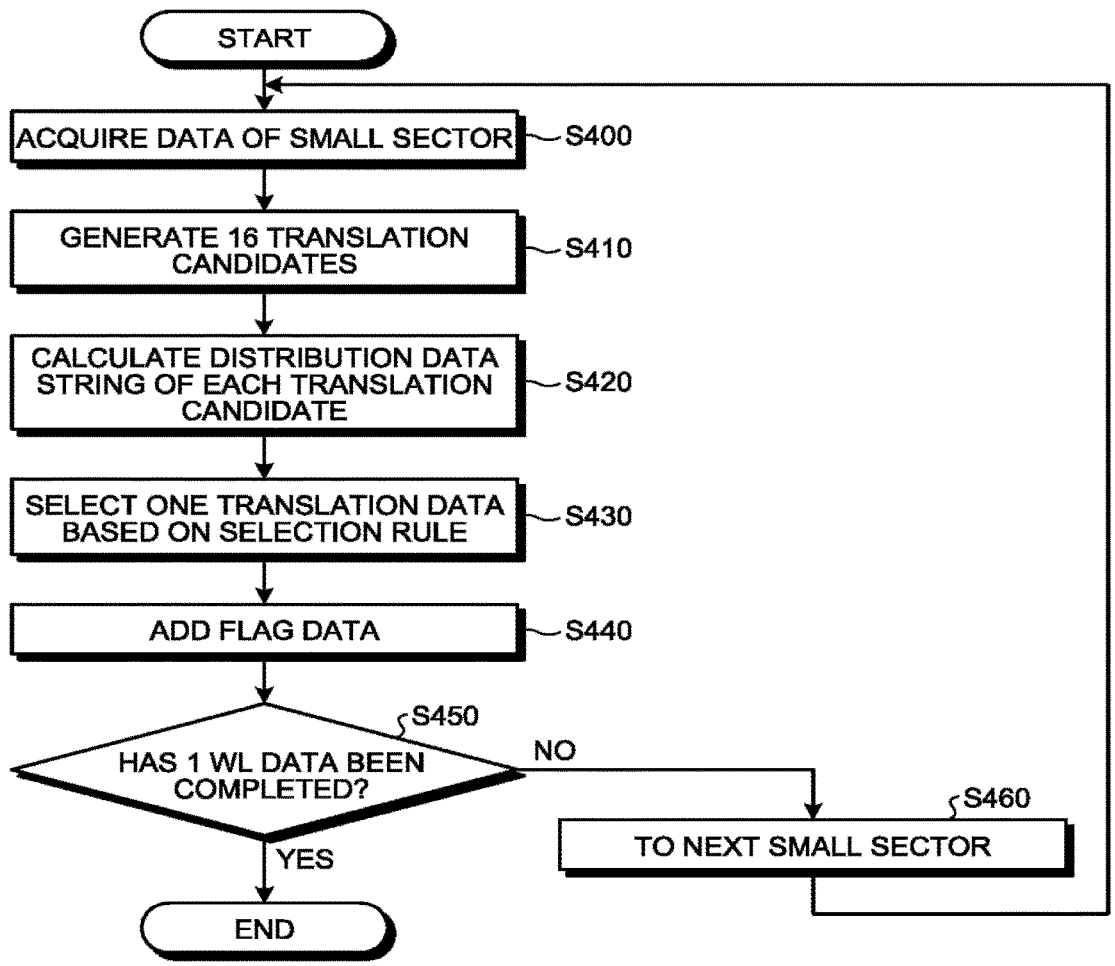
FIG. 18 is a flowchart that illustrates an example of a data translation (coding) process according to a third embodiment.

Next, a data translation process at the time of coding data that is performed by the data processing unit 50 will be described with reference to a flowchart illustrated in FIG. 18. The data processing unit 50 acquires lower page data, upper page data, higher page data, and top page data corresponding to data of one small sector from lower page data, upper page data, higher page data, and top page data corresponding to 1 WL data input from the randomizer 40 (Step S400). The data processing unit 50 generates 16 data translation candidates by performing 16 data translations for the data of the small sector described above (Step S410). The data processing unit 50 generates a distribution data string in which a memory cell number and a threshold voltage distribution are associated for each generated data translation candidate and stores the distribution data string (Step S420).

FIGS. 19A to 19P are diagrams that illustrate data coding corresponding to 16 data translations performed by the data processing unit 50. FIG. 19A illustrates threshold voltage distributions Er, A, B, and C of a memory cell of four bits/cell and data coding performed when a data translation is not performed, in other words, flipping is not performed. In addition, on the right side of FIG. 19A, flags "0000" respectively added to page data (the lower page data, the upper page data, the higher page data, and the top page data) when flipping is not performed are illustrated. FIG. 19B illustrates data coding when only the lower page data among the data coding illustrated in FIG. 19A is flipped. In addition, on the right side of FIG. 19B, flags "0001" respectively added to the page data when only the lower page data is flipped are illustrated. FIG. 19C illustrates data coding when only the upper page data among the data coding illustrated in FIG. 19A is flipped. In addition, on the right side of FIG. 19C, flags "0010" respectively added to the page data when only the upper page data is flipped are illustrated. FIG. 19D illustrates data coding when the lower page data and the upper page data among the data coding illustrated in FIG. 19A are flipped. In addition, on the right side of FIG. 19D, flags "0011" respectively added to page data when the lower page data and the upper page data are flipped are illustrated.

FIG. 19E illustrates data coding when only the higher page data among the data coding illustrated in FIG. 19A is flipped. In addition, on the right side of FIG. 19E, flags "0100" respectively added to page data when only the higher page data is flipped are illustrated. FIG. 19F illustrates data coding when the lower page data and the higher page data among the data coding illustrated in FIG. 19A are flipped. In addition, on the right side of FIG. 19F, flags "0101" respectively added to page data when the lower page data and the higher page data are flipped are illustrated. FIG. 19G illustrates data coding when the upper page data and the higher page data among the data coding illustrated in FIG. 19A are flipped. In addition, on the right side of FIG. 19G, flags "0110" respectively added to page data when the upper page data and the higher page data are flipped are illustrated. FIG. 19H illustrates data coding when the lower page data, the upper page data, and the higher page data among the data coding illustrated in FIG. 19A are flipped. In addition, on the right side of FIG. 19H, flags "0111" respectively added to page data when the lower page data, the upper page data, and the higher page data are flipped are illustrated.

FIG. 19I illustrates data coding when only the top page data among the data coding illustrated in FIG. 19A is flipped. In addition, on the right side of FIG. 19I, flags "1000" respectively added to page data when only the top page data is flipped are illustrated. FIG. 19J illustrates data coding when the lower page data and the top page data among the data coding illustrated in FIG. 19A are flipped. In addition, on the right side of FIG. 19J, flags "1001" respectively added to page data when the lower page data and the top page data are flipped are illustrated. FIG. 19K illustrates data coding when the upper page data and the top page data among the data coding illustrated in FIG. 19A are flipped. In addition, on the right side of FIG. 19K, flags "1010" respectively added to page data when the upper page data and the top page data are flipped are illustrated. FIG. 19L illustrates data coding when the lower page data, the upper page data, and the top page data among the data coding illustrated in FIG. 19A are flipped. In addition, on the right side of FIG. 19L, flags "1011" respectively added to page data when the lower page data, the upper page data, and the top page data are flipped are illustrated.

FIG. 19M illustrates data coding when the higher page data and the top page data among the data coding illustrated in FIG. 19A are flipped. In addition, on the right side of FIG. 19M, flags "1100" respectively added to page data when the higher page data and the top page data are flipped are illustrated. FIG. 19N illustrates data coding when the lower page data, the higher page data, and the top page data among the data coding illustrated in FIG. 19A are flipped. In addition, on the right side of FIG. 19N, flags "1101" respectively added to page data when the lower page data, the higher page data, and the top page data are flipped are illustrated. FIG. 19O illustrates data coding when the upper page data, the higher page data, and the top page data among the data coding illustrated in FIG. 19A are flipped. In addition, on the right side of FIG. 19O, flags "1110" respectively added to page data when the upper page data, the higher page data, and the top page data are flipped are illustrated. FIG. 19P illustrates data coding when the lower page data, the upper page data, the higher page data, and the top page data among the data coding illustrated in FIG. 19A are flipped. In addition, on the right side of FIG. 19P, flags "1111" respectively added to page data when the lower page data, the upper page data, the higher page data, and the top page data are flipped are illustrated.

As illustrated in FIG. 19A, when flipping is not performed, a flag "0" is added to the lower page data, a flag "0" is added to the upper page data, a flag "0" is added to the higher page data, and a flag "0" is added to the top page data. As illustrated in FIG. 19B, when only the lower page data is flipped, a flag "1" is added to the lower page data, a flag "0" is added to the upper page data, a flag "0" is added to the higher page data, and a flag "0" is added to the top page data. As illustrated in FIG. 19C, when only the upper page data is flipped, a flag "0" is added to the lower page data, a flag "1" is added to the upper page data, a flag "0" is added to the higher page data, and a flag "0" is added to the top page data. As illustrated in FIG. 19D, when the lower page data and the upper page data are flipped, a flag "1" is added to the lower page data, a flag "1" is added to the upper page data, a flag "0" is added to the higher page data, and a flag "0" is added to the top page data.

As illustrated in FIG. 19E, when only the higher page data is flipped, a flag "0" is added to the lower page data, a flag "0" is added to the upper page data, a flag "1" is added to the higher page data, and a flag "0" is added to the top page data. As illustrated in FIG. 19F, when the lower page data and the higher page data are flipped, a flag "1" is added to the lower page data, a flag "0" is added to the upper page data, a flag "1" is added to the higher page data, and a flag "0" is added to the top page data. As illustrated in FIG. 19G, when the upper page data and the higher page data are flipped, a flag "0" is added to the lower page data, a flag "1" is added to the upper page data, a flag "1" is added to the higher page data, and a flag "0" is added to the top page data. As illustrated in FIG. 19H, when the lower page data, the upper page data, and the higher page data are flipped, a flag "1" is added to the lower page data, a flag "1" is added to the upper page data, a flag "1" is added to the higher page data, and a flag "0" is added to the top page data.

As illustrated in FIG. 19I, when only the top page data is flipped, a flag "0" is added to the lower page data, a flag "0" is added to the upper page data, a flag "0" is added to the higher page data, and a flag "1" is added to the top page data. As illustrated in FIG. 19J, when the lower page data and the top page data are flipped, a flag "1" is added to the lower page data, a flag "0" is added to the upper page data, a flag "0" is added to the higher page data, and a flag "1" is added to the top page data. As illustrated in FIG. 19K, when the upper page data and the top page data are flipped, a flag "0" is added to the lower page data, a flag "1" is added to the upper page data, a flag "0" is added to the higher page data, and a flag "1" is added to the top page data. As illustrated in FIG. 19L, when the lower page data, the upper page data, and the top page data are flipped, a flag "1" is added to the lower page data, a flag "1" is added to the upper page data, a flag "0" is added to the higher page data, and a flag "1" is added to the top page data.

As illustrated in FIG. 19M, when the higher page data and the top page data are flipped, a flag "0" is added to the lower page data, a flag "0" is added to the upper page data, a flag "1" is added to the higher page data, and a flag "1" is added to the top page data. As illustrated in FIG. 19N, when the lower page data, the higher page data, and the top page data are flipped, a flag "1" is added to the lower page data, a flag "0" is added to the upper page data, a flag "1" is added to the higher page data, and a flag "1" is added to the top page data. As illustrated in FIG. 19O, when the upper page data, the higher page data, and the top page data are flipped, a flag "0" is added to the lower page data, a flag "1" is added to the upper page data, a flag "1" is added to the higher page data, and a flag "1" is added to the top page data. As illustrated in FIG. 19P, when the lower page data, the upper page data, the higher page data, and the top page data are flipped, a flag "1" is added to the lower page data, a flag "1" is added to the upper page data, a flag "1" is added to the higher page data, and a flag "1" is added to the top page data.

Accordingly, by determining whether a flag added to lower page data included in the data of a small sector is "0" or "1", it can be determined whether or not a flipping process is performed for the lower page data included in the data of the small sector. In addition, by determining whether a flag added to upper page data included in the data of a small sector is "0" or "1", it can be determined whether or not a flipping process is performed for the upper page data included in the data of the small sector. Furthermore, by determining whether a flag added to higher page data included in the data of a small sector is "0" or "1", it can be determined whether or not a flipping process is performed for the higher page data included in the data of the small sector. In addition, by determining whether a flag added to top page data included in the data of a small sector is "0" or "1", it can be determined whether or not a flipping process is performed for the top page data included in the data of the small sector.

Next, the data processing unit 50 selects one from among the 16 data translation candidates based on the selection rule (Step S430). Next, the data processing unit 50 adds the above-described flags representing the content of the translation pattern to the one translation candidate that has been selected (Step S440). In other words, the data processing unit 50 adds a flag of one bit used for identifying the content of a data translation of lower page data to the lower page data configured in units of small sectors acquired through the one translation that has been selected, adds a flag of one bit used for identifying the content of a data translation of upper page data to the upper page data configured in units of small sectors acquired through the one translation that has been selected, adds a flag of one bit used for identifying the content of a data translation of higher page data to the higher page data configured in units of small sectors acquired through the one translation that has been selected, and adds a flag of one bit used for identifying the content of a data translation of top page data to the top page data configured in units of small sectors acquired through the one translation that has been selected.

Next, the data processing unit 50 determines whether or not translation processes corresponding to 1 WL data have been ended (Step S450). In a case where the processes have not been ended, the translation target is set to the data of a next small sector (Step S460), and a similar translation process is performed for the data of the next small sector (Steps S400 to S440). In this way, the translation process described above is performed for the data of all the small sectors included in 1 WL data.

In the third embodiment, a data inverse translation process at the time of decoding data that is performed by the data processing unit 50 is similar to that according to the first or second embodiment. In other words, at the time of decoding data, an inverse translation process is performed using only data stored in a page in which reading target data is included. In a case where the reading target page is a lower page, an inverse translation process is performed using only data stored in the lower page, in a case where the reading target page is an upper page, an inverse translation process is performed using only data stored in the upper page, in a case where the reading target page is a higher page, an inverse translation process is performed using only data stored in the higher page, and, in a case where the reading target page is a top page, an inverse translation process is performed using only data stored in the top page. The data processing unit 50 acquires data of one small sector and flag data corresponding to the data of the small sector from reading target page data input from the ECC unit 60 and determines whether or not a flipping process is performed based on the acquired flag. A similar inverse translation process is performed for the data of all the small sectors included in one page data.

In the embodiment described above, while the data translation performed by the data processing unit 50 is performed in units of small sectors, the data translation may be performed in units of page data included in 1 WL data. In such a case, a flag of one bit is added to the lower page data corresponding to one page, a flag of one bit is added to the upper page data corresponding to one page, a flag of one bit is added to the higher page data corresponding to one page, and a flag of one bit is added to the top page data corresponding to one page.

In this way, according to the third embodiment, the flag data representing whether or not a data translation is performed is added to each page data. For this reason, at the time of reading data, a data inverse translation can be performed using only its own page data, and accordingly, a short relay time at the time of reading data can be realized. In addition, since there is no change in the data length before and after the data translation except for the flag part, an increase in the control cost can be suppressed. Furthermore, data translation candidates of the fourth power of two are generated based on write data of four pages included in 1 WL, and one is selected from among the data translation candidates of the fourth power of two based on a certain selection rule. Accordingly, a translation process that is more effective for the E to A error and the like can be reliably selected.

(Fourth Embodiment)

In a fourth embodiment, a data processing unit 50 performs a data translation process different from the flipping process described above. The fourth embodiment is similar to the first embodiment except for the content of this data translation, and a duplicate description will not be presented.

In the fourth embodiment, the data processing unit 50 performs an exclusive OR operation (hereinafter, abbreviated as an XOR operation) of input data with a certain bit pattern. FIG. 20 is a diagram that illustrates the content of the XOR operation. As illustrated on a first stage illustrated in FIG. 20, when data before the translation is "0", and one bit of the fixed bit pattern is "0", an output after the XOR operation is "0". As illustrated on a second stage illustrated in FIG. 20, when data before the translation is "0", and one bit of the fixed bit pattern is "1", an output after the XOR operation is "1". As illustrated on a third stage illustrated in FIG. 20, when data before the translation is "1", and one bit of the fixed bit pattern is "0", an output after the XOR operation is "1". As illustrated on a fourth stage illustrated in FIG. 20, when data before the translation is "1", and one bit of the fixed bit pattern is "1", an output after the XOR operation is "0". The flipping described above is equivalent to an XOR operation with a bit pattern of which all the bits are "1".

FIGS. 21A to 21D are diagrams that illustrate an example of four data translations performed by the data processing unit 50 in a case where data of two bits/cell is written in the NAND 10. FIG. 21E is a diagram that illustrates an example of the fixed bit pattern that is one input at the time of performing the XOR operation. FIG. 21A represents a data pattern when an XOR operation is not performed for the upper page data and the lower page data. Thus, FIG. 21A illustrates an example of the data pattern of an upper page before the data translation and an example of the data pattern of a lower page. On the right side in FIG. 21A, flags "00" respectively added to the upper page data and the lower page data when a data translation is not performed. FIG. 21B illustrates an output data pattern when only the lower page data of the data pattern illustrated in FIG. 21A is XOR-operated with the bit pattern illustrated in FIG. 21E. On the right side in FIG. 21B, flags "01" respectively added to the upper page data and the lower page data when only the lower page data is XOR-operated. FIG. 21C illustrates an output data pattern when only the upper page data of the data pattern illustrated in FIG. 21A is XOR-operated with the bit pattern illustrated in FIG. 21E. On the right side in FIG. 21C, flags "10" respectively added to the upper page data and the lower page data when only the upper page data is XOR-operated. FIG. 21D illustrates an output data pattern when the lower page data and the upper page data of the data pattern illustrated in FIG. 21A are XOR-operated with the bit pattern illustrated in FIG. 21E. On the right side in FIG. 21D, flags "11" respectively added to the upper page data and the lower page data when the lower page data and the upper page data are XOR-operated.

As illustrated in FIGS. 21A to 21D, by determining the flag added to the upper page data to be "0" or "1", it can be determined whether or not a XOR process is performed for the upper page data. In addition, by determining the flag added to the lower page data to be "0" or "1", it can be determined whether or not a XOR process is performed for the lower page data.

A data translation process at the time of coding data that is performed by the data processing unit 50 will be described. The data processing unit 50 acquires data of one small sector illustrated in FIG. 8 from the lower page data and the upper page data included in 1 WL data. The data processing unit 50 performs the four data translations illustrated in FIGS. 21A to 21D for the data of the small sector, thereby generating four data translation candidates. The data processing unit 50 generates a distribution data string in which a memory cell number and a threshold voltage distribution are associated for each generated data translation candidate and stores the generated distribution data string. The data processing unit 50 selects one from among the four data translation candidates based on the certain selection rule. The data processing unit 50 adds the flag representing the content of the translation pattern to one translation candidate that has been selected. The data processing unit 50 inputs translated data and the flag to the ECC unit 60.

At the time of decoding data, the data processing unit 50 performs a sequence opposite to the coding sequence. At the time of decoding data, an XOR operation is performed using a fixed bit pattern that is the same as that used at the time of coding data. The XOR operation is a reversible translation. In addition, at the time of decoding data, similar to the first to third embodiments described above, an inverse translation process is performed using only data stored in a page in which reading target data is included. The data processing unit 50 acquires data of one small sector and flag data corresponding to the data of the small sector from reading target page data input from the ECC unit 60 and determines whether or not an inverse data translation (XOR operation) is performed based on the acquired flag. A similar inverse translation process is performed for the data of all the small sectors included in one page data.

Also in this fourth embodiment, the data translation described above may be performed in units of page data included in 1 WL data.

The fixed bit pattern for which the XOR operation is performed is an arbitrary bit string. The fixed bit pattern may be a same pattern that is common to all the small sectors of all the pages or may be switched to a different bit pattern based on a certain rule.

In addition, as another data translation method, rearrangement of data may be employed. In a case where an input data string is "ABCDEFGHI", the rearrangement thereof is performed based on a certain rule and, for example, an output data string is set to "ACEFBDFG" or "ADGBEHCFI".

In this way, in the fourth embodiment, the XOR operation is employed as the data translation, and there is no change in the data length before and after the data translation except for the flag part, whereby an increase in the control cost can be suppressed.

(Fifth Embodiment)

In a fifth embodiment, a bit pattern used for the XOR operation can be selected from among a plurality of bit patterns. In this case, in addition to whether or not a translation with a bit pattern is performed, it is necessary to identify a bit pattern with which the translation is performed from among the plurality of bit patterns. Accordingly, a flag of a plurality of bits is necessary in correspondence with each page data included in the small sector.

FIGS. 22A to 22E are diagrams that illustrate a plurality of (16) data translations of a case where data of two bits/cell is written in the NAND 10, and flag bits added to each page data included in a small sector are two bits. FIG. 22F is a diagram that illustrates a plurality of (three) fixed bit patterns Y, Y, Z as one input at the time of the XOR operation. Generally, when the memory cells are N bits/cell, and flag bits are M bits, the number of fixed bit patterns is (the M-th power of two) −1. In this embodiment, the number of fixed bit patterns is "(the square of two)−1"=3. In addition, generally, the number of kinds of data translations performed by the data processing unit 50 is the M-th power of (N-th power of two) and, in this embodiment, is the square of (the square of two)=16 kinds. FIGS. 22A to 22E illustrate some of 16 kinds.

FIG. 22A illustrates a data pattern when an XOR operation is not performed for upper page data and lower page data. "U" on the upper page side represents upper page data before the translation. "L" on the lower page side represents lower page data before the translation. On the right side in FIG. 22A, a flag "00" added to the upper page data and a flag "00" added to the lower page data when a data translation is not performed are illustrated. FIG. 22B illustrates an output data pattern when only the lower page data of the data pattern illustrated in FIG. 22A is XOR-operated with a fixed bit pattern X. "L⊕X" represents an XOR operation of the lower page data and the fixed bit pattern X. On the right side in FIG. 22B, a flag "00" added to the upper page data and a flag "01" added to the lower page data when only the lower page data is XOR-operated with the fixed bit pattern X are illustrated. FIG. 22C illustrates an output data pattern when only the lower page data of the data pattern illustrated in FIG. 22A is XOR-operated with a fixed bit pattern Y. "L⊕Y" represents an XOR operation of the lower page data and the fixed bit pattern Y. On the right side in FIG. 22C, a flag "00" added to the upper page data and a flag "10" added to the lower page data when only the lower page data is XOR-operated with the fixed bit pattern Y are illustrated. FIG. 22D illustrates an output data pattern when only the lower page data of the data pattern illustrated in FIG. 22A is XOR-operated with a fixed bit pattern Z. "L⊕Z" represents an XOR operation of the lower page data and the fixed bit pattern Z. On the right side in FIG. 22D, a flag "00" added to the upper page data and a flag "11" added to the lower page data when only the lower page data is XOR-operated with the fixed bit pattern Z are illustrated. FIG. 22E illustrates an output data pattern when the upper page data and the lower page data of the data pattern illustrated in FIG. 22A are XOR-operated with the fixed bit pattern Z. On the right side in FIG. 22E, a flag "11" added to the upper page data and a flag "11" added to the lower page data when the upper page data and the lower page data are XOR-operated with the fixed bit pattern Z are illustrated.

In this embodiment, when the flag of two bits is "00", it represents that a translation is not performed. When the flag of two bits is "01", it represents that a data translation with the first fixed bit pattern X is performed. When the flag of two bits is "10", it represents that a data translation with the second fixed bit pattern Y is performed. When the flag of two bits is "11", it represents that a data translation with the third fixed bit pattern Z is performed. Accordingly, by determining the flag of two bits added to each page data, the content of the data translation can be identified.

A data translation process at the time of coding data that is performed by the data processing unit 50 will be described. The data processing unit 50 acquires data of one small sector illustrated in FIG. 8 from the lower page data and the upper page data included in 1 WL data. The data processing unit 50 performs the 16 data translations illustrated in FIGS. 22A to 22E for the data of the small sector, thereby generating 16 data translation candidates. The data processing unit 50 generates a distribution data string in which a memory cell number and a threshold voltage distribution are associated for each generated data translation candidate and stores the generated distribution data string. The data processing unit 50 selects one from among the 16 data translation candidates based on a certain selection rule. The data processing unit 50 adds the flag of two bits representing the content of the translation pattern to one translation candidate that has been selected. The data processing unit 50 inputs translated data and the flag to the ECC unit 60.

At the time of decoding data, the data processing unit 50 performs a sequence opposite to the coding sequence. The data processing unit 50 acquires data of one small sector and flag data corresponding to the data of the small sector from the reading target page data input from the ECC unit 60 and determines the kind of data translation performed at the time of coding data based on the acquired flag. The data processing unit 50 determines the kind of the fixed bit pattern used at the time of coding data based on the acquired flag and performs an XOR operation by using the determined fixed bit pattern. In addition, at the time of decoding data, similar to the first to fourth embodiments described above, an inverse translation process is performed using only data stored in a page in which reading target data is included. A similar inverse translation process is performed for the data of all the small sectors included in one page data.

Also in this fifth embodiment, the data translation described above may be performed in units of page data included in 1 WL data. In this embodiment, while the fixed bit patterns of three kinds X, Y, and Z are used to be common to all the pages, a different bit pattern may be used for each page.

In this way, in the fifth embodiment, the XOR operations with the plurality of fixed bit patterns are performed, and accordingly, a translation process that is more effective for an E to A error or the like can be selected.

(Sixth Embodiment)

In a sixth embodiment, from a plurality of data translation candidates, one is selected by referring to not only the threshold voltage distribution of memory cells of the current word line but also the threshold voltage distribution of memory cells of an adjacent word line, and accordingly, a translation process that is more effective for an E to A error or the like can be selected. Generally, when data written into a flash memory cell, programming is executed in order from a smallest word line address within a block. For this reason, when a physical sector corresponding to the current word line is selected and programmed, a physical sector of a previous word line having a word line address acquired by decreasing that of the current word line by one is in a programmed state, and the data has already been fixed. On the other hand, a physical sector having a word line address acquired by increasing that of the current word line by one is planned to be programmed after the currently-selected word line, and the data thereof has not been set. Thus, in this embodiment, based on the data of the current word line and the data of the previous word line, from a plurality of data translation candidates, one is selected. For this reason, a data processing unit 50 according to this embodiment includes an adjacent WL data buffer that can temporarily store the data of the previous word line in addition to an ordinary buffer used for translating the data of the current word line.

Hereinafter, the data translation process at the time of performing coding that is performed by the data processing unit 50 will be described with reference to a flowchart illustrated in FIG. 23. The data processing unit 50 acquires data of one small sector illustrated in FIG. 8 from lower page data and upper page data included in the current WL data (Step S500). The data processing unit 50 generates a plurality of data translation candidates, for example, by performing the plurality of data translations illustrated in FIGS. 9A to 9D for the data of the small sector (Step S510). The data processing unit 50 generates a distribution data string in which a memory cell number and a threshold voltage distribution are associated for each generated data translation candidate and stores the distribution data string (Step S520).

Next, the data processing unit 50 acquires the data of the previous word line from the adjacent WL data buffer (Step S540). The data processing unit 50, based on the selection rule, compares a plurality of combinations of a distribution data string of the previous word line and distribution data strings of a plurality of data translation candidates for the current word line and selects one data translation candidate (S540). Next, the data processing unit 50 adds the flag described above to one translation candidate that has been selected (Step S550). In other words, the data processing unit 50 adds a flag used for identifying the content of the data translation of lower page data to the lower page data configured in units of small sectors acquired through the selected one translation and adds a flag used for identifying the content of the data translation of upper page data to the upper page data configured in units of small sectors acquired through the selected one translation.

Next, the data processing unit 50 determines whether or not translation processes corresponding to 1 WL data have been ended (Step S560). In a case where the processes have not been ended, the translation target is set to the data of a next small sector (Step S570), and a similar translation process is performed for the data of the next small sector (Steps S500 to S550). In this way, the translation process described above is performed for the data of all the small sectors included in 1 WL data. The data of the small sectors after the translations including flag data is input to the ECC unit 60.

At the time of decoding data, similar to each embodiment described above, an inverse translation process is performed using only data stored in a page in which reading target data is included. The data processing unit 50 acquires data of one small sector and flag data corresponding to the data of the small sector from reading target page data input from the ECC unit 60 and determines whether or not an inverse data translation is performed based on the acquired flag.

Also in this sixth embodiment, the data translation described above may be performed in units of page data included in 1 WL data.

In this way, according to the sixth embodiment, from a plurality of data translation candidates, one is selected by referring to the data of the current word line and the data of the previous word line. Accordingly, a translation process that is more effective for an E to A error or the like can be selected. In the description presented above, while one is selected from among a plurality of data translation candidates by referring to the data of the current word line and the data of the previous word line, one may be selected from among a plurality of data translation candidates by referring to the data of a plurality of word lines adjacent to the front side of the current word line and the data of the current word line. Furthermore, one may be selected from among a plurality of data translation candidates by referring to the data of a plurality of word lines adjacent to the front side of the current word line, the data of a plurality of word lines adjacent to the rear side of the current word line, and the data of the current word line.

(Seventh Embodiment)

In the first to fifth embodiments described above, in a case where data of m bits is stored in a memory cell, $2^m$ data translation candidates are generated for each small sector data, and one data translation candidate is selected from among the $2^m$ data translation candidates. In a seventh embodiment, two data translation candidates are generated for each small sector data regardless of the number m of bits of data stored in a memory cell. In the seventh embodiment, an example will be described in which a memory cell of three bits/cell is used. However, this seventh embodiment can be also applied to a memory cell of two bits/cell, four bits/cell, or five or more bits/cell. Regarding the data translation, an arbitrary operation among the flipping process, the XOR operation, and the like described above is performed.

Figure 24:
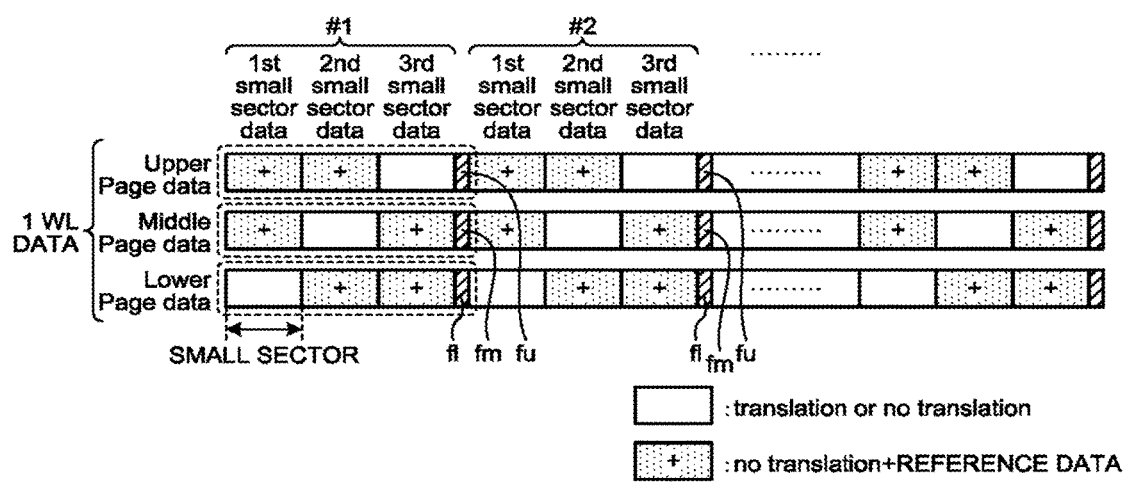
FIG. 24 is a diagram that illustrates a data translating (coding) process according to a seventh embodiment.

FIG. 24 is a diagram that illustrates a data translating process according to a seventh embodiment. FIG. 24 illustrates a plurality of small sector data and a plurality of flag data included in 1 WL data. The 1 WL data is divided into a plurality of group #1, group #2, . . . . In the case illustrated in FIG. 24, since a memory cell of three bits/cell is assumed, each of group #1, group #2, . . . includes three small sector data (1st small sector data, 2nd small sector data, and 3rd small sector data). For every three small sector data (1st small sector data, 2nd small sector data, and 3rd small sector data), flag data fl, fm, and fu are added. The flag data fl, fm, and fu are represented as rectangles to which hatching is applied. fl represents flag data for the lower page data. fm represents flag data for the middle page data. fu represents flag data for the upper page data. In FIG. 24, a blank rectangle represents data for which the execution/no-execution of data translation is selected. In other words, consequently, for data of the blank rectangle, there are a case where data translation is performed and a case where data translation is not performed. A rectangle to which a stipple pattern and "plus (+)" are attached represents data for which data translation is not performed and represents data that is referred to in a case where whether data translation of another page included in the same small sector data is performed or not is determined. In other words, a rectangle to which a stipple pattern and "plus (+)" are attached represents data before translation that is input to the data processing unit 50 and represents data that is referred to in a case where whether data translation of another page included in the same small sector data is performed or not is determined.

The 1st small sector data is data stored in the 1st small sector configured by a plurality of memory cells. For the lower page data included in the 1st small sector data, there are a case where data that has been translated is selected and a case where data that has not been translated is selected. For the middle page data included in the 1st small sector data, no data translation is performed. Also for the upper page data included in the 1st small sector data, no data translation is performed.

The 2nd small sector data is data stored in the 2nd small sector configured by a plurality of memory cells. The 2nd small sector is adjacent to the 1st small sector. For the middle page data included in the 2nd small sector data, there are a case where data that has been translated is selected and a case where data that has not been translated is selected. For the lower page data included in the 2nd small sector data, no data translation is performed. Also for the upper page data included in the 2nd small sector data, no data translation is performed.

The 3rd small sector data is data stored in the 3rd small sector configured by a plurality of memory cells. The 3rd small sector is adjacent to the 2nd small sector. For the upper page data included in the 3rd small sector data, there are a case where data that has been translated is selected and a case where data that has not been translated is selected. For the lower page data included in the 3rd small sector data, no data translation is performed. Also for the middle page data included in the 3rd small sector data, no data translation is performed.

Three flag data fl, fm, and fu are stored in one memory cell adjacent to the 3rd small sector. The flag data fl of one bit stored in the lower page represents whether the lower page data included in the 1st small sector data is data for which data translation has been performed or data for which data translation has not been performed. The flag data fm of one bit stored in the middle page represents whether the middle page data included in the 2nd small sector data is data for which data translation has been performed or data for which data translation has not been performed. The flag data fu of one bit stored in the upper page represents whether the upper page data included in the 3rd small sector data is data for which data translation has been performed or data for which data translation has not been performed.

In this way, in the seventh embodiment illustrated in FIG. 24, the flag data fl, fm, and fu of three bits representing the contents of data translation for three consecutive small sector data are added to three consecutive small sector data. It can be also stated that each of the flag data fl, fm, and fu represents whether or not data translation has been performed for one small sector data among three consecutive small sector data and that data translation is not performed for the remaining two small sector data. There are eight combinations of data translation for three consecutive small sector data. Such a process is repeatedly performed for the 1 WL data.

Figure 25:
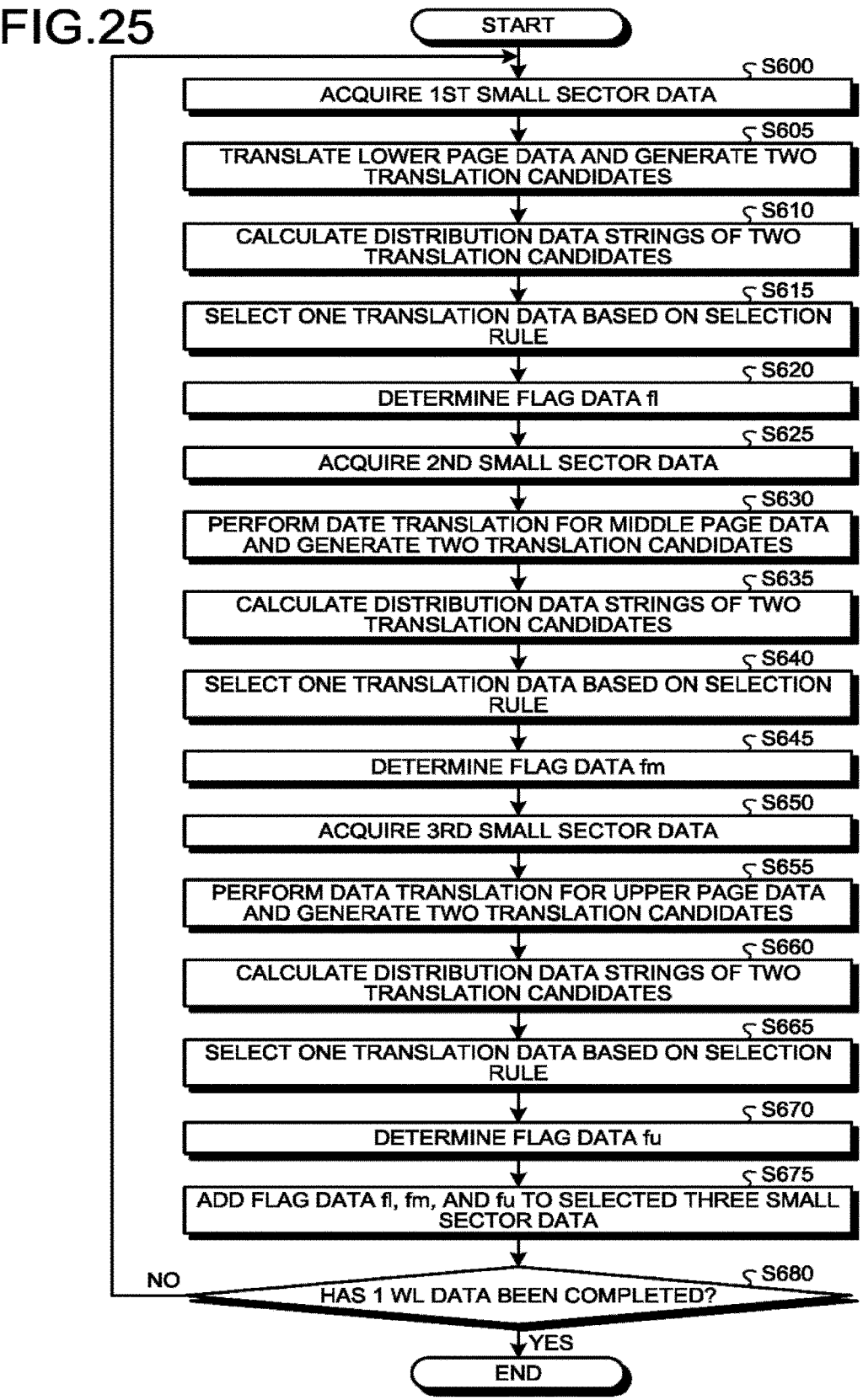
FIG. 25 is a flowchart that illustrates an example of the data translating (coding) process according to the seventh embodiment.

Next, a data translating process at the time of coding data performed by the data processing unit 50 will be described with reference to a flowchart illustrated in FIG. 25. The data processing unit 50 acquires one small sector data (the 1st small sector data including the lower page data, the middle page data, and the upper page data) from 1 WL data input from the randomizer 40 (Step S600). The data processing unit 50 performs data translation for the lower page data of the 1st small sector data and generates two data translation candidates (Step S605). A first data translation candidate includes lower page data for which data translation has not been performed, middle page data for which data translation has not been performed, and upper page data for which data translation has not been performed. A second data translation candidate includes lower page data for which data translation has been performed, middle page data for which data translation has not been performed, and upper page data for which data translation has not been performed. The data processing unit 50, for each generated data translation candidate, generates and stores a distribution data string in which a memory cell number and a threshold voltage distribution are associated with each other (Step S610).

Next, the data processing unit 50 selects one from the two data translation candidates based on the selection rule described above (Step S615). The data processing unit 50 determines flag data fl corresponding to the one translation candidate that has been selected (Step S620). In other words, when the lower page data for which the data translation has not been performed is selected, the data processing unit 50 sets the flag fl to "0". On the other hand, when the lower page data for which the data translation has been performed is selected, the data processing unit 50 sets the flag fl to "1".

Next, the data processing unit 50 acquires next one small sector data (the 2nd small sector data including the lower page data, the middle page data, and the upper page data) from 1 WL data input from the randomizer 40 (Step S625). The data processing unit 50 performs data translation for the middle page data of the 2nd small sector data and generates two data translation candidates (Step S630). A first data translation candidate includes lower page data for which data translation has not been performed, middle page data for which data translation has not been performed, and upper page data for which data translation has not been performed. A second data translation candidate includes lower page data for which data translation has not been performed, middle page data for which data translation has been performed, and upper page data for which data translation has not been performed. The data processing unit 50, for each generated data translation candidate, generates and stores a distribution data string in which a memory cell number and a threshold voltage distribution are associated with each other (Step S635).

Next, the data processing unit 50 selects one from the two data translation candidates based on the selection rule described above (Step S640). The data processing unit 50 determines a flag fm corresponding to the one translation candidate that has been selected (Step S645). In other words, when the middle page data for which the data translation has not been performed is selected, the data processing unit 50 sets the flag fm to "0". On the other hand, when the middle page data for which the data translation has been performed is selected, the data processing unit 50 sets the flag fm to "1".

Next, the data processing unit 50 acquires next one small sector data (the 3rd small sector data including the lower page data, the middle page data, and the upper page data) from 1 WL data input from the randomizer 40 (Step S650). The data processing unit 50 performs data translation for the upper page data of the 3rd small sector data and generates two data translation candidates (Step S655). A first data translation candidate includes lower page data for which data translation has not been performed, middle page data for which data translation has not been performed, and upper page data for which data translation has not been performed. A second data translation candidate includes lower page data for which data translation has not been performed, middle page data for which data translation has not been performed, and upper page data for which data translation has been performed. The data processing unit 50, for each generated data translation candidate, generates and stores a distribution data string in which a memory cell number and a threshold voltage distribution are associated with each other (Step S660).

Next, the data processing unit 50 selects one from the two data translation candidates based on the selection rule described above (Step S665). The data processing unit 50 determines a flag fu corresponding to the one translation candidate that has been selected (Step S670). In other words, when the upper page data for which the data translation has not been performed is selected, the data processing unit 50 sets the flag fu to "0". On the other hand, when the upper page data for which the data translation has been performed is selected, the data processing unit 50 sets the flag fu to "1".

Next, the data processing unit 50 outputs the lower page data after translation or before translation included in the 1st small sector data, the lower page data before translation included in the 2nd small sector data, the lower page data before translation included in the 3rd small sector data, and the flag data fl as lower page data. The data processing unit 50 outputs the middle page data before translation included in the 2nd small sector data, the middle page data after translation or before translation included in the 2nd small sector data, the middle page data before translation included in the 3rd small sector data, and the flag data fm as middle page data. The data processing unit 50 outputs the upper page data before translation included in the 3rd small sector data, the upper page data before translation included in the 3rd small sector data, the upper page data after translation or before translation included in the 3rd small sector data, and the flag data fu as upper page data (Step S675).

The data processing unit 50 determines whether or not the translation process corresponding to 1 WL data has been completed (Step S680). In a case where the translation process has not been completed, the data processing unit 50 sets three small sector data of the next group as a translation target and performs a similar translation process for the next three small sector data (Steps S600 to S670). In this way, the translation process described above is performed for all the small sector data included in the 1 WL data.

Figure 26:
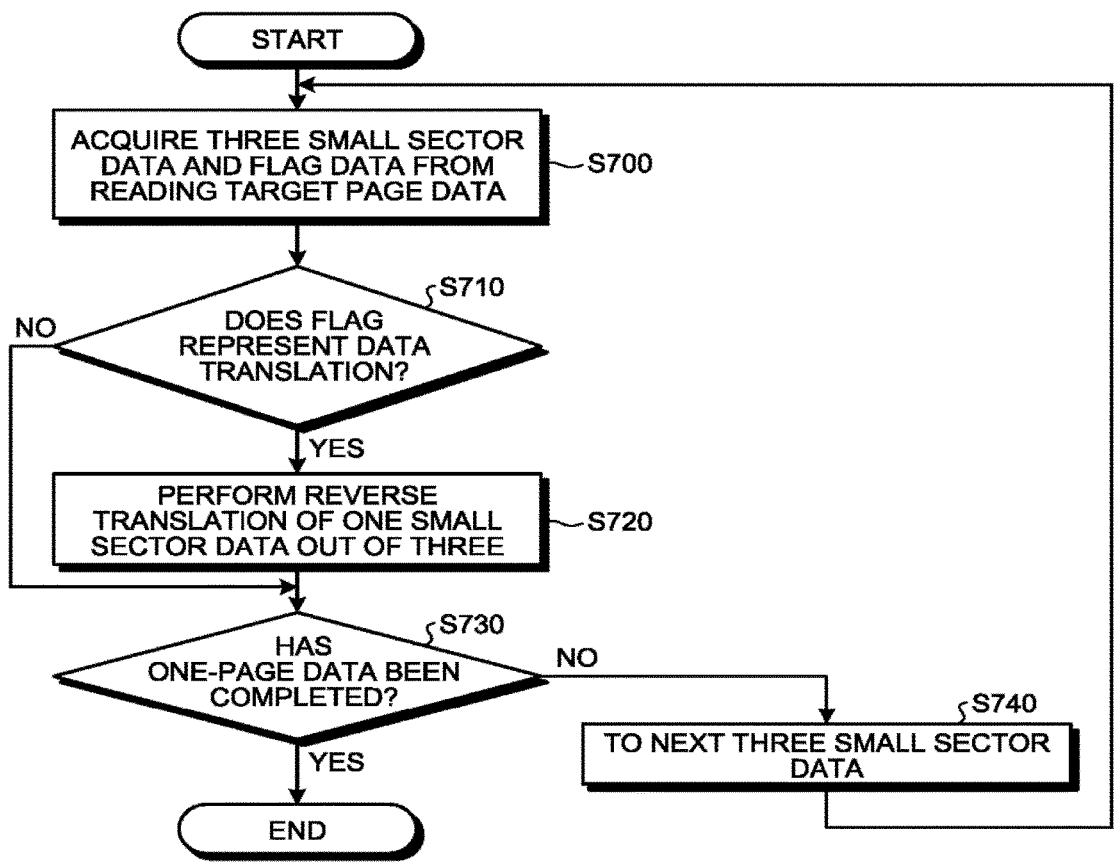
FIG. 26 is a flowchart that illustrates an example of a reverse data translating (decoding) process according to the seventh embodiment.

Next, a data reverse translating process at the time of decoding data performed by the data processing unit 50 will be described with reference to a flowchart illustrated in FIG. 26. Also in the seventh embodiment, at the time of decoding data, a reverse translation process is performed using only data stored in a page in which reading target data is included. In other words, the reverse translation process is performed using only the lower page data in a case where the reading target page is the lower page, the reverse translation process is performed using only the middle page data in a case where the reading target page is the middle page, and the reverse translation process is performed using only the upper page data in a case where the reading target page is the upper page.

The data processing unit 50 acquires three small sector data of a certain group and flag data corresponding to this three small sector data from reading target page data input from the ECC unit 60 (Step S700). The data processing unit 50 determines whether the flag data is "0" or "1" and determines whether a translation process has been performed for the small sector data (Step S710). In a case where the flag represents that the translation process is performed, the data processing unit 50 performs reverse translation for one small sector data among the three small sector data (Step S720).

In other words, in a case where the reading target page is a lower page, the data processing unit 50 performs reverse translation of the 1st small sector data among the three small sector data but does not perform anything for the remaining small sector data of the 2nd small sector data and the 3rd small sector data. In a case where the reading target page is a middle page, the data processing unit 50 performs reverse translation of the 2nd small sector data among the three small sector data but does not perform anything for the remaining small sector data of the 1st small sector data and the 3rd small sector data. In a case where the reading target page is an upper page, the data processing unit 50 performs reverse translation of the 3rd small sector data among the three small sector data but does not perform anything for the remaining small sector data of the 1st small sector data and the 2nd small sector data. The three small sector data for which the reverse translation is performed is input to the randomizer 40. The flag data is removed.

On the other hand, in a case where the flag represents that the translation process has not been performed, the data processing unit performs reverse translation for none of the three small sector data but inputs the three small sector data for which the reverse translation has not been performed to the randomizer 40. Next, the data processing unit 50 determines whether or not a reverse translation process corresponding to one-page data has been completed (Step S730). In a case where the process has not been completed, the data processing unit 50 sets the next three small sector data as a reverse translation target (Step S740) and performs a similar reverse translation process for the next three small sector data (Steps S700 to S720). In this way, the reverse translation process described above is performed for a part of the small sector data included in one-page data. The page data after the reverse translation is input to the randomizer 40.

In the case illustrated in FIG. 24, the lower page data included in the 1st small sector data is set as a data translation target, the middle page data included in the 2nd small sector data is set as a data translation target, and the upper page data included in the 3rd small sector data is set as a data translation target. However, in a case where data translation target pages do not overlap each other among the 1st small sector data, the 2nd small sector data, and the 3rd small sector data, arbitrary one-page data among the lower page data, the middle page data, and the upper page data may be set as a data translation target. For example, it may be configured such that the upper page data included in the 1st small sector data is set as a data translation target, the lower page data included in the 2nd small sector data is set as a data translation target, and the middle page data included in the 3rd small sector data is set as a data translation target.

In addition, it may be configured such that arbitrary two page data among the lower page data, the middle page data, and the upper page data included in the 1st small sector data is set as a data translation target, arbitrary two page data among the lower page data, the middle page data, and the upper page data included in the 2nd small sector data is set as a data translation target, and arbitrary two page data among the lower page data, the middle page data, and the upper page data included in the 3rd small sector data is set as a data translation target.

In a case where the seventh embodiment is applied to a memory cell of two bits/cell, for every two small sector data including the 1st small sector data and the 2nd small sector data, the flag data fl used for the lower page data and the flag data fu used for the upper page data may be added. In a case where the seventh embodiment is applied to a memory cell of four bits/cell, for every four small sector data including the 1st small sector data, the 2nd small sector data, the 3rd small sector data, the 4th small sector data, the flag data fl used for the lower page data, the flag data fu used for the upper page data, the flag data fh used for the higher page data, and flag data ft used for the top page data may be added.

In this way, in the seventh embodiment, data of a part of page data among data of m pages included in the small sector data is set as a data translation target, and data translation is not performed for the remaining pages, and accordingly, the number of data translation candidates is decreased, and the number of flag bits is decreased. Accordingly, the processing time of the data translation and the processing time of the data reverse translation are shortened to be less than those of the first to third embodiments.

(Eighth Embodiment)

In an eighth embodiment, in a case where data of m bits is stored in a memory cell, for the same page included in consecutive m pieces of small sector data, the same data translation is performed. Accordingly, when flag data of a certain page among m pages represents translation, for all the data of the certain page included in the consecutive m pieces of small sector data, data translation is determined to have been performed. On the other hand, in a case where the flag data represents no translation, for all the data of the certain page included in the consecutive m pieces of small sector data, the data translation is determined not to have been performed.

Figure 27:
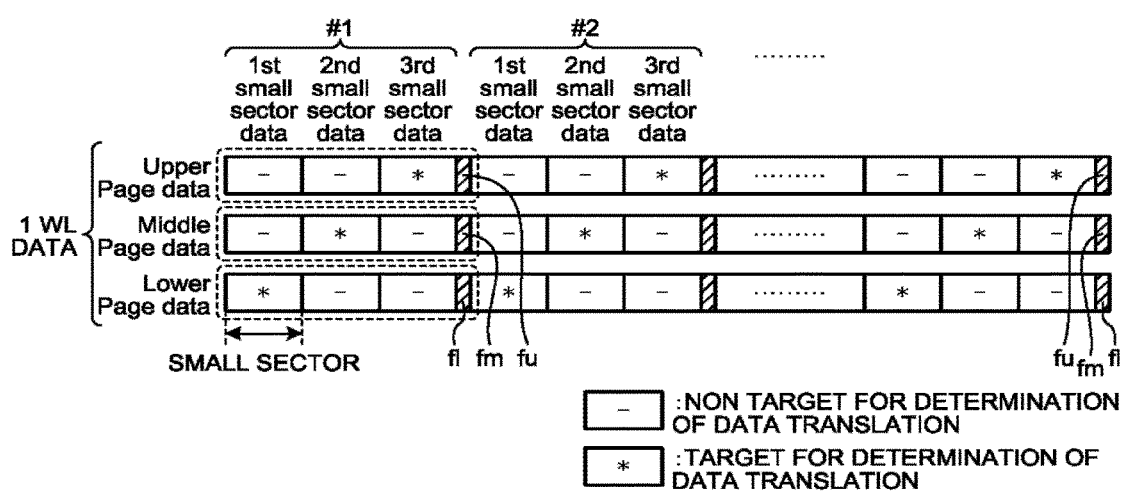
FIG. 27 is a diagram that illustrates a data translating (coding) process according to an eighth embodiment.

FIG. 27 is a diagram that illustrates a data translating process according to the eighth embodiment. A rectangle to which asterisk (*) is attached represents a determination target data of data translation. A rectangle to which minus (-) is attached represents non-reference data that is not referred to for data translation. Regarding the non-reference data, it is determined whether or not data translation is performed based on the result of a determination for the determination target data of the same page. Whether or not data translation is performed for the lower page data included in the 1st small sector data, the lower page data included in the 2nd small sector data, and the lower page data included in the 3rd small sector data is determined based on the lower page data included in the 1st small sector data. Similarly, whether or not data translation is performed for the middle page data included in the 1st small sector data, the middle page data included in the 2nd small sector data, and the middle page data included in the 3rd small sector data is determined based on the middle page data included in the 2nd small sector data. Similarly, whether or not data translation is performed for the upper page data included in the 1st small sector data, the upper page data included in the 2nd small sector data, and the upper page data included in the 3rd small sector data is determined based on the upper page data included in the 3rd small sector data.

In the eighth embodiment, for each small sector data, it is determined whether or not data translation is performed not based on data of all the pages of the m pages but data of one-page. For example, it is assumed that the object of the selection rule described above is to decrease a distribution having a high threshold voltage. In order to achieve the object, it is determined for the lower page data whether it is preferable to increase the appearance ratio of "0" (decrease the appearance ratio of "1") or whether it is preferable to increase the appearance ratio of "1" (decrease the appearance ratio of "0"). A similar determination is performed also for the middle page data and the upper page data. For example, in a case where it is determined to be preferable to increase the appearance ratio of "0" for the lower page data, whether or not data translation is performed is determined based on whether the appearance ratio of "0" is increased in a case where data translation is performed for the lower page data or the appearance ratio of "0" is increased in a case where data translation is not performed. This is similar also when another selection rule is employed, and the appearance ratios of "0" and "1" or arrangement patterns of "0" and "1" before data translation and after the data translation are compared with each other, and whether data translation is performed for each page is determined based on the comparison.

Figure 28:
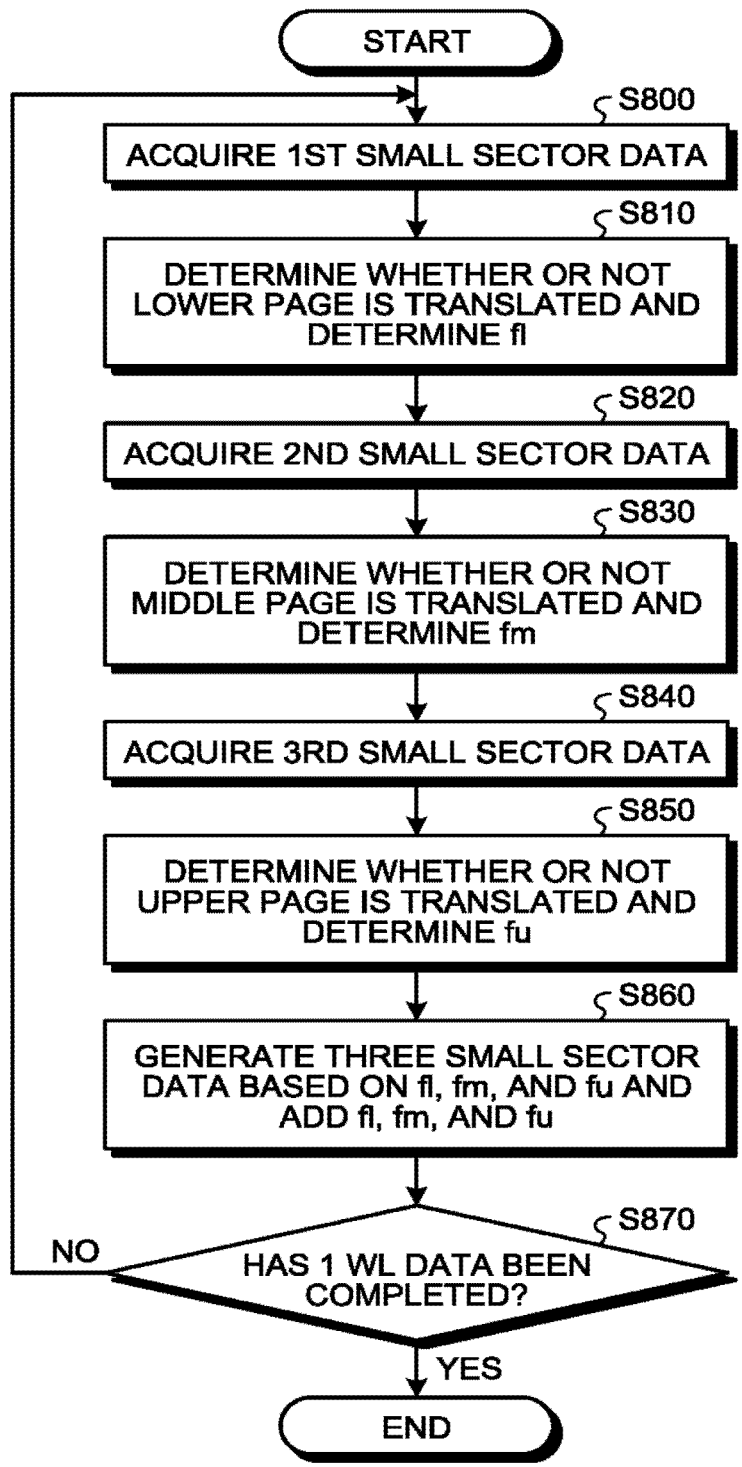
FIG. 28 is a flowchart that illustrates an example of the data translating (coding) process according to the eighth embodiment.

Next, a data translating process at the time of coding data that is performed by the data processing unit 50 will be described with reference to a flowchart illustrated in FIG. 28. The data processing unit 50 acquires one small sector data (the 1st small sector data including the lower page data, the middle page data, and the upper page data) of a certain group from 1 WL data input from the randomizer 40 (Step S800). The data processing unit 50 determines whether or not data translation is performed for the lower page data based on the lower page data of the 1st small sector data and determines flag data fl based on this determination (Step S810).

Next, the data processing unit 50 acquires next one small sector data (the 2nd small sector data including the lower page data, the middle page data, and the upper page data) from 1 WL data input from the randomizer 40 (Step S820). The data processing unit 50 determines whether or not data translation is performed for the middle page data based on the middle page data of the 2nd small sector data and determines flag data fm based on this determination (Step S830). Next, the data processing unit 50 acquires next one small sector data (the 3rd small sector data including the lower page data, the middle page data, and the upper page data) from 1 WL data input from the randomizer 40 (Step S840). The data processing unit 50 determines whether or not data translation is performed for the upper page data based on the upper page data of the 3rd small sector data and determines flag data fu based on this determination (Step S850).

The data processing unit 50 generates lower page data of three small sector data based on the determined flag data fl. In a case where the flag data fl is "0", the data processing unit 50 adds the flag data fl to the three small sector data without performing data translation for the three small sector data. On the other hand, in a case where the flag data fl is "1", the data processing unit 50 performs data translation for the three small sector data and adds the flag data fl to the three small sector data after the data translation. Similarly, the data processing unit 50 generates middle page data of three small sector data based on determined flag data fm and generates upper page data of three small sector data based on the determined flag data fu (Step S860).

The data processing unit 50 determines whether or not the translation process corresponding to 1 WL data has been completed (Step S870). In a case where the translation process has not been completed, the data processing unit 50 sets three small sector data of the next group as a translation target and performs a similar translation process for the next three small sector data (Steps S800 to S860). In this way, the translation process described above is performed for all the small sector data included in the 1 WL data.

Figure 29:
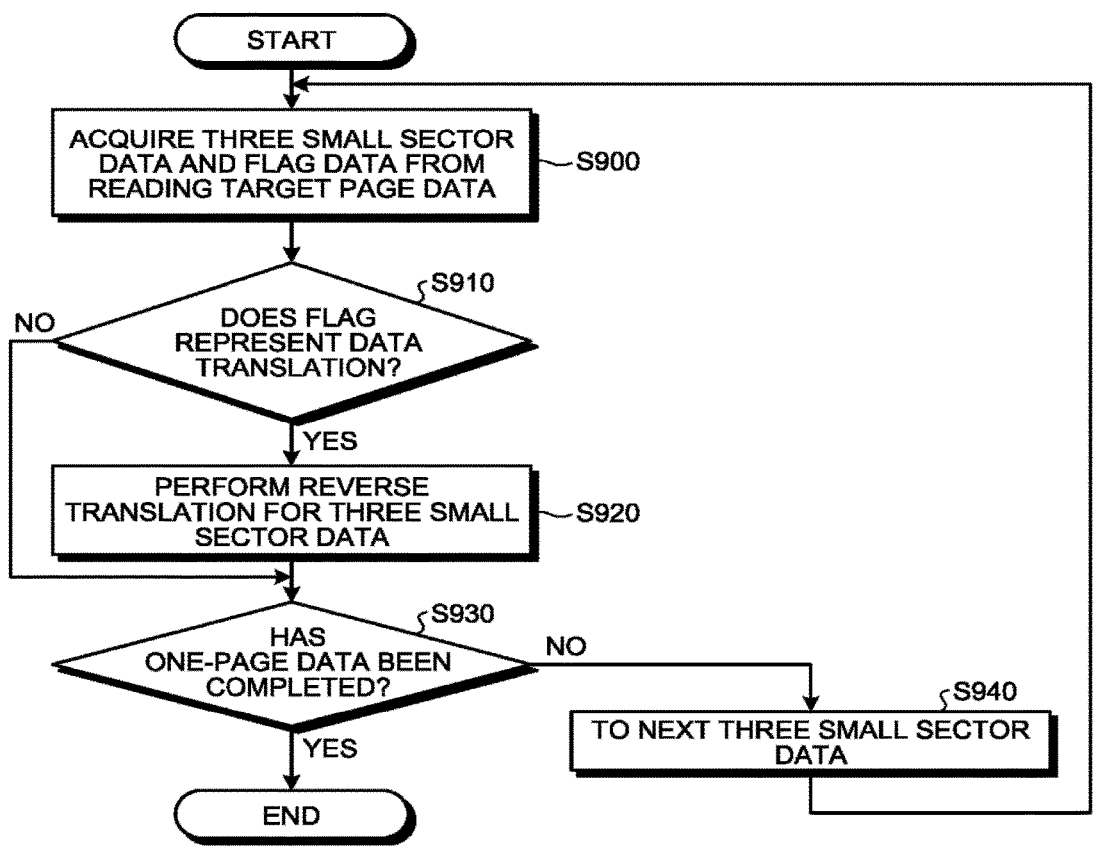
FIG. 29 is a flowchart that illustrates an example of a reverse data translating (decoding) process according to the eighth embodiment.

Next, a data reverse translation process at the time of decoding data that is performed by the data processing unit 50 will be described with reference to a flowchart illustrated in FIG. 29. Also in the eighth embodiment, at the time of decoding data, the reverse translation process is performed using only data stored in a page in which reading target data is included.

The data processing unit 50 acquires three small sector data of a certain group and flag data corresponding to the small sector data from reading target page data input from the ECC unit 60 (Step S900). The data processing unit 50 determines whether this flag data is "0" or "1" and determines whether or not a translation process has been performed for the small sector data (Step S910). In a case where the flag represents that the translation process is performed, the data processing unit 50 performs reverse translation of all the three small sector data (Step S920).

In other words, in a case where the reading target page is a lower page, the data processing unit 50 performs reverse translation for all the three small sector data. In a case where the reading target page is a middle page, the data processing unit 50 performs reverse translation for all the three small sector data. In a case where the reading target page is an upper page, the data processing unit 50 performs reverse translation for all the three small sector data. The three small sector data for which reverse translation has been performed is input to the randomizer 40. The flag data is removed.

On the other hand, in a case where the flag represents that the translation process has not been performed, the data processing unit performs reverse translation for none of the three small sector data but inputs the three small sector data for which the reverse translation has not been performed to the randomizer 40. Next, the data processing unit 50 determines whether or not a reverse translation process corresponding to one-page data has been completed (Step S930). In a case where the process has not been completed, the data processing unit 50 sets three small sector data of the next group as a reverse translation target (Step S940) and performs a similar reverse translation process for the next three small sector data (Steps S900 to S920). In this way, the reverse translation process described above is performed for a part of the small sector data included in one-page data. The page data after the reverse translation is input to the randomizer 40.

In addition, in the eighth embodiment, it may be configured such that two pages from among the lower page, the middle page, and the upper page are set as data translation determination target pages, and the remaining pages are set as non-reference pages that are not referred to for data translation. In other words, it may be configured such that one or more pages among m pages are set as data translation determination target pages, and the remaining pages are set as non-reference pages.

In this way, in the eighth embodiment, for the same pages included in m small sector data, the same data translation is performed, and accordingly, the number of flag bits is decreased. Therefore, the processing time for data translation and the processing time for data reverse translation are shortened to be less than those of the first to third embodiments.

(Ninth Embodiment)

In a ninth embodiment, similar to the eighth embodiment, in a case where data of m bits is stored in a memory cell, for the same pages included in consecutive m pieces of small sector data, the same data translation is performed. However, in the ninth embodiment, in the 2nd small sector data and the 3rd small sector data other than the 1st small sector data, whether or not data translation is performed is determined by referring to its own page data and results of data translations of preceding small sector data.

Figure 30:
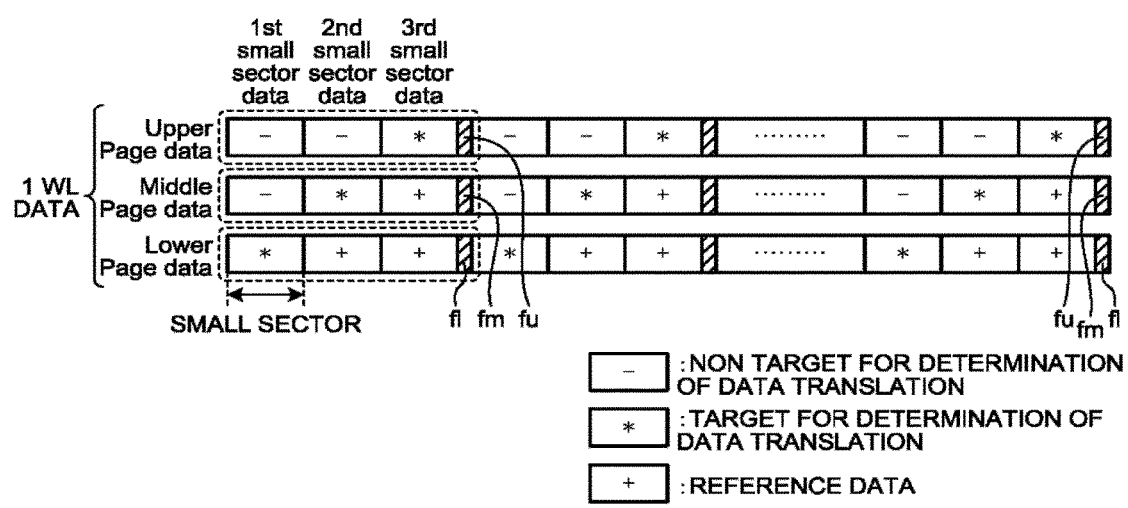
FIG. 30 is a diagram that illustrates a data translating (coding) process according to a ninth embodiment.

FIG. 30 is a diagram that illustrates a data translating process according to the ninth embodiment. A rectangle to which asterisk (*) is attached represents a determination target data of data translation. A rectangle to which minus (−) is attached represents non-reference data that is not referred to for data translation. Regarding the non-reference data, it is determined whether or not data translation is performed based on the result of a determination for the determination target data of the same page. A rectangle to which "plus (+)" is attached represents data for which whether or not data translation is performed is determined based on the result of a determination of determination target data of the same page and represents data that is referred to in a case where whether data translation of another page included in the same small sector data is performed or not is determined.

Whether or not data translation is performed for lower page data included in the 1st small sector data of a certain group is determined based on the lower page data included in the 1st small sector data. The contents of data translations for the lower page data included in the 2nd small sector data and the lower page data included in the 3rd small sector data are determined to be the same as this determination.

Whether or not data translation is performed for middle page data included in the 2nd small sector data is determined based on the middle page data included in the 2nd small sector data and the lower page data included in the 2nd small sector data of which the content of the data translation is determined in advance. The contents of data translations for the middle page data included in the 1st small sector data and the middle page data included in the 3rd small sector data are determined to be the same as this determination.

Whether or not data translation is performed for upper page data included in the 3rd small sector data is determined based on the upper page data included in the 3rd small sector data and the lower page data and the middle page data included in the 3rd small sector data of which the contents of the data translations are determined in advance. The contents of data translations for the upper page data included in the 1st small sector data and the upper page data included in the 2nd small sector data are determined to be the same as this determination.

Figure 31:
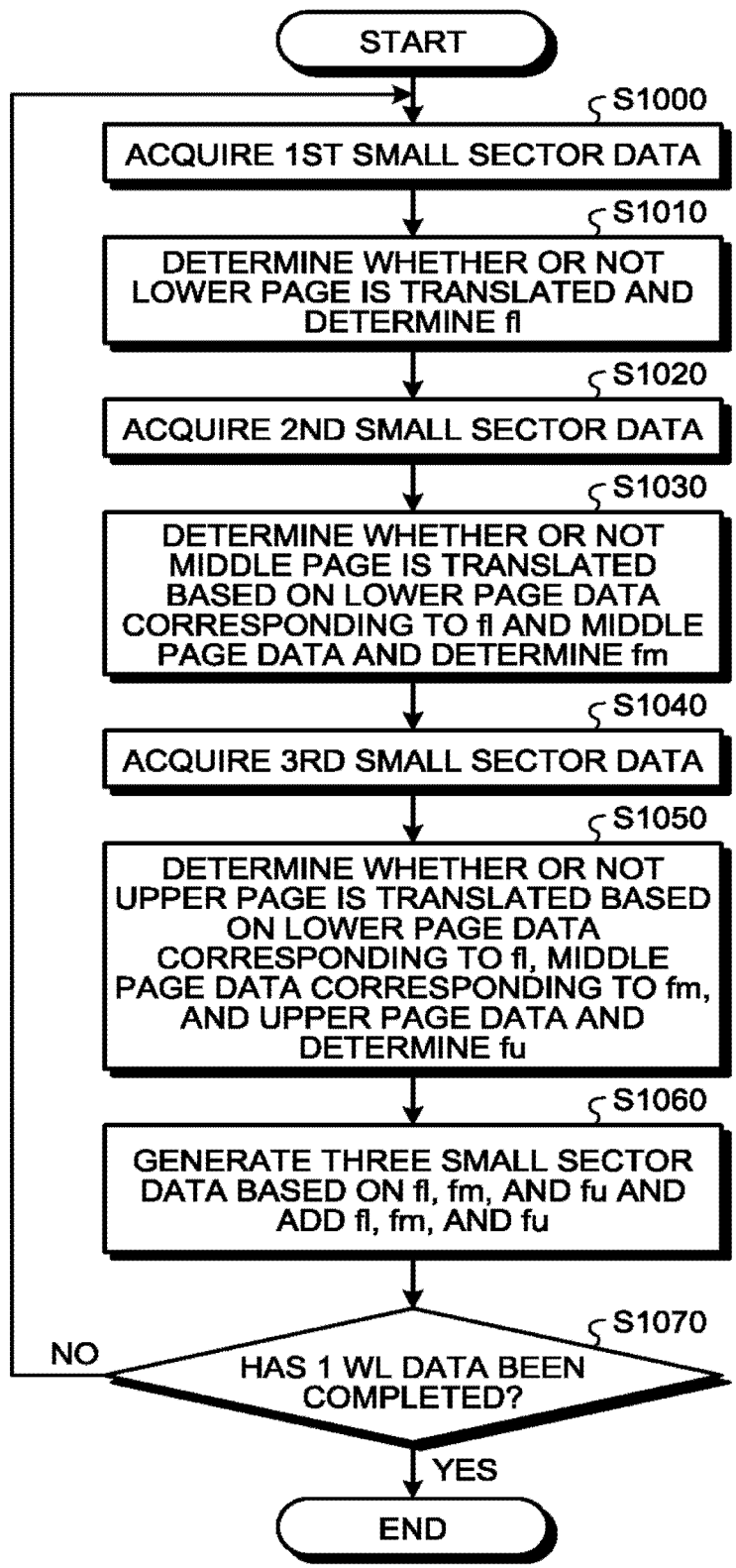
FIG. 31 is a flowchart that illustrates an example of the data translating (coding) process according to the ninth embodiment.

Next, a data translating process at the time of coding data that is performed by the data processing unit 50 will be described with reference to a flowchart illustrated in FIG. 31. The data processing unit 50 acquires one small sector data (the 1st small sector data including the lower page data, the middle page data, and the upper page data) of a certain group from 1 WL data input from the randomizer 40 (Step S1000). The data processing unit 50 determines whether or not data translation is performed for the lower page data based on the lower page data of the 1st small sector data and determines flag data fl based on this determination (Step S1010). In other words, in the case of the 1st small sector data, similarly to the eighth embodiment described above, whether or not data translation is performed is determined.

Next, the data processing unit 50 acquires next one small sector data (the 2nd small sector data including the lower page data, the middle page data, and the upper page data) from 1 WL data input from the randomizer 40 (Step S1020). The data processing unit 50 determines whether or not data translation is performed for the middle page data based on the middle page data of the 2nd small sector data and the lower page data of the 2nd small sector data for which data translation has been performed in accordance with the flag data fl and determines flag data fm based on this determination (Step S1030). In other words, when the flag data fl is "0", the data processing unit 50 determines whether or not data translation is performed for the middle page data based on the lower page data of the 2nd small sector data for which data translation has not been performed and the middle page data of the 2nd small sector data. On the other hand, when the flag data fl is "1", the data processing unit 50 determines whether or not data translation is performed for the middle page data based on the lower page data of the 2nd small sector data for which data translation has been performed and the middle page data of the 2nd small sector data. In this way, in the case of the 2nd small sector data, as a first data translation candidate, data including the lower page data of the 2nd small sector data for which data translation corresponding to the flag data fl has been performed and the middle page data of the 2nd small sector data for which data translation has not been performed is generated, and, as a second data translation candidate, data including the lower page data of the 2nd small sector data for which data translation corresponding to the flag data fl has been performed and the middle page data of the 2nd small sector data for which data translation has been performed is generated. Then, based on the appearance ratios of "0" and "1" or the arrangement patterns of "0" and "1" and the like, one is selected from the first and second data translation candidates.

Next, the data processing unit 50 acquires next one small sector data (the 3rd small sector data including the lower page data, the middle page data, and the upper page data) from 1 WL data input from the randomizer 40 (Step S1040). The data processing unit 50 determines whether or not data translation is performed for the upper page data based on the upper page data of the 3rd small sector data, the lower page data of the 3rd small sector data for which data translation has been performed in accordance with the flag data fl, and the middle page data of the 3rd small sector data for which data translation has been performed in accordance with the flag data fm and determines flag data fu based on this determination (Step S1050). In other words, when the flag data fl is "0", and the flag data fm is "0", the data processing unit 50 determines whether or not data translation is performed for the upper page data based on the lower page data of the 3rd small sector data for which data translation has not been performed and the middle page data of the 3rd small sector data and the upper page data of the 3rd small sector data for which data translation has not been performed. On the other hand, when the flag data fl is "1", and the flag data fm is "1", the data processing unit 50 determines whether or not data translation is performed for the upper page data based on the lower page data of the 3rd small sector data for which data translation has been performed, the middle page data of the 3rd small sector data for which data translation has been performed, and the upper page data of the 3rd small sector data. In this way, in the case of the 3rd small sector data, as a first data translation candidate, data including the lower page data of the 3rd small sector data for which data translation corresponding to the flag data fl has been performed, the middle page data of the 3rd small sector data for which data translation corresponding to the flag data fm has been performed, and the upper page data of the 3rd small sector data for which data translation has not been performed is generated. In addition, as a second data translation candidate, data including the lower page data of the 3rd small sector data for which data translation corresponding to the flag data fl has been performed, the middle page data of the 3rd small sector data for which data translation corresponding to the flag data fm has been performed, and the upper page data of the 3rd small sector data for which data translation has been performed is generated. Then, the distribution data strings of the first and second data translation candidates are generated, and, based on the selection rule described above, one is selected from the first and second data translation candidates.

The data processing unit 50 generates lower page data of the three small sector data based on the determined flag data fl. In a case where the flag data fl is "0", the data processing unit 50 adds the flag data fl to the three small sector data without performing data translation for the three small sector data. On the other hand, in a case where the flag data fl is "1", the data processing unit 50 performs data translation for the three small sector data and adds the flag data fl to the three small sector data after the data translation. Similarly, the data processing unit 50 generates middle page data of the three small sector data based on the determined flag data fm and generates upper page data of the three small sector data based on the determined flag data fu (Step S1060).

The data processing unit 50 determines whether or not the translation process corresponding to 1 WL data has been completed (Step S1070). In a case where the translation process has not been completed, the data processing unit 50 sets next three small sector data as a translation target and performs a similar translation process for the next three small sector data (Steps S1000 to S1060). In this way, the translation process described above is performed for all the small sector data included in the 1 WL data.

A data reverse translation process at the time of decoding data according to the ninth embodiment is the same as that at the time of decoding data according to the eighth embodiment, and thus, duplicate description will not be presented.

In addition, in the ninth embodiment, the middle page data or the upper page data of the 1st small sector data may be set as a data translation determination target page. Similarly, the lower page data or the upper page data of the 2nd small sector data may be set as a data translation determination target page. Similarly, the lower page data or the middle page data of the 3rd small sector data may be set as a data translation determination target page.

In this way, in the ninth embodiment, the same data translation is performed for the same pages included in consecutive m pieces of small sector data, and accordingly, the number of flag bits is decreased. Therefore, the processing time for data translation and the processing time for data reverse translation are shortened to be less than those according to the first to third embodiments.

(Tenth Embodiment)

In a tenth embodiment, similar to the eighth or ninth embodiment, in a case where data of m bits is stored in a memory cell, the same data translation is performed for the same pages included in consecutive m pieces of small sector data. However, in the tenth embodiment, data and flags are arranged such that m small sector data assigned to flag data fl used for the lower page data, m small sector data assigned to flag data fm used for the middle page data, and m small sector data assigned to flag data fu used for the upper page data shift from each other by one small sector.

Figure 32:
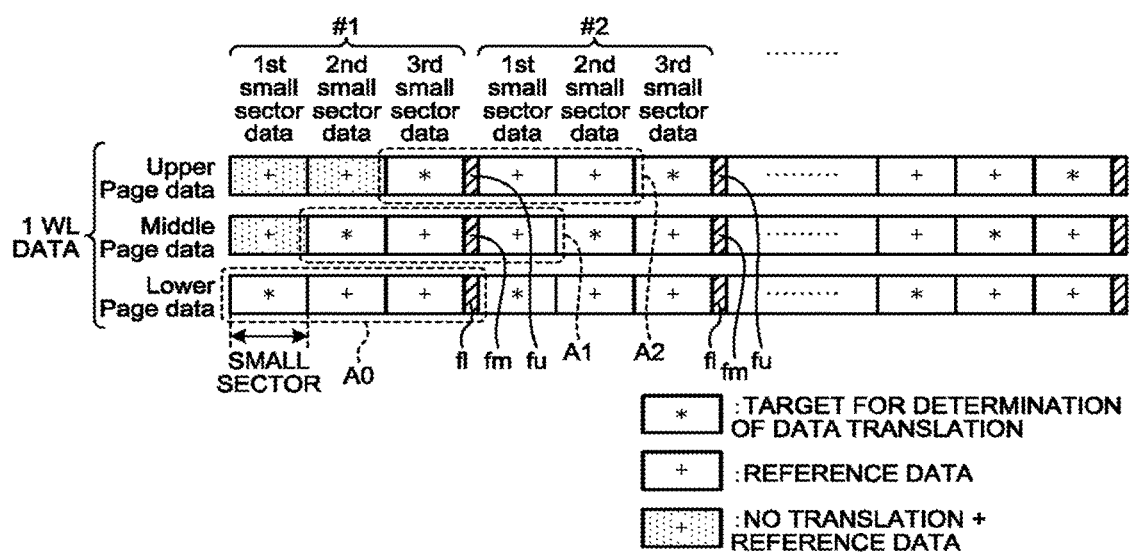
FIG. 32 is a diagram that illustrates a data translating (coding) process according to a tenth embodiment.

FIG. 32 is a diagram that illustrates a data translating process according to the tenth embodiment. A rectangle to which a stipple pattern or "plus (+)" are attached represents data for which data translation is not performed and represents data that is referred to in a case where whether data translation of another page included in the same small sector data is performed or not is determined. A rectangle to which asterisk (*) is attached represents a determination target data of data translation. A rectangle to which "plus (+)" is attached represents data for which data translation is determined to be performed or not based on a result of the determination of the determination target data of the same page and represents data that is referred to in a case where whether data translation of another page included in the same small sector data is performed or not is determined.

In the case illustrated in FIG. 32, in an area surrounded by a broken line A0, the flag data fl and lower page data in units of three small sector data assigned to this flag data fl are disposed. In other words, the flag fl disposed inside the broken line A0 represents the translation states of lower page data included in 1st small sector data of group #1, lower page data included in 2nd small sector data of group #1, and lower page data included in 3rd small sector data of group #1. In an area surrounded by a broken line A1, flag data fm and middle page data in units of three small sector data assigned to this flag data fm are disposed. In other words, the flag fm disposed inside the broken line A1 represents the translation states of middle page data included in 2nd small sector data of group #1, middle page data included in 3rd small sector data of group #1, and middle page data included in 1st small sector data of group #2. In an area surrounded by a broken line A2, flag data fu and upper page data in units of three small sector data assigned to this flag data fu are disposed. In other words, the flag fu disposed inside the broken line A2 represents the translation states of upper page data included in 3rd small sector data of group #1, upper page data included in 1st small sector data of group #2, and upper page data included in 2nd small sector data of group #2.

A data translating process at the time of coding data that is performed by the data processing unit 50 will be described with reference to flowcharts illustrated in FIGS. 33 and 34.

Figure 33:
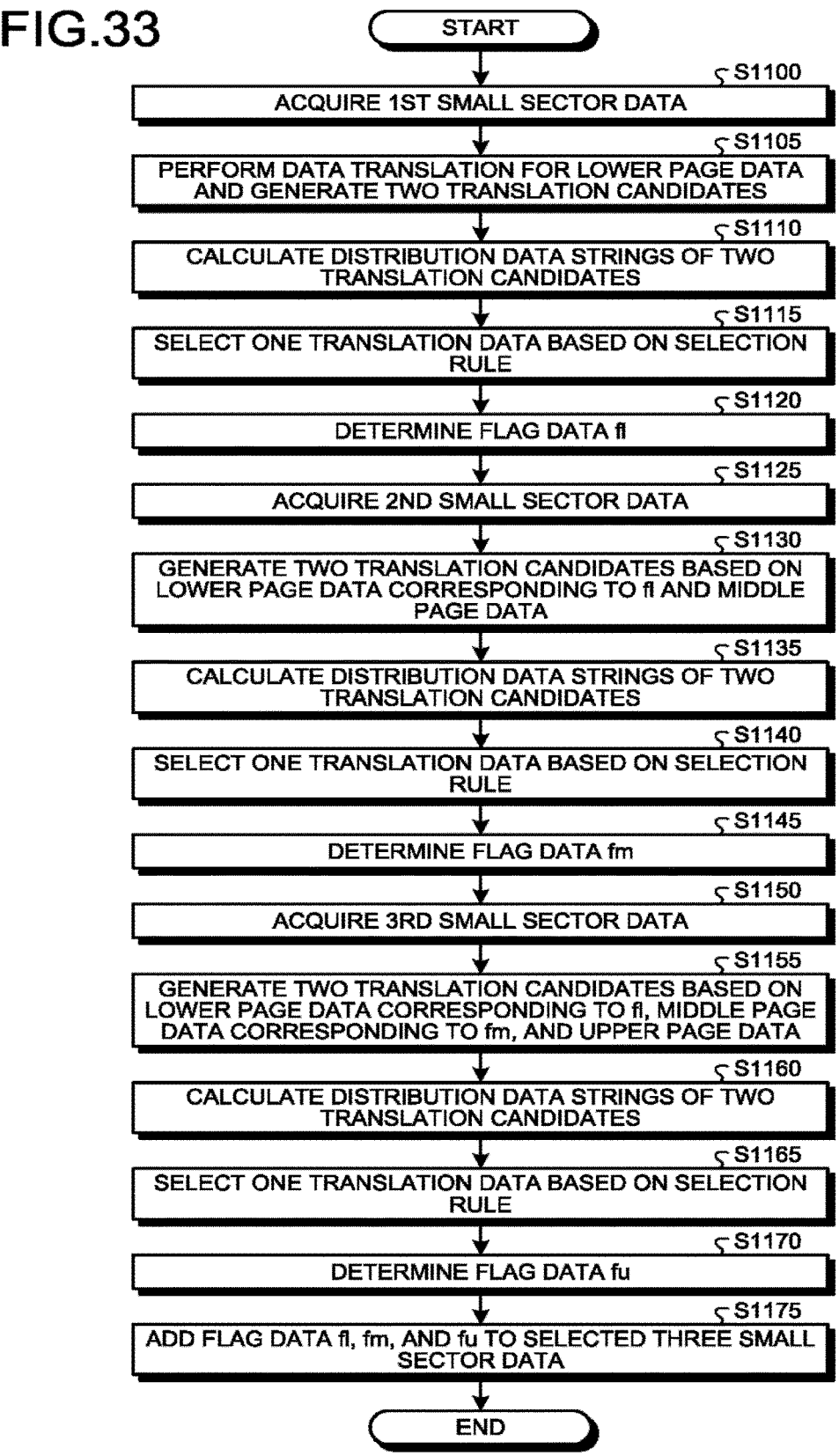
FIG. 33 is a flowchart that illustrates an example of the data translating (coding) process according to the tenth embodiment.
Figure 34:
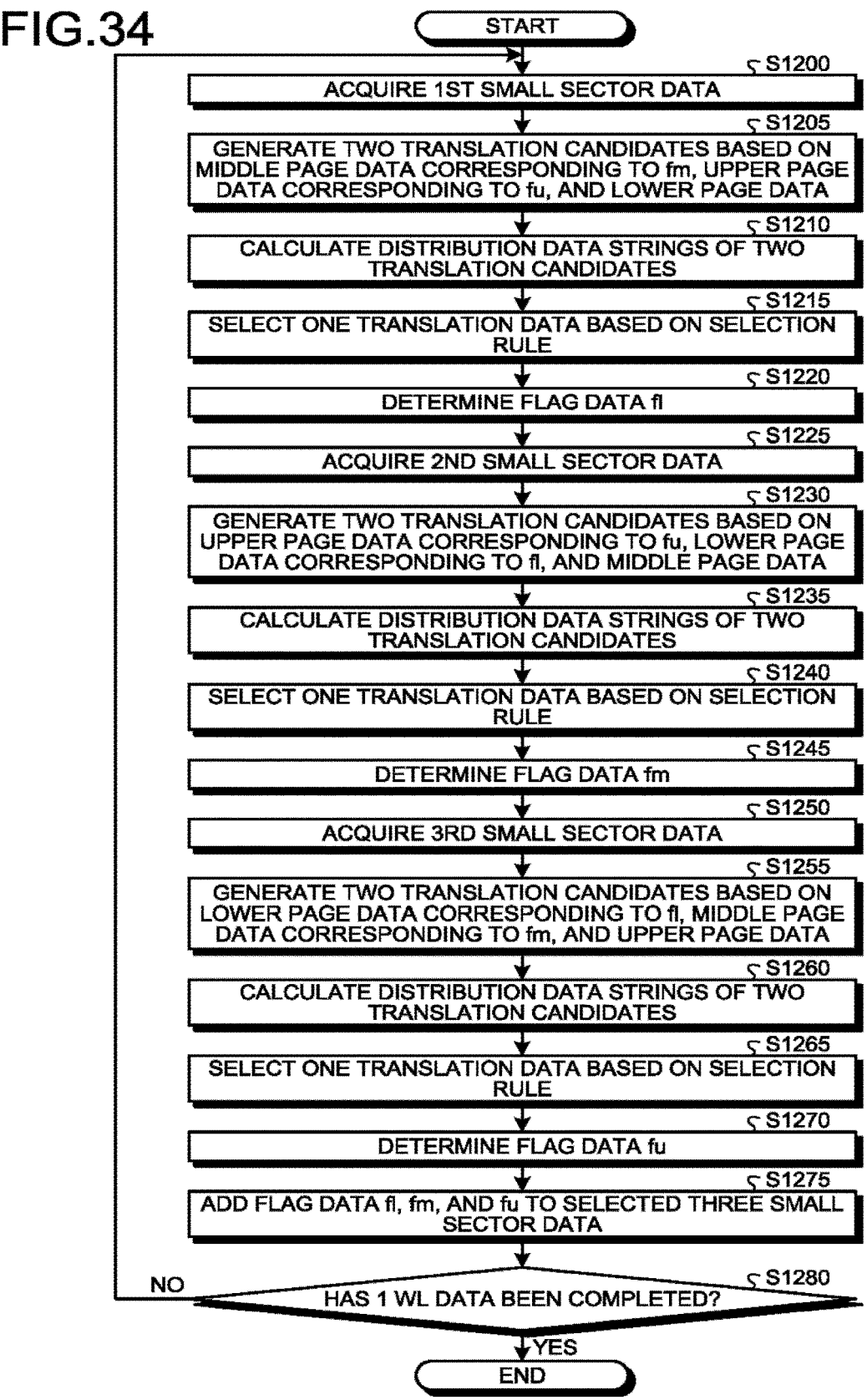
FIG. 34 is a flowchart that illustrates an example of the data translating (coding) process according to the tenth embodiment.

FIG. 33 is a flowchart that illustrates a data translating process for the small sector data of group #1. FIG. 34 is a flowchart that illustrates a data translating process for the subsequent small sector data starting from group #2.

First, a data translating process for small sector data of group #1 will be described with reference to FIG. 33. The data processing unit 50 acquires 1st small sector data of group #1 from 1 WL data input from the randomizer 40 (Step S1100). The data processing unit 50 performs data translation for the lower page data of the 1st small sector data of group #1 and generates two data translation candidates (Step S1105). A first data translation candidate includes lower page data for which data translation has not been performed, middle page data for which data translation has not been performed, and upper page data for which data translation has not been performed. A second data translation candidate includes lower page data for which data translation has been performed, middle page data for which data translation has not been performed, and upper page data for which data translation has not been performed. The data processing unit 50, for each generated data translation candidate, generates and stores a distribution data string in which a memory cell number and a threshold voltage distribution are associated with each other (Step S1110). Next, the data processing unit 50 selects one from the two data translation candidates based on the selection rule described above (Step S1115). The data processing unit 50 determines flag data fl corresponding to the one translation candidate that has been selected (Step S1120).

The data processing unit 50 acquires the 2nd small sector data of group #1 from 1 WL data input from the randomizer 40 (Step S1125). The data processing unit 50 generates two data translation candidates based on the flag data fl determined in Step S1120 and the middle page data of the 2nd small sector data of group #1 (Step S1130). A first data translation candidate includes upper page data for which data translation has not been performed, middle page data for which data translation has not been performed, and lower page data for which the same data translation as that of the flag fl has been performed. A second data translation candidate includes upper page data for which data translation has not been performed, middle page data for which data translation has been performed, and lower page data for which the same data translation as that of flag fl has been performed. The data processing unit 50, for each generated data translation candidate, generates and stores a distribution data string in which a memory cell number and a threshold voltage distribution are associated with each other (Step S1135). Next, the data processing unit 50 selects one from two data translation candidates based on the selection rule described above (Step S1140). Next, the data processing unit 50 determines flag data fm corresponding to the one translation candidate that has been selected (Step S1145).

Next, the data processing unit 50 acquires 3rd small sector data of group #1 from 1 WL data input from the randomizer 40 (Step S1150). The data processing unit 50 generates two data translation candidates based on the flag data fl determined in Step S1120, the flag data fm determined in Step S1145, and the upper page data of the 3rd small sector data of group #1 (Step S1155). A first data translation candidate includes upper page data for which data translation has not been performed, middle page data for which the same data translation as that of the flag fm has been performed, and lower page data for which the same data translation as that of the flag fl has been performed. A second data translation candidate includes upper page data for which data translation has been performed, middle page data for which the same data translation as that of the flag fm has been performed, and lower page data for which the same data translation as that of the flag fl has been performed. The data processing unit 50, for each generated data translation candidate, generates and stores a distribution data string in which a memory cell number and a threshold voltage distribution are associated with each other (Step S1160). Next, the data processing unit 50 selects one from two data transformation candidates based on the selection rule described above (Step S1165). Next, the data processing unit 50 determines flag data fu corresponding to the one translation candidate that has been selected (Step S1170).

The data processing unit 50 generates three small sector data of group #1 based on the determined flag data fl, fm, and fu and adds corresponding flag data (Step S1175). First, the data processing unit 50 generates lower page data of the three small sector data of group #1 based on the determined flag data fl. In a case where the flag data fl is "0", the data processing unit 50 adds the flag data fl to the lower page data of the three small sector data without performing data translation for the lower page data of the three small sector data of group #1. On the other hand, in a case where the flag data fl is "1", the data processing unit 50 performs data translation for the three small sector data of group #1 and adds the flag data fl to the lower page data of the three small sector data after the data translation.

The data processing unit 50 generates middle page data of the three small sector data of group #1 based on the determined flag data fm. In a case where the flag data fm is "0", the data processing unit 50 adds the flag data fm to the middle page data of the three small sector data without performing data translation for the middle page data of the three small sector data of group #1. On the other hand, in a case where the flag data fm is "1", the data processing unit 50 performs data translation for the middle page data of the 2nd small sector data of group #1 and the middle page data of the 3rd small sector data of group #1 and adds the flag data fm to the middle page data of the 1st small sector data of group #1 for which data translation has not been performed, the middle page data of the 2nd small sector data of group #1 after data translation, and the middle page data of the 3rd small sector data of group #1 after data translation.

The data processing unit 50 generates upper page data of three small sector data of group #1 based on the determined flag data fu. In a case where the flag data fu is "0", the data processing unit 50 adds the flag data fu to the upper page data of the three small sector data without performing data translation for the upper page data of the three small sector data of group #1. On the other hand, in a case where the flag data fu is "1", the data processing unit 50 performs data translation for the upper page data of the 3rd small sector data of group #1 and adds the flag data fu to the upper page data of the 1st small sector data of group #1 for which data translation has not been performed, the upper page data of the 2nd small sector data of group #1 for which data translation has not been performed and the upper page data of the 3rd small sector data of group #1 after data translation.

Next, a data translating process for small sector data included in group #2 and subsequent groups will be described with reference to FIG. 34. The data processing unit 50 acquires 1st small sector data of group #2 from 1 WL data input from the randomizer 40 (Step S1200). The data processing unit 50 generates two data translation candidates for the 1st small sector data of group #2 based on the flag data fm and fu determined in advance based on the small sector data of group #1 and the lower page data of the 1st small sector data of group #2 (S1205). A first data translation candidate includes lower page data of the 1st small sector data of group #2 for which data translation has not been performed, middle page data of the 1st small sector data of group #2 for which the same translation as that of the flag fm has been performed, and the upper page data of the 1st small sector data of group #2 for which the same data translation as that of the flag fu has been performed. second data translation candidate includes lower page data of the 1st small sector data of group #2 for which data translation has been performed, middle page data of the 1st small sector data of group #2 for which the same translation as that of the flag fm has been performed, and the upper page data of the 1st small sector data of group #2 for which the same data translation as that of the flag fu has been performed. The data processing unit 50, for each generated data translation candidate, generates and stores a distribution data string in which a memory cell number and a threshold voltage distribution are associated with each other (Step S1210). Next, the data processing unit 50, based on the selection rule described above, selects one from the two data translation candidates (Step S1215). Next, the data processing unit 50 determines flag data fl corresponding to the one translation candidate that has been selected and updates the flag data fl (Step S1220).

The data processing unit 50 acquires 2nd small sector data of group #2 from 1 WL data input from the randomizer 40 (Step S1225). The data processing unit 50 generates two data translation candidates based on the flag data fu determined in advance based on the small sector data of group #1, the flag data fl determined in advance in Step S1220 based on the small sector data of group #2, and the middle page data of the 2nd small sector data of group #2 (Step S1230). A first data translation candidate includes lower page data of the 2nd small sector data of group #2 for which the same data translation as that of the flag fl has been performed, middle page data for which data translation has not been performed, and the upper page data of the 2nd small sector data of group #2 for which the same data translation as that of the flag fu has been performed. A second data translation candidate includes lower page data of the 2nd small sector data of group #2 for which the same data translation as that of the flag fl has been performed, middle page data for which data translation has been performed, and the upper page data of the 2nd small sector data of group #2 for which the same data translation as that of the flag fu has been performed. The data processing unit 50, for each generated data translation candidate, generates and stores a distribution data string in which a memory cell number and a threshold voltage distribution are associated with each other (Step S1235). Next, the data processing unit 50, based on the selection rule described above, selects one from the two data translation candidates (Step S1240). Next, the data processing unit 50 determines flag data fm corresponding to the one translation candidate that has been selected (Step S1245). The data processing unit 50 stores the flag data fm determined based on the small sector data of group #1 at the previous time as first flag data fm1 and stores the flag data fm determined based on the small sector data of group #2 at this time as second flag data fm2.

The data processing unit 50 acquires 3rd small sector data of group #2 from 1 WL data input from the randomizer 40 (Step S1250). The data processing unit 50 generates two data translation candidates based on the flag data fl determined in advance based on the small sector data of group #2 in Step S1220, the flag data fm determined in advance in Step S1245 based on the small sector data of group #2, and the upper page data of the 3rd small sector data of group #2 (Step S1255). A first data translation candidate includes lower page data of the 3rd small sector data of group #2 for which the same data translation as that of the flag fl has been performed, middle page data of the 3rd small sector data of group #2 for which the same data translation as that of the flag fm has been performed, and the upper page data of the 3rd small sector data of group #2 for which data translation has not been performed. A second data translation candidate includes lower page data of the 3rd small sector data of group #2 for which the same data translation as that of the flag fl has been performed, middle page data of the 3rd small sector data of group #2 for which the same data translation as that of the flag fm has been performed, and the upper page data of the 3rd small sector data of group #2 for which data translation has been performed. The data processing unit 50, for each generated data translation candidate, generates and stores a distribution data string in which a memory cell number and a threshold voltage distribution are associated with each other (Step S1260). Next, the data processing unit 50, based on the selection rule described above, selects one from the two data translation candidates (Step S1265). Next, the data processing unit 50 determines flag data fu corresponding to the one translation candidate that has been selected (Step S1270). The data processing unit 50 stores the flag data fu determined based on the small sector data of group #1 at the previous time as first flag data fu1 and stores the flag data fm determined based on the small sector data of group #2 at this time as second flag data fu2.

The data processing unit 50 generates three small sector data of group #2 based on the flag data fl updated in Step S1220, the first flag data fm1, the second flag data fm2, the first flag data fu1, and the second flag data fu2 and adds corresponding flag data (Step S1275). First, the data processing unit 50 generates the lower page data of the three small sector data of group #2 based on the flag data fl. In a case where the flag data fl is "0", the data processing unit 50 adds the flag data fl to the three small sector data without performing data translation for the three small sector data. In a case where the flag data fl is "1", the data processing unit 50 performs data translation for the three small sector data and adds the flag data fl to the three small sector data after the data translation.

The data processing unit 50 generates the middle page data of the three small sector data of group #2 based on the first flag data fm1 determined at the previous time and the second flag data fm2 determined at this time. For example, in a case where the first flag data fm1 is "0", and the second flag data fm2 is "0", the data processing unit 50 adds the second flag data fm2 to the middle page data of the three small sector data without performing data translation for the middle page data of the three small sector data.

In addition, in a case where the first flag data fm1 is "1", and the second flag data fm2 is "0", the data processing unit 50 performs data translation for the middle page data included in the 1st small sector data of group #2. Then, the data processing unit 50 adds the second flag data fm2 to the 1st small sector data after this data translation, the 2nd small sector data for which data translation has not been performed, and the 3rd small sector data for which data translation has not been performed.

Furthermore, in a case where the first flag data fm1 is "0", and the second flag data fm2 is "1", the data processing unit 50 performs data translation for the middle page data included in the 2nd small sector data of group #2 and the middle page data included in the 3rd small sector data of group #2. Then, the data processing unit 50 adds the second flag data fm2 to the 1st small sector data for which data translation has not been performed, the 2nd small sector data after data translation, and the 3rd small sector data after data translation.

In addition, in a case where the first flag data fm1 is "1", and the second flag data fm2 is "1", the data processing unit 50 performs data translation for the middle page data included in the 1st small sector data of group #2, the middle page data included in the 2nd small sector data of group #2, and the middle page data included in the 3rd small sector data of group #2. Then, the data processing unit 50 adds the second flag data fm2 to the 1st small sector data after the data translation, the 2nd small sector data after the data translation, and the 3rd small sector data after the data translation.

The data processing unit 50 generates upper page data of three small sector data of group #2 based on the first flag data ful determined at the previous time and the second flag data fu2 determined at this time.

For example, in a case where the first flag data ful is "0", and the second flag data fu2 is "0", the data processing unit 50 adds the second flag data fu2 to the upper page data of the three small sector data without performing data translation for the upper page data of the three small sector data.

In addition, in a case where the first flag data ful is "1", and the second flag data fu2 is "0", the data processing unit 50 performs data translation for the upper page data included in the 1st small sector data of group #2 and the upper page data included in the 2nd small sector data of group #2. Then, the data processing unit 50 adds the second flag data fu2 to the 1st small sector data after this data translation, the 2nd small sector data after the data translation, and the 3rd small sector data for which data translation has not been performed.

Furthermore, in a case where the first flag data ful is "0", and the second flag data fu2 is "1", the data processing unit 50 performs data translation for the upper page data included in the 3rd small sector data of group #2. Then, the data processing unit 50 adds the second flag data fu2 to the 1st small sector data for which data translation has not been performed, the 2nd small sector data for which data translation has not been performed, and the 3rd small sector data after the data translation.

In addition, in a case where the first flag data ful is "1", and the second flag data fu2 is "1", the data processing unit 50 performs data translation for the upper page data included in the 1st small sector data of group #2, the upper page data included in the 2nd small sector data of group #2, and the upper page data included in the 3rd small sector data of group #2. Then, the data processing unit 50 adds the second flag data fu2 to the 1st small sector data after the data translation, the 2nd small sector data after the data translation, and the 3rd small sector data after the data translation.

The data processing unit 50 determines whether or not the translation process corresponding to 1 WL data has been completed (Step S1250). In a case where the translation process has not been completed, the data processing unit 50 sets three small sector data of the next group as a translation target and performs a similar translation process for the three small sector data of the next group (Steps S1200 to S1275). In this way, the translation process described above is performed for all the small sector data included in the 1 WL data.

Next, a data reverse translation process at the time of decoding data that is performed by the data processing unit 50 will be described with reference to the previous flowchart illustrated in FIG. 29. Also in the tenth embodiment, at the time of decoding data, the reverse translation process is performed using only data stored in a page in which reading target data is included.

The data processing unit 50 acquires three small sector data and flag data corresponding to the small sector data from reading target page data input from the ECC unit 60 (Step S900).

Namely, in a case where the reading target page is a lower page, as denoted by A0 in FIG. 32, lower page data included in the 1st small sector data of a certain group #K, lower page data included in the 2nd small sector data of the group #K, lower page data included in the 3rd small sector data of the group #K, and flag data fl belonging to the group #K are acquired.

In a case where the reading target page is a middle page, as denoted by A1 in FIG. 32, middle page data included in the 2nd small sector data of a certain group #K, middle page data included in the 3rd small sector data of the group #K, flag data fm belonging to the group #K, and middle page data included in the 1st small sector data of the next group #(K+1) are acquired.

In a case where the reading target page is an upper page, as denoted by A2 in FIG. 32, upper page data included in the 3rd small sector data of a certain group #K, flag data fu belonging to the group #K, upper page data included in the 1st small sector data of the next group #(K+1), and upper page data included in the 1st small sector data of the next group #(K+1) are acquired.

The data processing unit 50 determines whether or not a translation process has been performed for small sector data by determining whether the acquired flag data is "0" or "1" and (Step S910). In a case where the flag represents that the translation process is performed, the data processing unit 50 performs reverse translation for all the acquired three small sector data (Step S920). The three small sector data for which the reverse translation has been performed is input to the randomizer 40. The flag data is removed. On the other hand, in a case where the flag represents that the translation process has not been performed, the data processing unit 50 inputs the three small sector data for which the reverse translation has not been performed to the randomizer 40 without performing reverse translation for none of the three small sector data. The flag data is removed. Next, the data processing unit 50 determines whether or not the reverse translation process corresponding to one-page data has been completed (Step S930). In a case where the reverse translation process has not been completed, the data processing unit 50 sets the next three small sector data as a reverse translation target (Step S940) and performs a similar reverse translation process for the next three small sector data (Step S900 to S920).

In a case where the reading target page is a middle page, for the middle page data of the 1st small sector data of group #1, data reverse translation is not performed regardless of the flag data fm. In addition, in a case where reading target page is an upper page, the upper page data of the 1st small sector data of group #1 and the upper page data of the 2nd small sector data of group #1, data reverse translation is not performed regardless of the flag data fu.

In this way, in the tenth embodiment, for the same pages included in m small sector data, the same data translation is performed, and accordingly, the number of flag bits is decreased. Therefore, the processing time for data translation and the processing time for data reverse translation are shortened to be less than those of the first to third embodiments.

In the first to tenth embodiments described above, while one type of data coding for each of four values, eight values, and 16 values has been illustrated for the data coding of multi-value memory cells, the first to tenth embodiments can be applied to different data coding. In addition, in the first to tenth embodiments, while threshold voltage distributions of four values, eight values, of 16 values have been illustrated, the first to tenth embodiments described above may be applied also to a memory having more threshold voltage distributions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a nonvolatile memory including a plurality of physical sectors, each of the physical sectors including memory cells, each of the memory cells being capable of storing data of m bits using threshold voltage distributions of the m-th power of two, each of the physical sectors storing data of m pages, the m pages including first to m-th pages, m being a natural number of two or more; and
    a controller configured to:
    generate data translation candidates of the m-th power of two based on first to m-th data to be written into the first to m-th pages, the data translation candidates of the m-th power of two including all the combinations of the first data to m-th data and first processed data to m-th processed data, the first processed data to the m-th processed data being data after first data translation of the first data to m-th data;
    select one data translation candidate from among the generated data translation candidates of the m-th power of two based on a first selection rule; and
    write, into the first to m-th pages, first to m-th write data and first to m-th flags by writing the k-th write data and the k-th flag into k page, the first to m-th write data being included in the selected one data translation candidate, the first to m-th flags at least representing whether or not the first data translation is performed for the first to m-th data, the first to m-th write data corresponding to the first to m-th data or the first to m-th processed data, the first to m-th flags being the flags each corresponding to the first to m-th write data, the first to m-th flags being stored in a same memory cell, k being a natural number of one to m.

2. The memory system according to claim 1, wherein the controller is configured:
    to determine whether or not the first data translation is performed for read data based on a flag included in the data read from the nonvolatile memory, the flag included in the data read from the nonvolatile memory corresponding to one of the first to m-th flags; and
    not to perform inverse translation of the first data translation for the read data in a case where the first data translation is not performed and perform the inverse translation of the first data translation for the read data in a case where the first data translation is performed.

3. The memory system according to claim 1, wherein the first to m-th data are data designated by a write request from a host or data acquired by randomizing the data designated by the write request.

4. The memory system according to claim 1, wherein the controller is configured to perform the first data translation for the first to m-th data by a first management unit and add the first to m-th flags in correspondence with data of the first management unit, the first management unit having a certain data length acquired by dividing data of one page into a plurality of parts.

5. The memory system according to claim 4, wherein the controller is configured to add the k-th flag following the data of the first management unit of the k-th write data.

6. The memory system according to claim 4, wherein the controller is configured to continuously arrange a plurality of k-th flags corresponding to data of a plurality of the first management units of the k-th write data following the data of the plurality of the first management units of the k-th write data and arrange the k-th flags at different positions at least between adjacent physical sectors.

7. The memory system according to claim 1, wherein the first data translation is to flip the first to m-th data or to perform an exclusive OR operation with a certain bit pattern for the first to m-th data.

8. The memory system according to claim 1, wherein the first selection rule includes selection of one data translation candidate from among the generated data translation candidates of the m-th power of two based on an arrangement of a threshold voltage distribution within one or a plurality of physical sectors or the number of specific threshold voltage distributions.

9. The memory system according to claim 1, wherein the first selection rule includes selecting one data translation candidate that has the least number of cases in which a first threshold voltage distribution and a second threshold voltage distribution are adjacent to each other, the first threshold voltage distribution and a second threshold voltage distribution being included in the threshold voltage distributions of the m-th power of two.

10. The memory system according to claim 1, wherein the first selection rule includes selection of one data translation candidate that has the least number of a first threshold voltage distribution, the first threshold voltage distribution having the highest threshold voltage among the threshold voltage distributions of the m-th power of two.

11. The memory system according to claim 1, wherein the first selection rule includes selection of the one data translation candidate written into a first physical sector from among the data translation candidates of the m-th power of two based on arrangements of threshold voltage distributions within the first physical sector and a second physical sector.

12. The memory system according to claim 1,
    wherein m is two, and
    wherein the controller is configured to:
    generate four data translation candidates based on the first to second data to be written into the first to second pages, the four data translation candidates including a first to fourth data translation candidates, the first data translation candidate including the first data and the second data, the second data translation candidate including the first data and the second processed data, the third data translation candidate including the first processed data and the second data, the fourth data translation candidate including the first processed data and the second processed data, the first processed data being data after the first data translation of the first data, the second processed data being data after the first data translation of the second data, select one data translation candidate from among the generated four data translation candidates based on the first selection rule; and write the first write data and the first flag into the first page and write the second write data and the second flag into the second page, the first to second write data being included in the selected one data translation candidate.

13. The memory system according to claim 1,
wherein m is three, and
wherein the controller is configured to:
generate eight data translation candidates based on the first to third data to be written into the first to third pages, the eight data translation candidates including a first to eighth data translation candidates, the first data translation candidate including the first data, the second data, and the third data, the second data translation candidate including the first data, the second data, and the third processed data, the third data translation candidate including the first data, the second processed data, and the third data, the fourth data translation candidate including the first data, the second processed data, and the third processed data, the fifth data translation candidate including the first processed data, the second data, and the third data, the sixth data translation candidate including the first processed data, the second data, and the third processed data, the seventh data translation candidate including the first processed data, the second processed data, and the third data, the eighth data translation candidate including the first processed data, the second processed data, and the third processed data, the first processed data being data after the first data translation of the first data, the second processed data being data after the first data translation of the second data, the third processed data being data after the first data translation of the third data, select one data translation candidate from among the generated eight data translation candidates based on the first selection rule; and write the first write data and the first flag into the first page, write the second write data and the second flag into the second page, and write the third write data and the third flag into the third page, the first to third write data being included in the selected one data translation candidate.

14. The memory system according to claim 1,
wherein m is four, and
wherein the controller is configured to:
generate sixteen data translation candidates based on the first to fourth data to be written into the first to fourth pages, the sixteen data translation candidates including a first to sixteenth data translation candidates, the first data translation candidate including the first data, the second data, the third data, and the fourth data, the second data translation candidate including the first data, the second data, the third data, and the fourth processed data, the third data translation candidate including the first data, the second data, the third processed data, and the fourth data, the fourth data translation candidate including the first data, the second data, the third processed data, and the fourth processed data, the fifth data translation candidate including the first data, the second processed data, the third data, and the fourth data, the sixth data translation candidate including the first data, the second processed data, the third data, and the fourth processed data, the seventh data translation candidate including the first data, the second processed data, the third processed data, and the fourth data, the eighth data translation candidate including the first data, the second processed data, the third processed data, and the fourth processed data, the ninth data translation candidate including the first processed data, the second data, the third data, and the fourth data, the tenth data translation candidate including the first processed data, the second data, the third data, and the fourth processed data, the eleventh data translation candidate including the first processed data, the second data, the third processed data, and the fourth data, the twelfth data translation candidate including the first processed data, the second data, the third processed data, and the fourth processed data, the thirteenth data translation candidate including the first processed data, the second processed data, the third data, and the fourth data, the fourteenth data translation candidate including the first processed data, the second processed data, the third data, and the fourth processed data, the fifteenth data translation candidate including the first processed data, the second processed data, the third processed data, and the fourth data, the sixteenth data translation candidate including the first processed data, the second processed data, the third processed data, and the fourth processed data, the first processed data being data after the first data translation of the first data, the second processed data being data after the first data translation of the second data, the third processed data being data after the first data translation of the third data, the fourth processed data being data after the first data translation of the fourth data, select one data translation candidate from among the generated sixteen data translation candidates based on the first selection rule; and write the first write data and the first flag into the first page, write the second write data and the second flag into the second page, write the third write data and the third flag into the third page, and write the fourth write data and the fourth flag into the fourth page, the first to fourth write data being included in the selected one data translation candidate.

15. A memory system comprising:
a nonvolatile memory including a plurality of physical sectors, each of the physical sectors including a plurality of small sectors, each of the small sectors including memory cells, each of the memory cells being capable of storing data of m bits using threshold voltage distributions of the m-th power of two, each of the small sectors storing data of m pages, the m pages including first to m-th pages, m being a natural number of two or more; and a controller configured to:
perform a first process for the first to m-th data by units of small sector data, the first to m-th data being data to be written into the first to m-th pages, the small sector data is data to be written into the small sector, the first process including writing either k-th processed data or k-th preprocessing data into a k-th page among the first to m-th pages and writing other preprocessing data into a page that is different from the k-th page among the first to m-th pages, the k-th processed data being data after the first data translation of the k-th data, the k-th preprocessing data being data before the first data translation of the k-th data, the other preprocessing data being data before the first data translation of data excluding k-th data among the first to m-th data, the k being assigned to a different natural number of one to m by units of small sector data, write first to m-th flags into the first to m-th pages in association with the consecutive m pieces of small sector data, the first to m-th flags respectively representing whether or not the first data translation is performed for the first to m-th data of small sector data.

16. The memory system according to claim 15,
wherein m is three, and
wherein the controller is configured to:
generate two translation candidates of first small sector data based on the first data of the first small sector data, the second data of the first small sector data, and the third data of the first small sector data, the two data translation candidates of the first small sector data including a first to second data translation candidates of the first small sector data, the first data translation candidate of the first small sector data including the first data of the first small sector data, the second data of the first small sector data, and the third data of the first small sector data, the second data translation candidate including the first processed data of the first small sector data, the second data of the first small sector data, and the third data of the first small sector data, the first processed data of the first small sector data being data after the first data translation of the first data of the first small sector data, generate two translation candidates of second small sector data based on the first data of the second small sector data, the second data of the second small sector data, and the third data of the second small sector data, the two data translation candidates of the second small sector data including a first to second data translation candidates of the second small sector data, the first data translation candidate of the second small sector data including the first data of the second small sector data, the second data of the second small sector data, and the third data of the second small sector data, the second data translation candidate including the first data of the second small sector data, the second processed data of the second small sector data, and the third data of the second small sector data, the second processed data of the second small sector data being data after the first data translation of the second data of the second small sector data, generate two translation candidates of third small sector data based on the first data of the third small sector data, the second data of the third small sector data, and the third data of the third small sector data, the two data translation candidates of the third small sector data including a first to second data translation candidates of the third small sector data, the first data translation candidate of the third small sector data including the first data of the third small sector data, the second data of the third small sector data, and the third data of the third small sector data, the second data translation candidate including the first data of the third small sector data, the second data of the third small sector data, and the third processed data of the third small sector data, the third processed data of the third small sector data being data after the first data translation of the third data of the third small sector data, select one data translation candidate of the first small sector data from among the generated two data translation candidates of the first small sector data based on the first selection rule;

select one data translation candidate of the second small sector data from among the generated two data translation candidates of the second small sector data based on the first selection rule;

select one data translation candidate of the third small sector data from among the generated two data translation candidates of the third small sector data based on the first selection rule;

write the selected one data translation candidate of the first small sector data into the first small sector, write the selected one data translation candidate of the second small sector data into the second small sector, write the selected one data translation candidate of the third small sector data into the third small sector, and write the first to third flags into the first to third pages.

17. A memory system comprising:
a nonvolatile memory including a plurality of physical sectors, each of the physical sectors including at least m small sectors, the m small sectors including first to m-th small sectors, each of the small sectors including memory cells, each of the memory cells being capable of storing data of m bits using threshold voltage distributions of the m-th power of two, each of the small sectors storing data of m pages, the m pages including first to m-th pages, m being a natural number of two or more; and a controller configured to:
perform a first process, the first process including determining whether or not a first data translation is to be performed for k-th data of first to m-th small sector data based on the k-th data of k-th small sector data and a first selection rule, the k-th data being data among first to m-th data, the first to m-th data being data to be written into the first to m-th pages, the first to m-th small sector data being data to be written into the first to m-th small sector, k being a natural number of one to m, perform a second process, the second process including writing the k-th processed data of the first to m-th small sector data into the first to m-th small sector of the k-th page and write k-th flag into the k-th page when it is determined that the first data translation is to be performed for the k-th data of the first to m-th small sector data, and writing the k-th data of the first to m-th small sector data into the first to m-th small sector of the k-th page and write the k-th flag into the k-th page when it is determined that the first data translation is not to be performed for the k-th data of the first to m-th small sector data, the k-th processed data of the first to m-th small sector data being data after the first data translation of the k-th data of the first to m-th small sector data, the k-th flag representing whether or not the first data translation is performed for the k-th data of the first to m-th small sector data, perform the first and second process for cases where k=1 through m.

18. The memory system according to claim 17,
wherein m is three, and
wherein the controller is configured to:
determine whether or not the first data translation is to be performed for the first data of the first to third small sector data based on the first data of the first small sector data and the first selection rule;

determine whether or not the first data translation is to be performed for the second data of the first to third small sector data based on the second data of the second small sector data and the first selection rule;

determine whether or not the first data translation is to be performed for the third data of the first to third small sector data based on the third data of the third small sector data and the first selection rule;

when it is determined that the first data translation is to be performed for the first data of the first to third small sector data, write first processed data of the first to third small sector data into the first to third small sector of the first page and write the first flag into the first page, when it is determined that the first data translation is not to be performed for the first data of the first to third small sector data, write the first data of the first to third small sector data into the first to third small sector of the first page and write the first flag into the first page, the first processed data of the first to third small sector data being data after the first data translation of the first data of the first to third small sector data, the first flag representing whether or not the first data translation is performed for the first data of the first to third small sector data;

when it is determined that the first data translation is to be performed for the second data of the first to third small sector data, write second processed data of the first to third small sector data into the first to third small sector of the second page and write the second flag into the second page, when it is determined that the first data translation is not to be performed for the second data of the first to third small sector data, write the second data of the first to third small sector data into the first to third small sector of the second page and write the second flag into the second page, the second processed data of the first to third small sector data being data after the first data translation of the second data of the first to third small sector data, the second flag representing whether or not the first data translation is performed for the second data of the first to third small sector data;

when it is determined that the first data translation is to be performed for the third data of the first to third small sector data, write third processed data of the first to third small sector data into the first to third small sector of the third page and write the third flag into the third page, when it is determined that the first data translation is not to be performed for the third data of the first to third small sector data, write the third data of the first to third small sector data into the first to third small sector of the third page and write the third flag into the third page, the third processed data of the first to third small sector data being data after the first data translation of the third data of the first to third small sector data, the third flag representing whether or not the first data translation is performed for the third data of the first to third small sector data.

19. The memory system according to claim 17,
wherein m is three, and
wherein the controller is configured to:

determine whether or not the first data translation is to be performed for the first data of the first to third small sector data based on the first data of the first small sector data and the first selection rule;

determine whether or not the first data translation is to be performed for the second data of the first to third small sector data based on the second data of the second small sector data, first determined data of the second small sector data, and the first selection rule, the first determined data of the second small sector data being first processed data of the second small sector data when it is determined that the first data translation is to be performed for the first data of the first to third small sector data, the first determined data of the second small sector data being the first data of the second small sector data when it is determined that the first data translation is not to be performed for the first data of the first to third small sector data, the first processed data of the second small sector data being data after the first data translation of the first data of the second small sector data;

determine whether or not the first data translation is to be performed for the third data of the first to third small sector data based on the third data of third small sector data, second determined data of the third small sector data, third determined data of the third small sector data, and the first selection rule, the second determined data of the third small sector data being first processed data of the third small sector data when it is determined that the first data translation is to be performed for the first data of the first to third small sector data, the second determined data of the third small sector data being the first data of the third small sector data when it is determined that the first data translation is not to be performed for the first data of the first to third small sector data, the first processed data of the third small sector data being data after the first data translation of the first data of the third small sector data; the third determined data of the third small sector data being second processed data of third small sector data when it is determined that the first data translation is to be performed for the second data of the first to third small sector data, the third determined data of the third small sector data being the second data of the third small sector data when it is determined that the first data translation is not to be performed for the second data of the first to third small sector data, the second processed data of the third small sector data being data after the first data translation of the second data of the third small sector data;

when it is determined that the first data translation is to be performed for the first data of the first to third small sector data, write the first processed data of the first to third small sector data into the first to third small sector of the first page and write the first flag into the first page, when it is determined that the first data translation is not to be performed for the first data of the first to third small sector data, write the first data of the first to third small sector data into the first to third small sector of the first page and write the first flag into the first page, the first processed data of the first to third small sector data being data after the first data translation of the first data of the first to third small sector data, the first flag representing whether or not the first data translation is performed for the first data of the first to third small sector data;

when it is determined that the first data translation is to be performed for the second data of the first to third small sector data, write the second processed data of the first to third small sector data into the first to third small sector of the second page and write the second flag into the second page, when it is determined that the first data translation is not to be performed for the second data of the first to third small sector data, write the second data of the first to third small sector data into the first to third small sector of the second page and write the second flag into the second page, the second processed data of the first to third small sector data being data after the first data translation of the second data of the first to third small sector data, the second flag representing whether or not the first data translation is performed for the second data of the first to third small sector data;

when it is determined that the first data translation is to be performed for the third data of the first to third small sector data, write the third processed data of the first to third small sector data into the first to third small sector of the third page and write the third flag into the third page, when it is determined that the first data translation is not to be performed for the third data of the first to third small sector data, write the third data of the first to third small sector data into the first to third small sector of the third page and write the third flag into the third page, the third processed data of the first to third small sector data being data after the first data translation of the third data of the first to third small sector data, the third flag representing whether or not the first data translation is performed for the third data of the first to third small sector data.

20. The memory system according to claim 17,
wherein m is three,
wherein each of the physical sectors including at least first to third small sectors of a first group and first to third small sectors of a second group, and
wherein the controller is configured to:
determine whether or not the first data translation is to be performed for the first data of the first to third small sector data of the first group based on the first to third data of the first small sector data of the first group and the first selection rule, the first to third small sector data of the first group being data to be written into the first to third small sector of the first group;
determine whether or not the first data translation is to be performed for the second data of the second to third small sector data of the first group and the second data of the first small sector data of the second group based on the second data of the second small sector data of the first group, first determined data of the second small sector data of the first group, and the first selection rule, the first small sector data of the second group being data to be written into the first small sector of the second group, the first determined data of the second small sector data of the first group being first processed data of the second small sector data of the first group when it is determined that the first data translation is to be performed for the first data of the first to third small sector data of the first group, the first determined data of the second small sector data of the first group being the first data of the second small sector data of the first group when it is determined that the first data translation is not to be performed for the first data of the first to third small sector data of the first group, the first processed data of the second small sector data of the first group being data after the first data translation of the first data of the second small sector data of the first group;
determine whether or not the first data translation is to be performed for the third data of the third small sector data of the first group and the third data of the first to second small sector data of the second group based on the third data of the third small sector data of the first group, second determined data of the third small sector data of the first group, third determined data of the third small sector data of the first group, and the first selection rule, the second small sector data of the second group being data to be written into the second small sector of the second group, the second determined data of the third small sector data of the first group being first processed data of the third small sector data of the first group when it is determined that the first data translation is to be performed for the first data of the first to third small sector data of the first group, the second determined data of the third small sector data of the first group being the first data of the third small sector data of the first group when it is determined that the first data translation is not to be performed for the first data of the first to third small sector data of the first group, the first processed data of the third small sector data of the first group being data after the first data translation of the first data of the third small sector data of the first group; the third determined data of the third small sector data of the first group being second processed data of third small sector data of the first group when it is determined that the first data translation is to be performed for the second data of the second to third small sector data of the first group and the second data of the first small sector data of the second group, the third determined data of the third small sector data of the first group being the second data of the third small sector data of the first group when it is determined that the first data translation is not to be performed for the second data of the second to third small sector data of the first group and the second data of the first small sector data of the second group, the second processed data of the third small sector data of the first group being data after the first data translation of the second data of the third small sector data of the first group;

when it is determined that the first data translation is to be performed for the first data of the first to third small sector data of the first group, write the first processed data of the first to third small sector data of the first group into the first to third small sector of the first group of the first page and write the first flag into the first page, when it is determined that the first data translation is not to be performed for the first data of the first to third small sector data of the first group, write the first data of the first to third small sector data of the first group into the first to third small sector of the first group of the first page and write the first flag into the first page, the first processed data of the first to third small sector data of the first group being data after the first data translation of the first data of the first to third small sector data of the first group, the first flag representing whether or not the first data translation is performed for the first data of the first to third small sector data of the first group;

when it is determined that the first data translation is to be performed for the second data of the second to third small sector data of the first group and the second data of the first small sector data of the second group, write the second processed data of the second to third small sector data of the first group and the first small sector data of the second group into the second to third small sector of the first group and the first small sector of the second group and write the second flag into the second page, when it is determined that the first data translation is not to be performed for the second data of the second to third small sector data of the first group and the first small sector data of the second group, write the second data of the second to third small sector data of the first group and the first small sector data of the second group into the second to third small sector of the first group and the first small sector of the second group and write the second flag into the second page, the second processed data of the second to third small sector data of the first group and the first small sector data of the second group being data after the first data translation of the second data of the second to third small sector data of the first group and the first small sector data of the second group, the second flag representing whether or not the first data translation is performed for the second data of the second to third small sector data of the first group and the first small sector data of the second group;

when it is determined that the first data translation is to be performed for the third data of the third small sector data of the first group and the third data of the first to second small sector data of the second group, write the third processed data of the third small sector data of the first group and the first to second small sector data of the second group into the third small sector of the first group and the first to second small sector of the second group, when it is determined that the first data translation is not to be performed for the third data of the third small sector data of the first group and the third data of the first to second small sector data of the second group, write the third data of the third small sector data of the first group and the first to second small sector data of the second group into the third small sector of the first group and the first to second small sector of the second group and write the third flag into the third page, the third processed data of the third small sector data of the first group and the first to second small sector data of the second group being data after the first data translation of the third data of the third small sector data of the first group and the first to second small sector data of the second group, the third flag representing whether or not the first data translation is performed for the third data of the third small sector data of the first group and the first to second small sector data of the second group.

* * * * *